(12) United States Patent
Kondoh et al.

(10) Patent No.: US 7,909,549 B2
(45) Date of Patent: Mar. 22, 2011

(54) SMALL-DIAMETER DEEP HOLE DRILL AND A MICRO DEEP HOLE DRILLING METHOD

(75) Inventors: Yoshihiro Kondoh, Shiga (JP); Takeshi Akamatsu, Shiga (JP)

(73) Assignee: Hitachi Tool Engineering, Ltd., Tokyo (JP)

( * ) Notice: Subject to any disclaimer, the term of this patent is extended or adjusted under 35 U.S.C. 154(b) by 0 days.

(21) Appl. No.: 12/602,433

(22) PCT Filed: Jun. 12, 2008

(86) PCT No.: PCT/JP2008/060740
§ 371 (c)(1),
(2), (4) Date: Nov. 30, 2009

(87) PCT Pub. No.: WO2009/001681
PCT Pub. Date: Dec. 31, 2008

(65) Prior Publication Data
US 2010/0178121 A1     Jul. 15, 2010

(30) Foreign Application Priority Data

Jun. 22, 2007  (JP) ................................. 2007-165321
Jul. 18, 2007  (JP) ................................. 2007-186428
Nov. 15, 2007  (JP) ................................. 2007-296277

(51) Int. Cl.
*B23B 35/00* (2006.01)
*B23B 51/02* (2006.01)
(52) U.S. Cl. ............ 409/132; 408/1 R; 408/17; 408/230
(58) Field of Classification Search .......... 409/131–132; 408/1 R, 17, 227, 230; *B23B 35/00, 41/02, B23B 51/02*
See application file for complete search history.

(56) References Cited

U.S. PATENT DOCUMENTS 2,897,695 A * 8/1959 Winslow ....................... 408/224
3,564,948 A * 2/1971 Pomernacki .................. 408/211
(Continued)

FOREIGN PATENT DOCUMENTS

JP   63306811 A * 12/1988
(Continued)

*Primary Examiner* — Daniel W Howell
(74) *Attorney, Agent, or Firm* — Arent Fox LLP

(57) ABSTRACT

A small-diameter drill for deep hole drilling is provided which is capable of inhibiting the cutting chips from getting bitten and producing a straightness for a drilled hole, thus suitable for drilling a hole having a depth (L) which is 15 or more times the diameter (D) of a drilled hole. The small-diameter drill 1 has a diameter 2 which is 1 mm or less and a drill section 5 including cutting edge(s) 3 and flute(s) 4. The length 11 of the flute 4 is at least 5 times and at most 10 times the drill diameter 2. The diameter of the drill section 5, after being reduced in diameter from the cutting edge 3 toward the rear of the drill section 5, is expanded in diameter so that the outer diameter at the end of the flute 4 becomes at least 0.9 times and at most 0.98 times the drill diameter 2. An expanded-diameter portion 10 is provided between the drill section 5 and a neck section 6 connected to a shank 7 and is expended in diameter from the outer diameter at the end 9 of the flute 4 up to 1 or less times the drill diameter 2. The diameter of the neck section 6 is smaller than the drill diameter 2, and the length 12 of the neck section 6 is 10 or more times the drill diameter 2.

14 Claims, 32 Drawing Sheets

U.S. PATENT DOCUMENTS

| | | | |
|---|---|---|---|
| 3,806,270 A * | 4/1974 | Tanner et al. | 408/56 |
| 5,184,926 A * | 2/1993 | Hemmings | 408/226 |
| 5,967,712 A * | 10/1999 | Magill et al. | 408/227 |
| 6,126,367 A * | 10/2000 | Reed | 408/1 R |

FOREIGN PATENT DOCUMENTS

| | | | |
|---|---|---|---|
| JP | 03281111 A * | 12/1991 | |
| JP | 04-348803 A | 12/1992 | |
| JP | 06-134648 A | 5/1994 | |
| JP | 08-071824 A | 3/1996 | |
| JP | 08168908 A * | 7/1996 | |
| JP | 2002028809 A * | 1/2002 | |
| JP | 2003-260611 A | 9/2003 | |
| JP | 2003-266223 A | 9/2003 | |
| JP | 2004-066358 A | 3/2004 | |
| JP | 2005022012 A * | 1/2005 | |
| SU | 1400794 A1 * | 6/1988 | |

\* cited by examiner

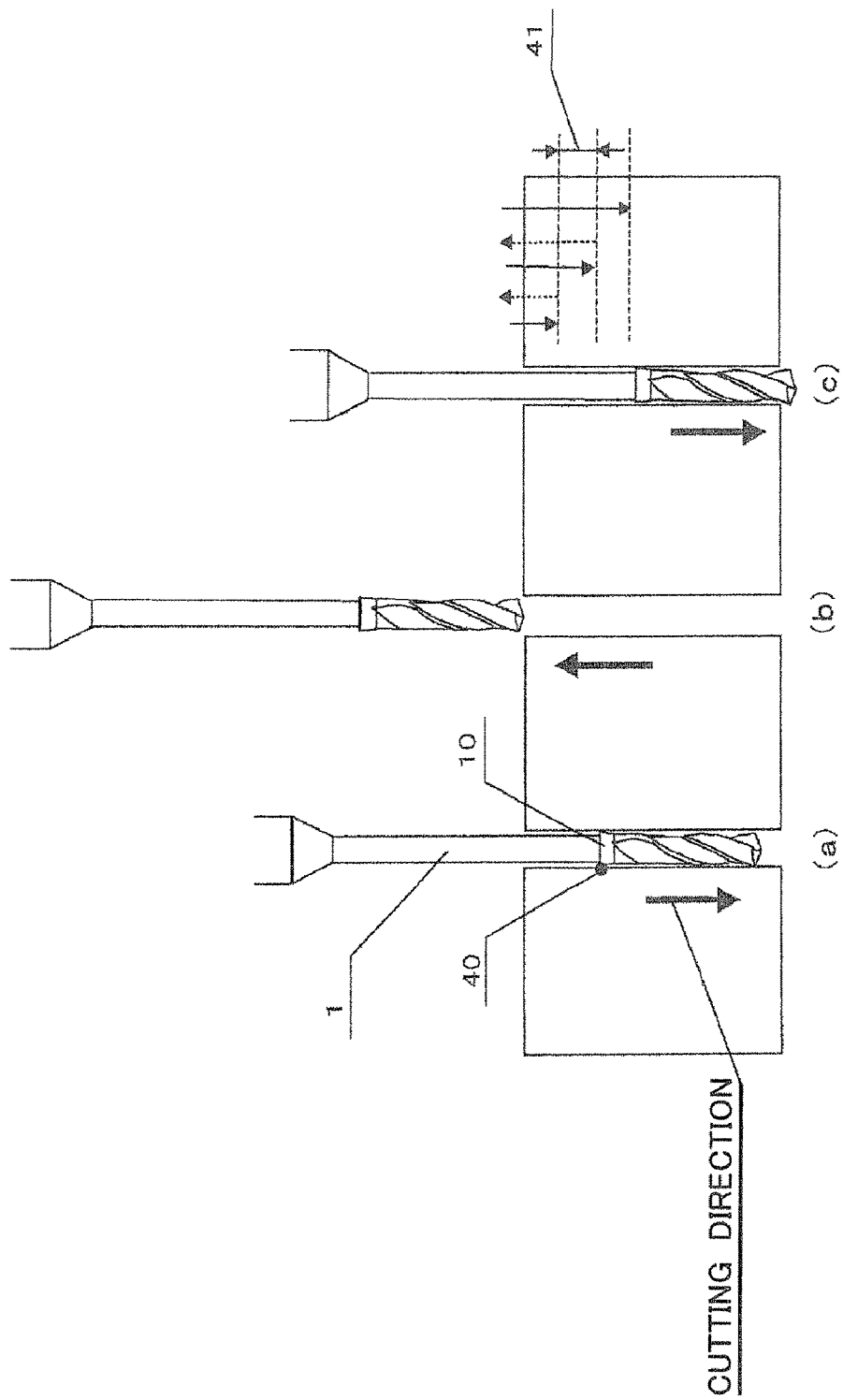

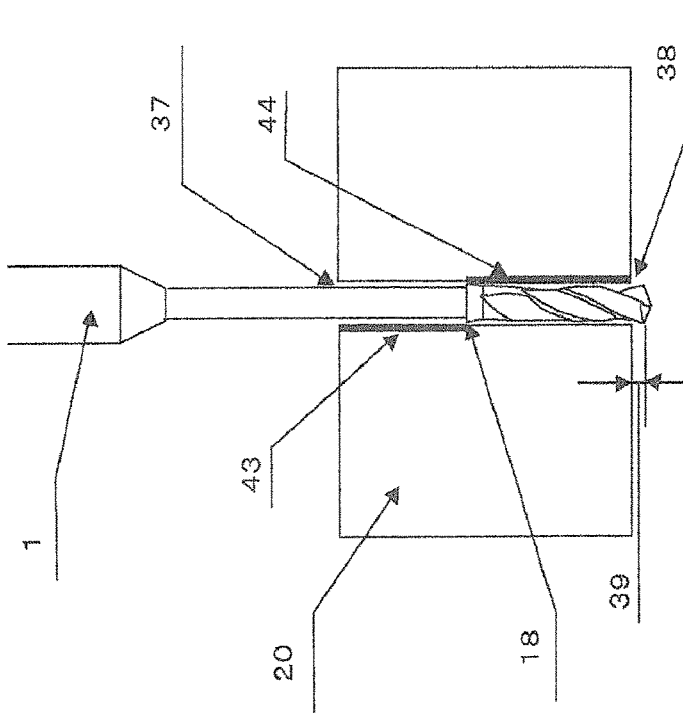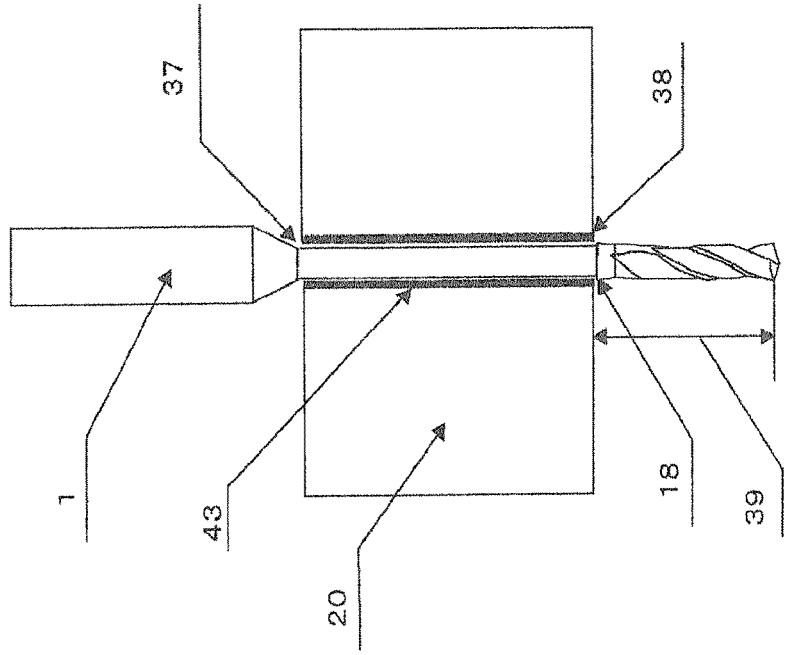

FIG.30
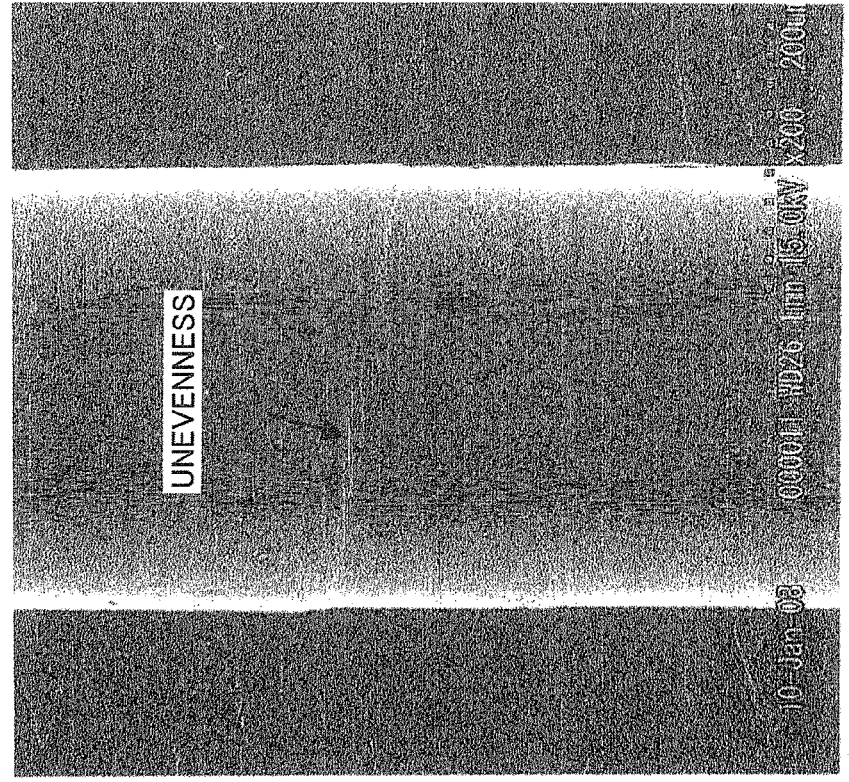
NEAR THE EXIT OF HOLE
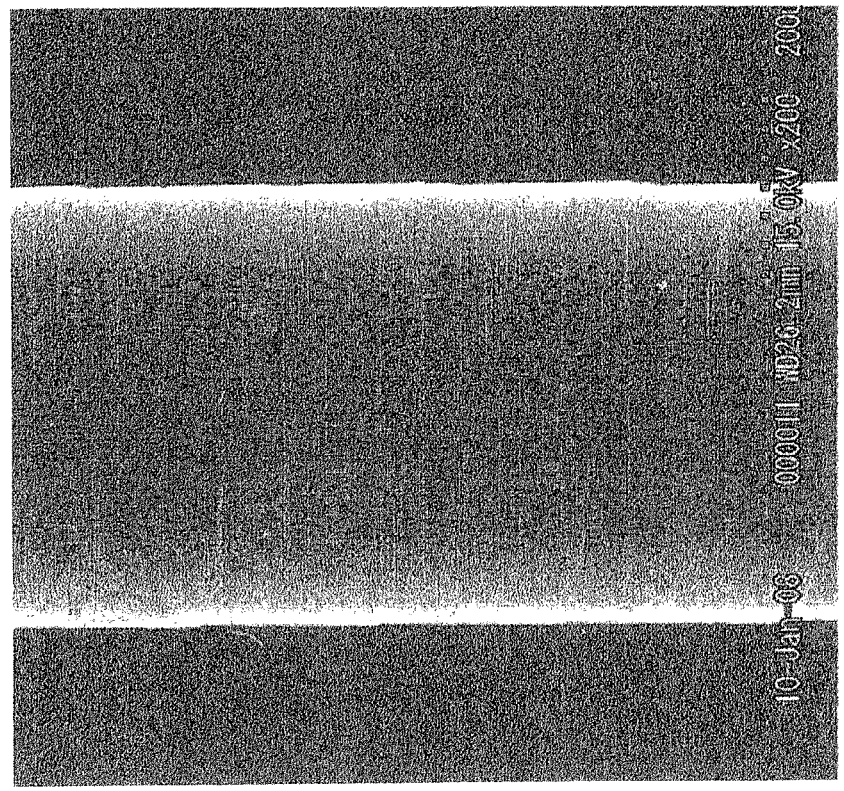
NEAR THE MIDDLE OF HOLE

US 7,909,549 B2

SMALL-DIAMETER DEEP HOLE DRILL AND A MICRO DEEP HOLE DRILLING METHOD

CROSS-REFERENCE TO RELATED APPLICATION

This application is a National Stage entry of International Application No. PCT/JP2008/060740, filed Jun. 12, 2008, which claims priority to Japanese Patent Application No. 2007-165321 filed Jun. 22, 2007, Japanese Patent Application No. 2007-186428 filed Jul. 18, 2007, and Japanese Patent Application No. 2007-296277 filed Nov. 15, 2007, the disclosure of the prior application is hereby incorporated in its entirety by reference.

TECHNICAL FIELD

The present invention relates to a new shape small-diameter deep hole drill having a drill diameter of 1 mm or less, which is for use in processing a die or parts and the like. The invention also relates to a micro deep hole drilling method which uses the small-diameter drill for drilling deep holes with an acceptable precision, especially when a drilled hole diameter (hereafter referred to as "D") is 1 mm or less and a ratio of the drilled hole diameter to a drilled hole depth (hereafter referred to as "L") represented by L/D is 15 or more, or when forming a deep through-hole having an L/D ratio of 10 or more, particularly when forming an extremely deep hole having an L/D ratio of 50 or more. Therefore, the present invention relates to a small-diameter drill for deep hole drilling and a micro deep hole drilling method, suitable for forming both micro deep blind holes and through-holes.

BACKGROUND ART

When an over-hang length for a tool to stick out is long with respect to a drill diameter, the rigidity of the tool will decrease. Therefore, a tool deflection occurs during a drilling process, resulting in a deterioration of the straightness of a drilled hole or a breakage of the drill. When using a drill for deep hole drilling, usually the flute length of the drill is made shorter than the depth of the drilled hole, thereby drilling a hole by means of "step feed". Here, so-called "step feed" in a drilling process is a method of drilling a hole by repeatedly moving the drill forward and backward with respect to the hole in a step-by-step movement.

In patent document 1 (Japanese Unexamined Patent Application Publication No. 2003-266223), as a small-diameter drill for deep hole drilling suitable for use in step feed, there has been disclosed a drill in which the flute is shortened to increase mechanical strength, so that it can be used for drilling deep holes having a depth of 10 or more times the drill diameter in an extremely hard material having a hardness of HRC 45 or more.

In patent document 2 (Japanese Unexamined Patent Application Publication No. H8-71824), a drill is disclosed which comprises: a back tapered portion with its diameter reducing from the front point of the drill, a small-diameter portion having a diameter smaller than the drill diameter, and a constant diameter portion having the same diameter as the drill diameter.

In patent document 3 (Japanese Unexamined Patent Application Publication No. H4-348803), a hole drilling method is disclosed in which after a guide hole has been formed and when a working drill gets into contact with the temporary hole, an in-plane component force acting on the drill is detected, and the position of the tip of the drill is moved in a direction in which the component force decreases.

In patent document 4 (Japanese Unexamined Patent Application Publication No. H6-134648), a cutting and drilling method is disclosed which uses a ball end mill to drill a hole by providing a depth of cut and a relative feeding movement in the X-axis and Y-axis directions to the ball end mill and work piece so that cutting is performed in a spiral and down-cut manner.

In patent document 5 (Japanese Unexamined Patent Application Publication No. 2003-260611), a boring method for boring an inclined hole in a plate material is disclosed, in which when an inclined hole is to be drilled in a plate material, a hemispherical hole is at first drilled for positioning the hole, then a drilling jig for hole drilling is obliquely attached to the plate material so that an inclined hole can be drilled in the plate material.

Patent document 1: Japanese Unexamined Patent Application Publication 2003-266223
Patent document 2: Japanese Unexamined Patent Application Publication H08-71824
Patent document 3: Japanese Unexamined Patent Application Publication H04-348803
Patent document 4: Japanese Unexamined Patent Application Publication H06-134648
Patent document 5: Japanese Unexamined Patent Application Publication 2003-260611

DISCLOSURE OF THE INVENTION

Problems to be Solved by the Invention

When a small-diameter drill is used in a deep hole drilling, since it has a large L/D ratio and a drilled hole is deep, there is a long time period during which the cutting chips move inside the drilled hole until they are removed. During that time, due to an influence caused by a flute twist, there was a problem that the cutting chips might move to the end of the flute and get bitten between the outer peripheral surface of the rear or neck section of the drill and the inner circumferential surface of the drilled hole, thus causing the drill to vibrate during drilling and resulting in a poor straightness of the hole, or even causing the small-diameter drill to break. In particular, if the flute is long, drill rigidity will be low, so that the straightness or the like might become remarkably poor and the drill might break if a small diameter deep hole is drilled. Moreover, even when the flute is made shorter in order to increase a mechanical strength, if the drill diameter is 1 mm or less, the cutting chips are still apt to move toward the rear of drill section and get bitten in the drilled hole, thus rendering it impossible to drill a deep hole.

In view of the above, it is an object of the present invention to provide a new type small-diameter drill having a diameter of 1 mm or less for deep hole drilling, and to provide a micro deep hole drilling method, so as to drill deep holes having an L/D ratio of 15 or more, especially an L/D ratio of 30 to 50.

Means for Solving the Problems

Namely, the drill of the present invention is a small-diameter deep hole drill having a drill diameter of 1 mm or less, including a drill section having cutting edge(s), flute(s) and an expanded-diameter portion, wherein: the flute has a length which is at least 5 times and at most 10 times the drill diameter; the drill section at first shrinks and then expands, changing in diameter from a drill cutting edge toward a rear end of the drill section, an outer diameter of the drill section at the end of the flute is at least 0.9 times and at most 0.98 times the drill diameter; an expanded-diameter portion is provided between the rear end of the drill section and a neck section, having a diameter which expands from the outer diameter of the end of the flute up to 1 or less times the drill diameter; the neck section is connected with a shank section and has a diameter smaller than the drill diameter and a length which is 10 or more times the drill diameter.

Further, the present invention is a small-diameter deep hole drill having a drill diameter of 1 mm or less, including a drill section having cutting edge(s), flute(s) and an expanded-diameter portion, wherein: the flute has a length which is at least 5 times and at most 10 times the drill diameter; the drill section has a smallest-diameter portion anywhere in the longitudinal direction of the drill section; an outer diameter of the drill section at the end of the flute is at least 0.9 times and at most 0.98 times the drill diameter; a expanded-diameter portion is provided at the rear end of the drill section, having a diameter which expands from the outer diameter of the end of the flute up to 1 or less times the drill diameter; the neck section is connected with a shank section and has a diameter smaller than the drill diameter and a length which is 10 or more times the drill diameter.

In the small-diameter deep hole drill of the present invention, the flute length can be set at least 5 times and at most 10 times the drill diameter. On the other hand, if the flute length is long, the cutting resistance will increase, and drill vibration or the like may unfavorably affect a straightness of a drilled hole. For this reason, the flute length is desired to be 7 or less times the drill diameter.

Moreover, regarding the small-diameter deep hole drill of the present invention, the outer diameter of the neck section is required to be smaller than the drill diameter. However, it is desirable for the outer diameter of the neck section to be set at least 0.85 times to less than 0.98 times the drill diameter. More preferably, guide portions each having an outer diameter of at least 0.98 times and at most 1.0 times the drill diameter are provided at one or more positions on the neck section.

When a distance from the drill section to the guide portion(s) is long with respect to the depth of a drilled hole, a straightness of the drilled hole will be unfavorably affected until the guide portion(s) enters the drilled hole, resulting in a problem that the straightness might be damaged. For this reason, it is preferable that the interval between the guide portion(s) be at least 5 times and at most 10 times the drill diameter, and that the closer the positions of the guide portions to the drill section, the shorter the intervals between the guide portion(s) should be made. Preferably, the length of each guide portion is at least 0.2 times and at most 2 times the drill diameter, thereby rendering it possible to suppress a deflection of the drill over the entire drill length.

A micro deep hole drilling method of the present invention is a method which uses a ball end mill mainly for shaping the bottom surface of a guide hole into an approximately hemispherical structure having a specific shape, thereby drilling a guide hole with an acceptable precision.

Namely, a micro deep hole drilling method of the present invention is a method characterized by drilling a hole having a diameter of 1 mm or less and a depth of 10 or more times the diameter of a drilled hole, especially 15 or more times the diameter of the drilled hole, by using a preformed guide hole to guide a small-diameter deep hole drill.

According to the micro deep hole drilling method of the present invention, prior to drilling a deep hole, a guide hole is formed using a ball end mill. The ball end mill is fed in the direction of rotation axis of the ball end mill, so that the diameter of the guide hole is made at least 0.90 times and at most 1.05 times the diameter of the small-diameter deep hole drill, and the depth of the guide hole is made at least 0.6 times and at most 2.0 times the diameter of the small-diameter deep hole drill. Here, the guide hole is made to have a bottom surface in a substantially hemispherical shape. Further, the small-diameter deep hole drill has a flute length which is at least 5 times and at most 10 times the drill diameter, and the neck section has a length which is 10 or more times the drill diameter. Such a small-diameter deep hole drill is used to perform the drilling by repeating a step feed.

Using the aforementioned drilling method, it is possible to drill a deep hole having a diameter of 1 mm or less and a depth of 15 or more times the hole diameter, especially having an L/D ratio of 50 or more, thereby obtaining an acceptable and stable positioning precision, realizing a hole drilling having a high straightness, and obtaining a long life for the small-diameter deep hole drill.

In the micro deep hole drilling method of the present invention using a specific guide hole formed by a ball end mill, it is preferable to use a small-diameter deep hole drill of the present invention, which comprises a tapered expanded-diameter portion expanding in the direction toward the shank and located between the flute end and the neck section. The small-diameter deep hole drill has a flute length of at least 5 times and at most 10 times the drill diameter, and a neck length of 10 or more times the drill diameter. The aforementioned drilling is performed by repeating a step feed.

In this way, it is possible to push the cutting chips flying out of the flute end back into the flute and surely hold the chips inside the flute, so that the chips can be removed without getting bitten into the neck section of the drill, thus obtaining an acceptable straightness for a drilled hole.

Further, it is preferable that any of the micro deep hole drilling methods of the present invention use the small-diameter deep hole drill of the present invention.

In the micro deep hole drilling method of the present invention, when drilling a hole having a depth which is 50 or more times the diameter of a drilled hole, a position of an outer peripheral corner of the small-diameter deep hole drill during a step back is preferably located inside the drilled hole. The position of the outer peripheral corner is then located at least 0.03 times and at most 1.0 times the diameter of the small-diameter deep hole drill from the end face of the entrance of the drilled hole.

In the micro deep hole drilling method of the present invention, a feeding speed of the small-diameter deep hole drill during non-drilling is at least 1 m/min and at most 4 m/min.

Further, another embodiment of the drill of the present invention is a drill having a drill diameter of 1 mm or less, including a drill section having cutting edge(s), flute(s) and an expanded-diameter portion. The flute has a length which is at least 5 times and at most 10 times the drill diameter. The diameter of the drill section is at first reduced and then increased from the cutting edge toward the rear of the drill section. The outer diameter of the drill section at the end of the flute is at least 0.9 times and at most 0.98 times the drill diameter. An expanded-diameter portion is provided at the rear end of the drill section, expanding in a tapered form from the outer diameter of the end of the flute up to substantially the same diameter as the drill diameter. Alternatively, a maximum diameter of the expanded-diameter portion is made substantially the same as the drill diameter by combining a tapered portion with a cylindrical portion having a diameter which is approximately the same as the drill diameter.

Besides, so called "approximately the same diameter" preferably means at least 0.95 times and at most 1.00 times the drill diameter 2, and more preferably greater than 0.95 times the drill diameter.

If the expanded-diameter portion expands in a tapered form from the outer diameter of the end of the flute up to substantially the same diameter as the drill diameter, or if a tapered portion is combined with a cylindrical portion having a diameter which is approximately the same as the drill diameter, a drill having an expanded-diameter portion's maximum diameter substantially equal to the drill diameter can be used to drill a blind hole or a through hole, particularly a through hole capable of allowing the expanded-diameter portion to completely pass through.

According to the present invention, since the maximum-diameter portion of the expanded-diameter portion has approximately the same diameter as the drill diameter, the expanded-diameter portion of the small-diameter drill can function to lightly polish the inner surface of the drilled hole or has a function similar to a reamer, thereby improving the roughness of the inner surface of the drilled hole and improving the straightness of the drilled hole. Therefore, according to the present invention, it is no longer necessary to perform a reaming process which was otherwise necessary in prior art, thereby rendering it possible to complete a process of drilling a micro deep through hole using only one drilling process based on only one drill.

Using the small-diameter deep hole drill of the present invention, since the maximum-diameter portion of the expanded-diameter portion has approximately the same diameter as the drill diameter, the expanded-diameter portion also serves the role as a guide in the axial direction of the drill during a step feed, thereby ensuring an acceptable straightness for a micro deep hole.

The through holes drilling method of the present invention is a method which uses a drill selected from among the small-diameter deep hole drills of the present invention, with a maximum-diameter portion of the expanded-diameter portion having approximately the same diameter as the drill diameter. In other words, the present invention provides a method of drilling through holes each having a diameter of 1 mm or less and a depth of 10 or more times the hole diameter, especially a depth that is 15 or more times the hole diameter. In detail, the method uses a small-diameter deep hole drill of the present invention described above to perform a drilling while repeating a step feed until at least the maximum-diameter portion or the cylindrical portion penetrates through the drilled hole.

According to the through hole drilling method of the present invention, it is preferable to guide the small-diameter deep hole drill by a guide hole preformed by a ball end mill having a specific shape. Another micro deep hole drilling method of the present invention is a method of drilling a through hole having a diameter of 1 mm or less and a depth of 10 or more times the diameter of the drilled hole, and especially 15 or more times the diameter of the drilled hole. In detail, the method uses a guide hole preformed by a ball end mill to guide the deep hole drill of the present invention, so as to perform a drilling while repeating the step feed until the expanded-diameter portion having a diameter that is approximately the same as the drill diameter of the small-diameter deep hole drill penetrates through the drilled hole.

As described above, it is preferable that the guide hole forming method of the present invention uses a ball end mill which is fed in the direction of the rotation axis of the ball end mill to drill a guide hole having a diameter which is at least 0.90 times and at most 1.05 times the drill diameter, a depth which is at least 0.6 times and at most 2.0 times the drill diameter, and a bottom surface which is in an approximately hemispherical shape.

Effect of the Invention

Using the present invention, it becomes possible to drill a deep hole having an L/D ratio of 15 or more, obtaining an acceptable roughness of hole inner surface without unevenness or the like, as well as an excellent straightness.

Further, using the present invention, it becomes possible to realize a long life for the small-diameter deep hole drill by combining the new drill shape with the new drilling method.

In addition, when applied to a drilling process for forming a through hole, the present invention can greatly improve an inner surface roughness of the drilled micro deep hole and ensure an acceptable straightness. Accordingly, it becomes possible to omit a reaming process which was otherwise often necessary after a drilling process in prior art, thereby rendering it possible to perform a micro deep hole drilling for drilling a through hole in only one process using only one drill.

BRIEF DESCRIPTION OF THE DRAWINGS

FIG. 25 shows in detail a part of a drilling process of the present invention.

FIGS. 26a and 26b show a comparison of drilling state at the final stage for drilling through holes, between the present invention and a comparative example.

FIG. 30 shows a hole inner surface formed according to a comparative example.

BEST MODE FOR CARRYING OUT THE INVENTION

Figure 1:
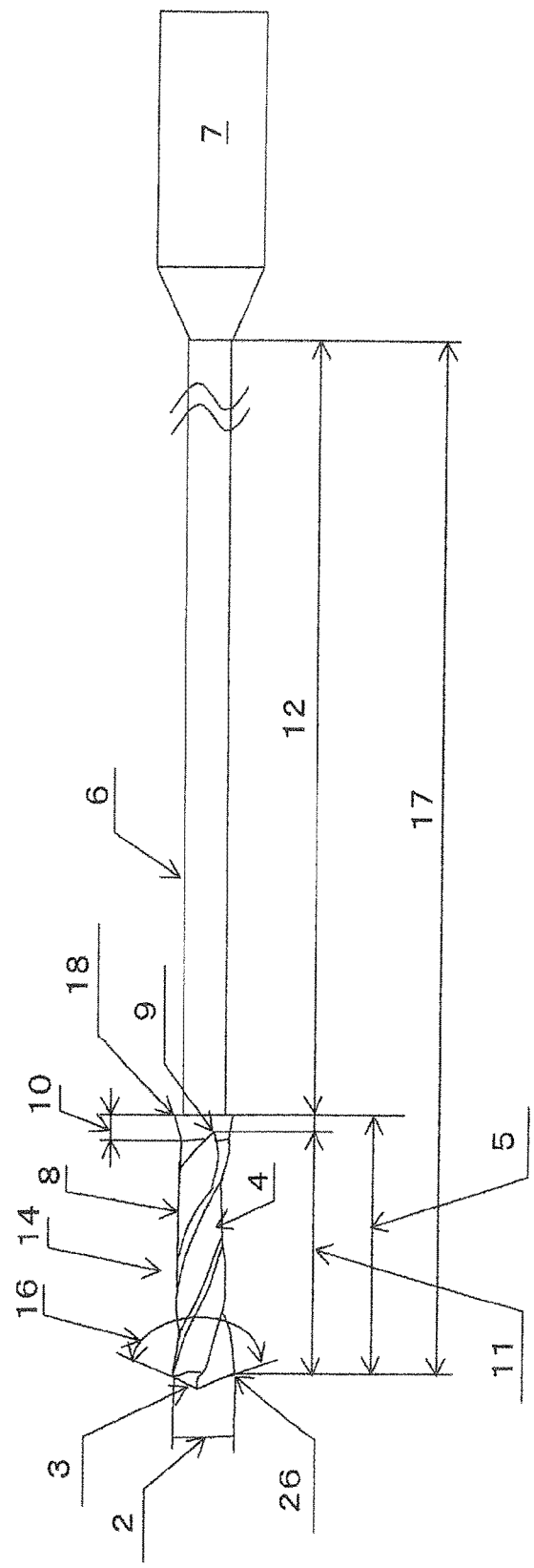
FIG. 1 shows an example of an outer appearance of a small-diameter drill of the present invention.
Figure 2:
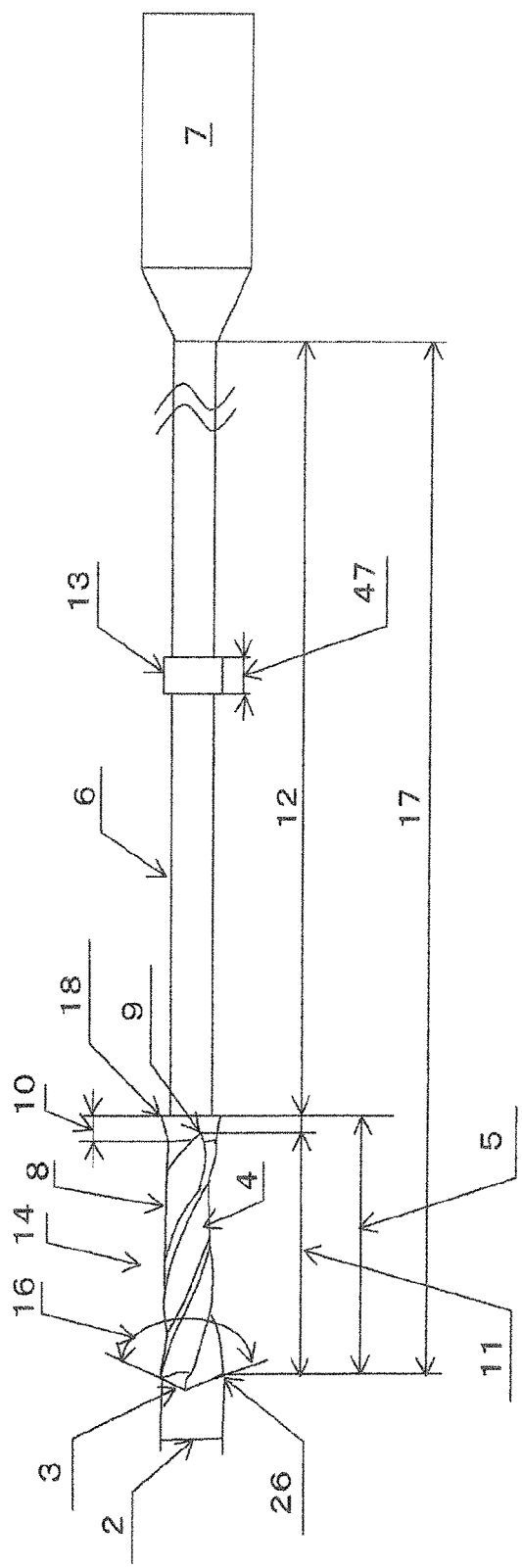
FIG. 2 shows another example of an outer appearance of a small-diameter drill of the present invention.

FIG. 1 and FIG. 2 show examples of a small-diameter drill for deep hole drilling according to the present invention. Hereafter, for the sake of convenience, the small-diameter drill for deep hole drilling according to the present invention will also be referred to as "small-diameter drill". FIG. 1 is an example showing that there is not a guide portion 13 in a neck section 6, and FIG. 2 is an example showing a guide portion 13 in the neck section 6. In either example, the small-diameter drill 1 comprises a drill section 5 having a cutting edge 3, a flute 4, and a smallest-diameter portion 8 in a small-diameter portion 14, an end 9 of the flute 4, a tapered expanded-diameter portion 10, a substantially cylindrical neck section 6, and a shank section 7 having a diameter larger than that of the neck section 6. The example shown in FIG. 2 further comprises a guide portion 13 in the neck section 6. The drill diameter 2 is defined as the largest diameter of the cutting edge 3 shown in FIG. 1, and the flute length 11 is the straight-line distance from the largest-diameter portion of the cutting edge 3 to the end 9 of the flute 4.

The drill section 5 of the small-diameter drill 1 of the present invention has the smallest-diameter portion 8 in a small-diameter portion 14 located anywhere in the lengthwise direction of the drill section 5. Preferably, the smallest-diameter portion 8 is so shaped that its diameter at first decreases and then expands from the cutting edge 3 toward the rear of the drill section 5. The outer diameter of the drill section 5 at the end 9 of the flute 4 is at least 0.9 times and at most 0.98 times the drill diameter 2. The rear end of the drill section 5 has an expanded-diameter portion 10 in which the diameter expands beyond the outer diameter at the end 9 of the flute 4 up to 1 or less times the drill diameter 2. The outer diameter of the neck section 6 connected to the shank section 7 is smaller than the drill diameter 2. The length 12 of the neck section 6 is 10 or more times the drill diameter 2.

The drill section 5 of the small-diameter drill 1 of the present invention is preferably so shaped that its diameter at first decreases from the cutting edge 3 toward the rear end of the drill section 5 until the smallest-diameter portion 8 of the small-diameter portion 14, and then expands so that the outer diameter of the drill section 5 at the end 9 of the flute 4 is at least 0.9 times and at most 0.98 times the drill diameter 2. Expanding the diameter of the drill section 5 after being reduced from the cutting edge 3 toward the rear end of the drill section 5 can also be explained as follows: the drill section 5 has the smallest diameter portion 8 of the drill section 5 somewhere at the rear of the drill section 5 as seen from the cutting edge 3.

The outer diameter of the drill section 5 at the end 9 of the flute 4 can be viewed as being expanded when seen from the small-diameter portion 14. By virtue of this, the cutting chips can be prevented from flying out toward the rear of the drill section 5 from the end 9 of the flute 4, rendering it possible to inhibit the chips from getting bitten on the outer peripheral surface of the drill section 5 or on the outer peripheral surface of the neck section 6, thus inhibiting a possible breakage of the drill. Moreover, the cutting chips can be kept from getting over the end 9 of the flute 4 and getting bitten onto the neck section 6 during the cutting. In this way, the cutting chips can stay inside the flute 4, making it possible to stabilize the cutting and ensure an acceptable straightness in drilling.

If the outer diameter of the drill section 5 at the end 9 of the flute 4 is smaller than 0.9 times the drill diameter 2, the cutting chips will move toward the rear of the drill section 5 to the neck section 6, causing the cutting torque to fluctuate and the straightness of a drilled hole to become unacceptable. At this time, the drill is apt to break. On the other hand, if the outer diameter of the drill section 5 is greater than 0.98 times the drill diameter 2 at the end 9 of the flute 4, it will be impossible for the tapered expanded-diameter portion 10 (to be described later) to have a sufficient outer diameter. Therefore, it is preferable that the diameter of the drill section 5 be expanded and tapered from the smallest-diameter portion 8 of the drill section 5 up to the end 9 of the flute 4.

By virtue of the function of the smaller-diameter portion of the drill section 5, the cutting chips in the smaller-diameter portion 14 can be easily removed without getting bitten between the drilled hole inner surface and the drill 1. Thus, the smallest-diameter portion 8 of the small-diameter portion 14 is set at least 0.85 times and at most 0.96 times the drill diameter 2. By providing the small-diameter portion 14 within this range, it becomes possible to keep the front end on the outer peripheral surface of the small-diameter portion 14 from scraping the inner circumferential surface of the drilled hole, and thus it is possible to suppress any increase in the cutting torque, thereby ensuring a drilled hole having an acceptable straightness.

If the smallest-diameter portion 8 of the small-diameter portion 14 of the small-diameter drill 1 is smaller than 0.85 times the drill diameter 2, large cutting chips are apt to enter the drilled hole, hence unfavorably affecting the surface roughness of the inner circumferential surface of the hole. In addition, the rigidity of the small-diameter drill 1 will also be unfavorably affected, causing the small-diameter drill 1 to break easily. On the other hand, if the smallest-diameter portion 8 of the small-diameter portion 14 of the drill section 5 is greater than 0.96 time the drill diameter 2, it will be impossible to provide a tapered expanded-diameter portion capable of pushing back the cutting chips.

One of the important features in the shape of the small-diameter drill 1 of the present invention is the expanded-diameter portion 10 provided at the rear end of the drill section 5, having a diameter which is 1 or less times the drill diameter 2. Preferably, the expanded-diameter portion 10 is expanded and tapered up to 1 times the drill diameter 2, extending from the end 9 of the flute 4 of the drill section 5 toward the neck section 6 until the maximum-diameter portion 18 of the expanded-diameter portion 10.

The functions of the expanded-diameter portion 10 can be described as follows. Namely, although most of the cutting chips are kept from getting bitten by virtue of the structure of the end 9 of the flute 4 described above, in case smaller chips fly out from the flute 4, such smaller chips can be pushed back toward the tip of the small-diameter drill 1 by virtue of the expanded-diameter portion 10. Furthermore, the expanded-diameter portion 10 can also cause the chips to stay inside the flute 4, thus inhibiting the chips from getting bitten onto the outer peripheral surface of the small-diameter portion 14 and the outer peripheral surface of the neck section 6. Therefore, the expanded-diameter portion 10, by virtue of the above functions, makes it possible to form a drilled hole having an acceptable straightness, rendering itself effective in suppressing a breakage of the small-diameter drill 1.

Though the expanded-diameter portion 10 can be easily made straight and tapered on its outer surface when manufacturing the small-diameter drill 1 as shown in FIG. 1, the outer surface of expanded-diameter portion 10 can also be curved. In fact, the closer the maximum diameter of the tapered expanded-diameter portion 10 to the drill diameter 2 is, the easier it is for this expanded-diameter portion 10 to guide the drill section 5, thereby making it possible to increase the straightness of a drilled hole.

Figure 3:
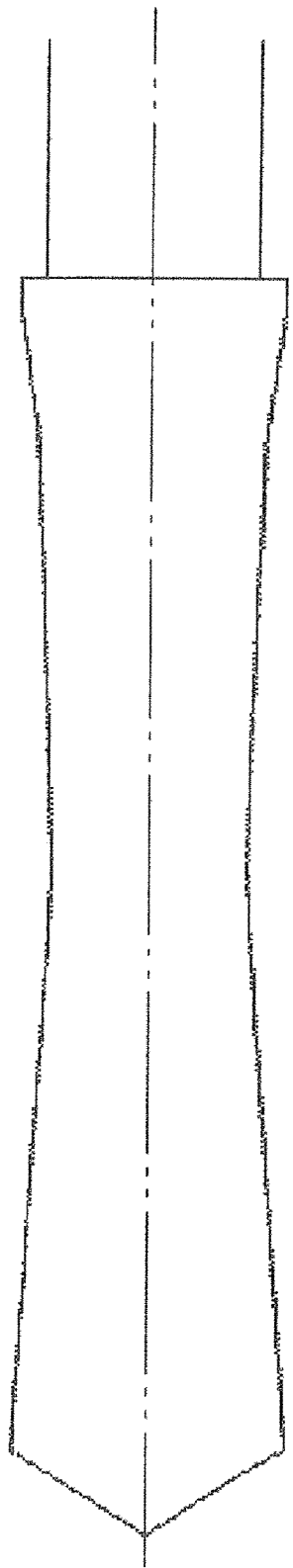
FIG. 3 is a schematic view showing a drill section 5 shown in FIG. 1
Figure 4:
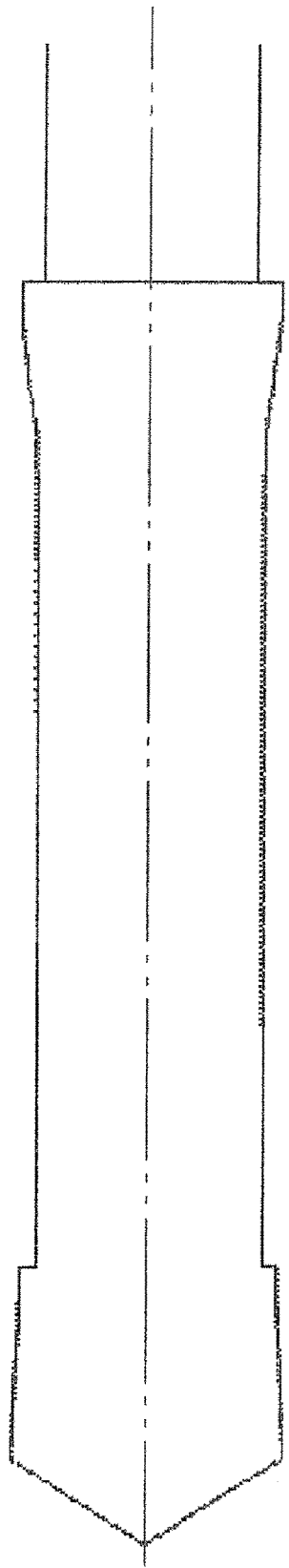
FIG. 4 is a schematic view similar to FIG. 3, showing another embodiment.
Figure 5:
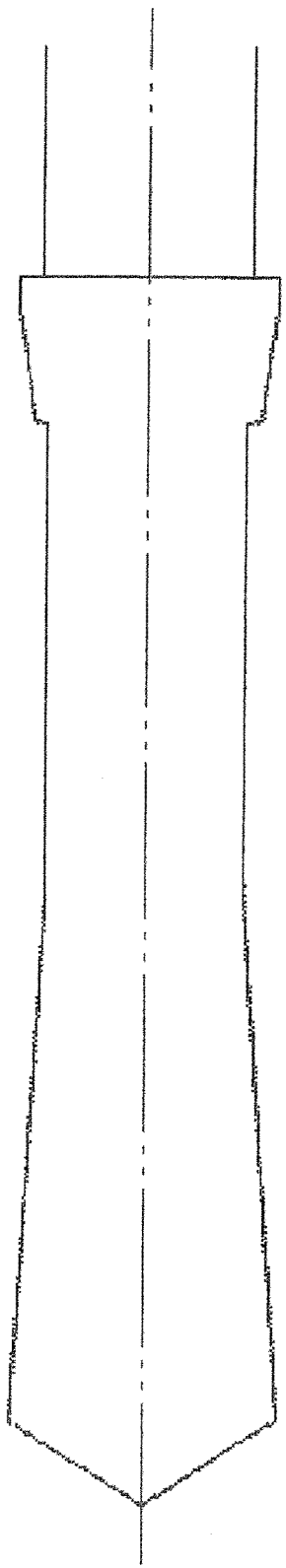
FIG. 5 is a schematic view similar to FIG. 3, showing another embodiment.

Further, the drill section 5 can also be enlarged or reduced in manners shown in FIGS. 3 to 5, including a back-tapering (FIG. 3), an undercut (FIG. 4) and a combination of a back-tapering and an undercut (FIG. 5). In each of the cases, the drill section 5 has a smallest-diameter portion 8 in the small-diameter portion 14. Preferably, the amount of back tapering is at least 0.4/100 mm and at most 2.0/100 mm.

Furthermore, in the small-diameter drill 1 of the present invention, the flute length 11 is made at least 5 times and at most 10 times the drill diameter 2. A flute length 11 within such a range can ensure a necessary internal volume of the flute 4, so that when the small-diameter drill 1 moves inside a deep hole, the cutting chips can be accumulated inside the flute 4. If the flute length 11 is shorter than 5 times the drill diameter 2, a feeding amount per stroke of the small-diameter drill 1 per step feed has to be made small, hence rendering the cutting edge 3 easier to wear. On the other hand, if the flute length 11 is more than 10 times the drill diameter 2, due to a decrease in the rigidity of the small-diameter drill 1, the straightness will become poor. Particularly, in order to ensure a necessary rigidity for the small-diameter drill 1, it is preferable that the flute length 11 be set, as possible as it can, at most 7 times the drill diameter 2.

On the other hand, the length of the drill section 5 is made at most 12 times the drill diameter 2. This is because if the length of the drill section 5 is longer than 12 times the drill diameter 2, the rigidity of the small-diameter drill 1 will become low and thus not recommendable. However, by making the neck section 6 long, it is possible to drill a deep hole having a depth which is 12 or more times the drill diameter 2. Besides, it is preferable that the outer diameter of the neck section 6 be at least 0.85 times and less than 1.0 times the drill diameter 2.

If the outer diameter of the neck section 6 is less than 0.85 times the drill diameter 2, a danger of breaking the small-diameter drill 1 increases due to an excessively thin drill. On the other hand, if the outer diameter of the neck section 6 is 1.0 times the drill diameter 2, the outer diameter of the neck section 6 will be equal to the drill diameter 2, resulting in a problem that a cutting resistance during a drilling process is large.

According to the present invention, in order to drill a deep hole with a large L/D ratio by increasing the length 12 of the neck section 6, the length 12 of the neck section 6 is made to be 10 or more times the drill diameter 2. At the final step of a drilling process according to the present invention, the drill section 5 will be received in a drilled hole. In order to suppress a deflection of the small-diameter drill 1 and to drill a deep hole having an acceptable straightness, it is preferable that the outer diameter of the neck section 6 be at least 0.85 times and less than 0.98 times the drill diameter 2. Further, as shown in FIG. 2, the neck section 6 is provided with at least one guide portion 13 having an outer diameter which is at least 0.98 times and at most 1.0 times the drill diameter 2.

By making the outer diameter of the guide portion 13 at least 0.98 times and at most 1.0 times the drill diameter 2, the guide portion 13 can get into contact with the inner surface of a drilled hole. When the neck section 6 advances into a deep portion of a drilled hole by virtue of the drill section 5, the guide portion 13 is able to guide the dill section 5 along the inner wall of the drilled hole.

Preferably, the length of each individual guide portion 13 is at least 0.2 times and at most 0.5 times the drill diameter 2. To ensure a desired strength for each guide portion 13, it is preferable that the length 47 of each guide portion 13 at one location be long. On the other hand, if the length 47 of the guide portion 13 exceeds 0.5 times, a cutting resistance will partially increase, causing a vibration and thus rendering it difficult to ensure a desired straightness for a drilled hole. However, if the length of a guide portion 13 at one location is shorter than 0.2 times, it will be difficult to ensure a desired strength for the guide portion 13, causing an undesired chipping of the guide portion 13 and thus rendering it difficult to ensure a sufficient guiding effect. Besides, since a chipping area of the guide portion 13 gets into contact with the inner surface of a drilled hole, the roughness of the inner surface of a drilled hole may become deteriorated.

It is preferable that an interval between every two guide portions 13 be at least 5 times and at most 10 times the drill diameter 2. By receiving the guide portions 13 into the drilled hole and by making the guide portions 13 get into contact with the inner surface of a drilled hole, it becomes possible to ensure a desired guiding effect, thus ensuring an acceptable straightness for the drilled hole. However, if an interval between every two guide portions 13 is smaller than 5 times the drill diameter 2, it is considered that an effect of suppressing a deflection of the drill 1 may be sufficiently obtained. But, since the interval between the guide portions 13 is small, a cutting resistance will partially increase, rendering it difficult to ensure a desired straightness for a drilled hole due to a resulting vibration. On the other hand, if the aforementioned interval exceeds 10 times the drill diameter 2, since the interval between the guide portions 13 is large, it will be difficult to sufficiently suppress a deflection of the drill 1 that may occur before the next guide portion 13 moves into the drilled hole, thus unfavorably affecting the straightness of the drilled hole.

Figure 6:
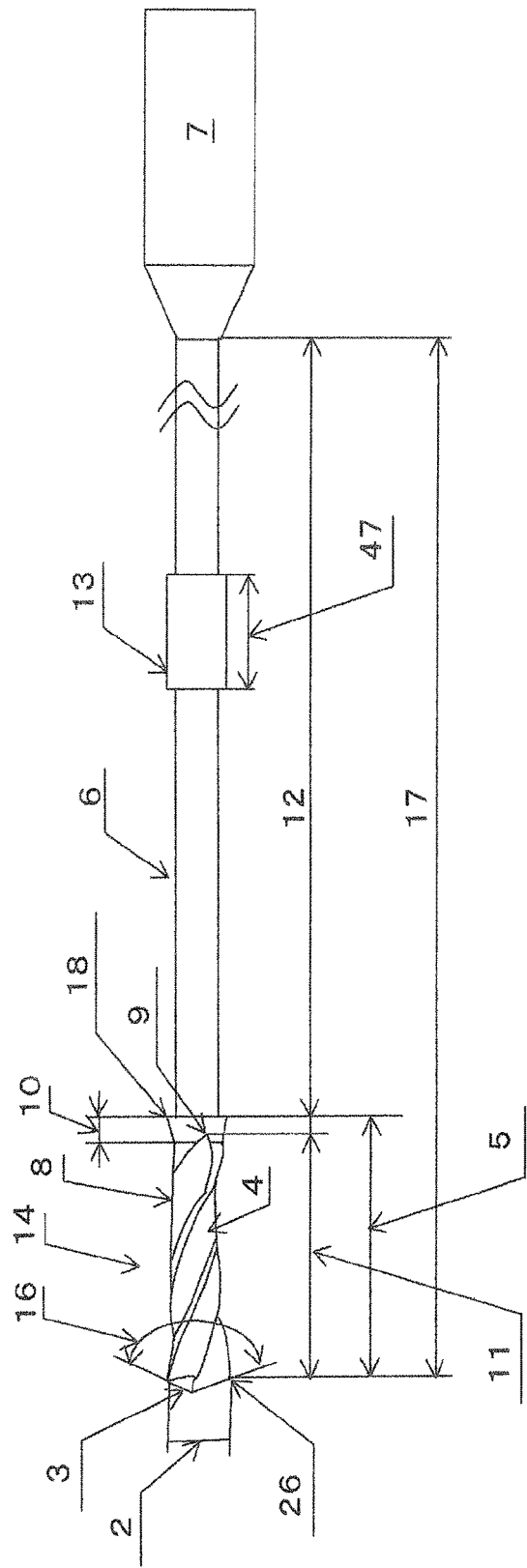
FIG. 6 is a front view showing another embodiment of FIG. 2.
Figure 7:
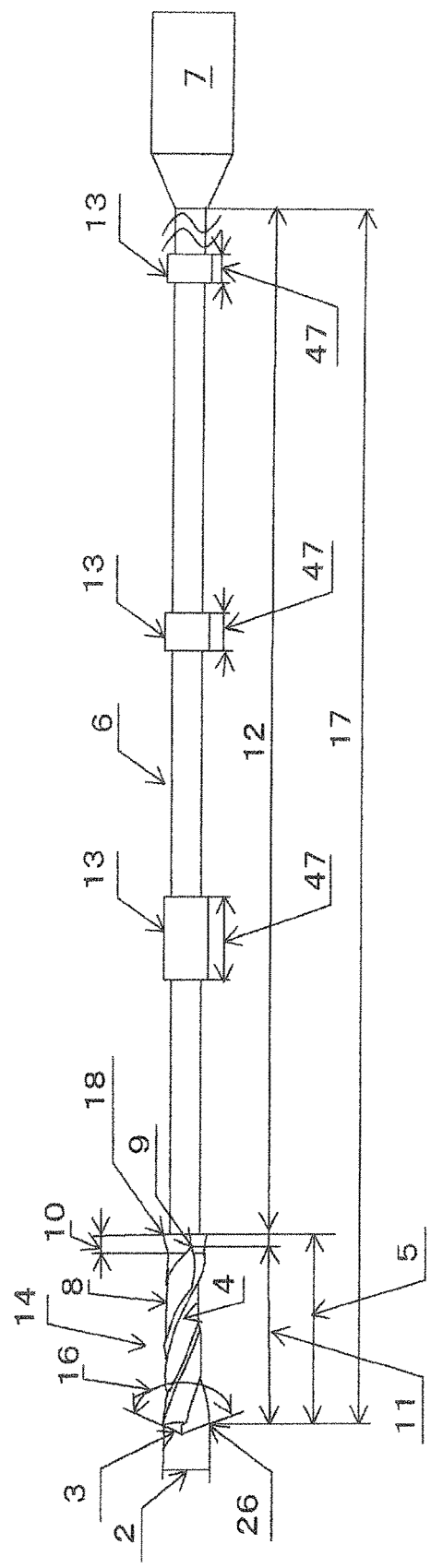
FIG. 7 is a front view showing another embodiment of FIG. 2.

In this way, since the guide portions 13 can provide a guiding effect by virtue of the portion received in a drilled hole, there is no need to provide the guide portions 13 at the same interval along the entire neck section 6. Moreover, as other embodiments of guide portions 13 shown in FIG. 6 and FIG. 7, it is preferable that larger number of guide portions 13 or those having larger areas are provided closer to the cutting edge 3, thus ensuring a desired guiding effect.

The reason for the above can be explained as follows. Namely, with respect to the depth of a hole being drilled, a shorter distance between the drill section 5 and the guide portions 13 can allow the guide portions 13 to be received into a drilled hole at an earlier time, thereby allowing the guide portions 13 to provide an effect of ensuring a desired straightness at an earlier time. In this way, the guide portions 13 can suppress a deflection of the small-diameter drill 1 and thus ensure a desired straightness for the small-diameter drill 1. Particularly, when drilling a deep hole having an L/D ratio of at least 50 and at most 100, which serves as an example where the deflection easily occurs, the guide portions 13 can exhibit a remarkable effect.

The length 11 of the flute 4 of the small-diameter drill 1 according to the present invention is made at least 5 times and at most 10 times the drill diameter 2, thereby ensuring the volume of the flute 4 and thus accumulating the cutting chips in the flute 4 while the small-diameter drill 1 is still moving within the deep hole. On the other hand, if the flute length 11 is shorter than 5 times the drill diameter 2, a feeding amount per stroke of the small-diameter drill 1 per step feed has to be small, thus causing the cutting edge 3 to wear away easily. Nevertheless, if the length 11 of the flute 4 is longer than 10 times the drill diameter 2, a decrease in the rigidity of the small-diameter drill 1 will cause the straightness to become poor.

A micro deep hole drilling method of the present invention is a method which utilizes a small-diameter drill 1 having a drill diameter of 1 mm or less, preferably 0.5 mm or less, to drill a deep hole having an L/D ratio of 15 or more, especially a deep hole having an L/D ratio of 50 or more, the later of which had not been realized until the present invention.

Conventionally, when carrying out the micro deep hole drilling method, it is usual to at first form a guide hole using a drill. For example, when positioning is performed using a drill disclosed in patent document 3 or patent document 5, since such a drill does not have an outer peripheral cutting edge, an operation of processing the inner surface of the hole fails to be sufficient, making it difficult to ensure a roundness for the guide hole. For this reason, when the small-diameter drill 1 bites through the guide hole, the drilling will be very unstable, rendering it impossible to drill a hole with a high precision. Besides, some abnormal wearing will occur at the tip of the cutting edge of the small-diameter drill 1, and burrs will occur at the entrance of the drilled hole, resulting in a breakage of the small-diameter drill 1.

Even when drilling a guide hole with a drill such as that disclosed in patent document 4, there had been some problems peculiar to drilling, as explained below with reference to FIGS. 8 to 11.

Figure 8:
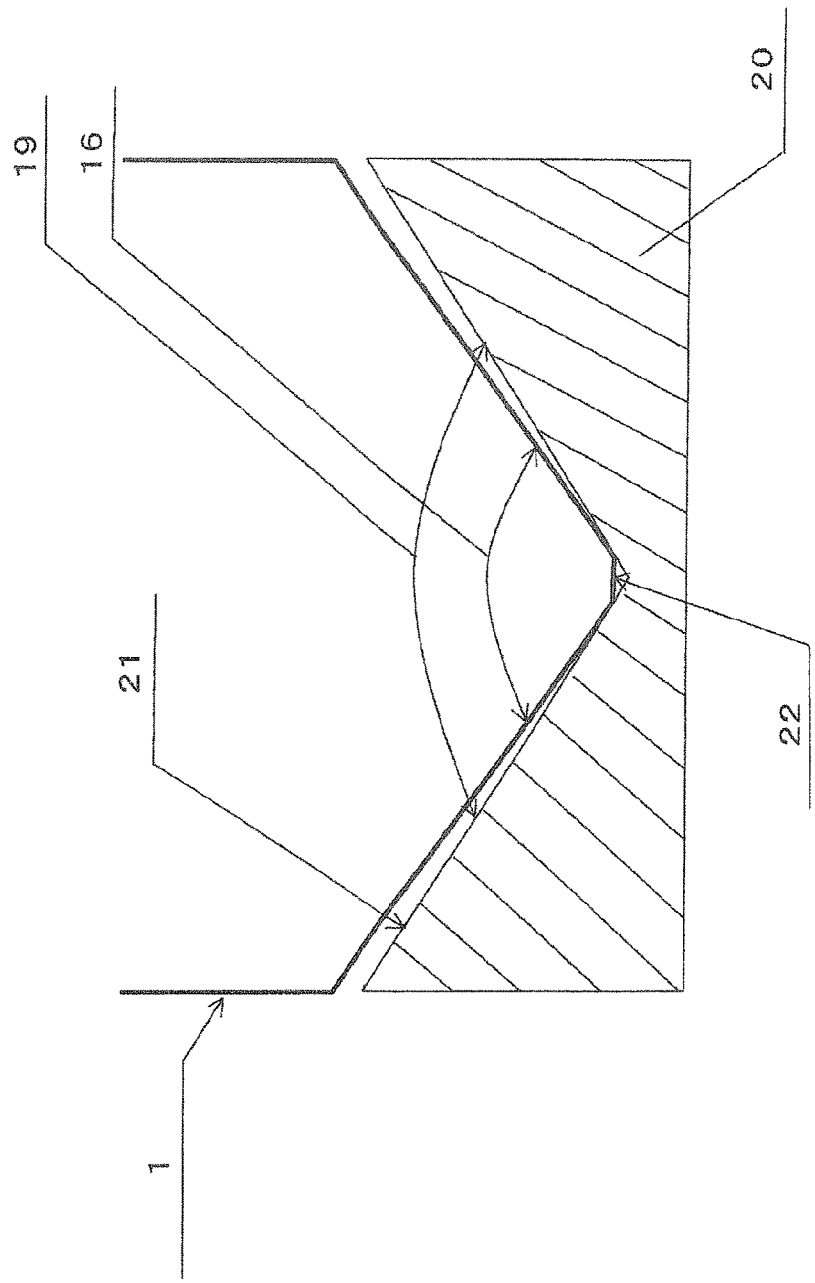
FIG. 8 shows an example of an initial stage of a conventional drilling process

As shown in FIG. 8, the bottom of a guide hole has a fixed opening angle 19 and a predetermined small-diameter drill 1 is used to drill a deep hole. However, if the tip angle 16 of the small-diameter drill 1 is smaller than the opening angle 19 formed during a guide hole drilling, as can be seen in FIG. 8, at a time the small-diameter drill 1 comes into contact with a guiding portion 21 formed in a work piece 20, cutting will be started from a chisel 22 having a predetermined width.

Figure 9:
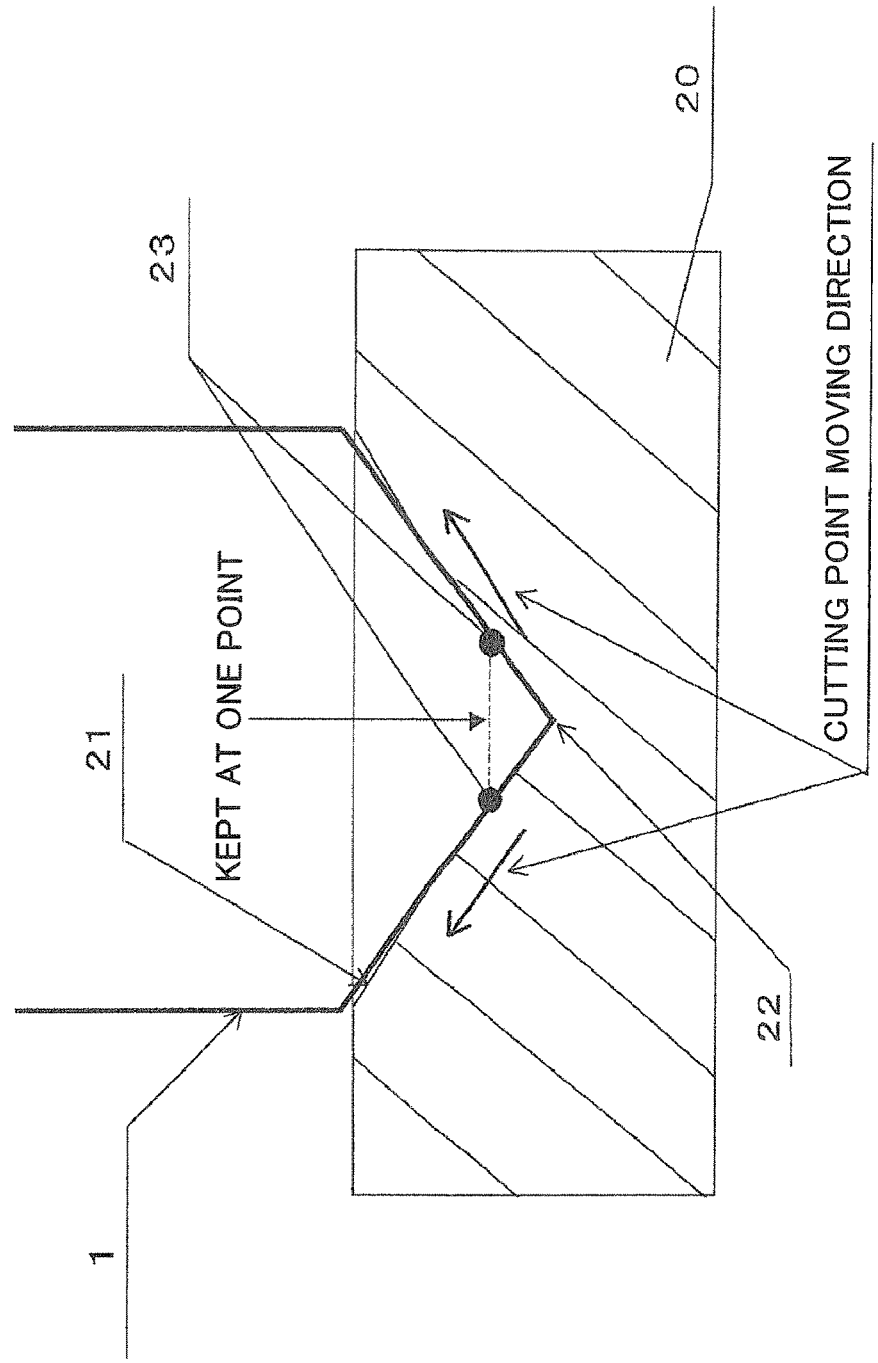
FIG. 9 shows an example of an intermediate stage of a conventional drilling process.

Subsequently, as shown in FIG. 9, a cutting point 23 gradually moves in the outward direction, or in other words, in the cutting-point moving direction. When using the small-diameter drill 1, the chisel 22 is likely to make the small-diameter drill 1 unstable and fluctuation will occur in hole precision, thus resulting in a problem in hole drilling.

Figure 10:
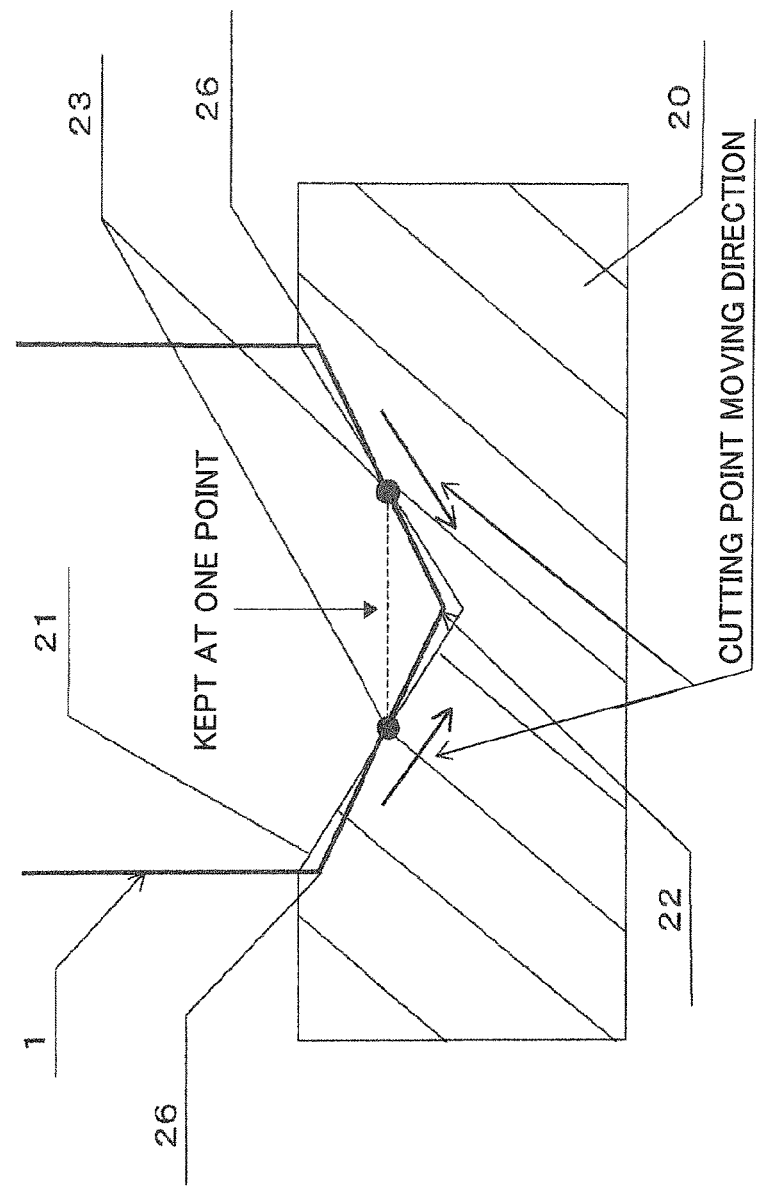
FIG. 10 shows an example in which an opening angle is larger than the tip angle of a drill.

In addition, when the tip angle 16 of the small-diameter drill 1 is larger than the opening angle 19 formed in the guide hole, as can be seen in FIG. 10, the small-diameter drill 1 starts cutting from its outer circumferential corner 26 and the cutting point 23 moves in the cutting-point moving direction. However, since the chisel 22 does not cut at the beginning, the small-diameter drill 1 is apt to wobble and this makes it difficult to ensure a stabilized hole precision, resulting in a problem in cutting.

Figure 11:
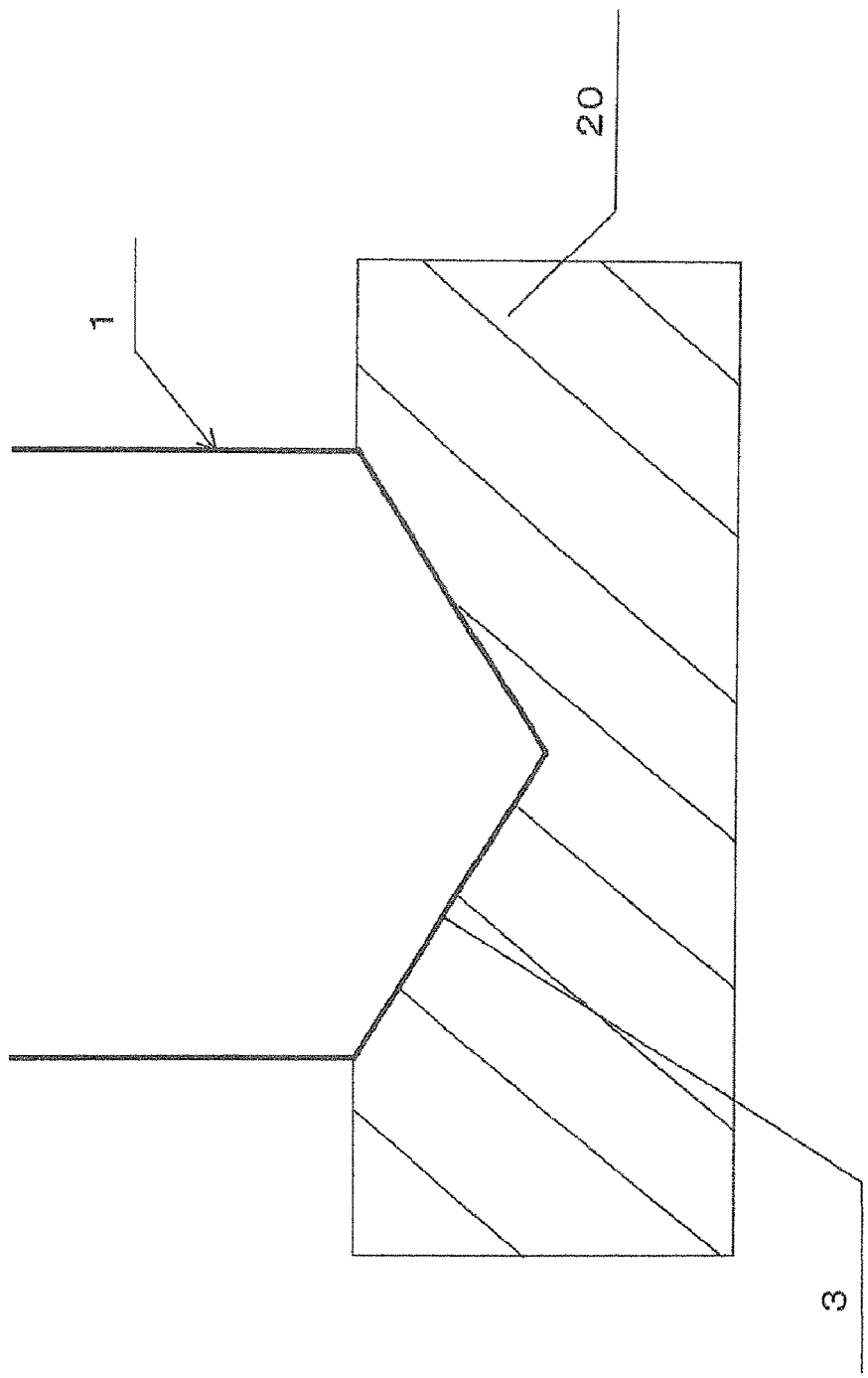
FIG. 11 shows an example in which an opening angle is equal to the tip angle of a drill.

If the tip angle of the small-diameter drill 1 is at the same angle as the opening angle 19, as can be seen in FIG. 11, the entire cutting edge 3 of the small-diameter drill 1 will participate in cutting simultaneously. As a result, the cutting resistance rises too rapidly, causing the small-diameter drill 1 to vibrate and this makes it impossible to ensure a desired hole precision.

Figure 12:
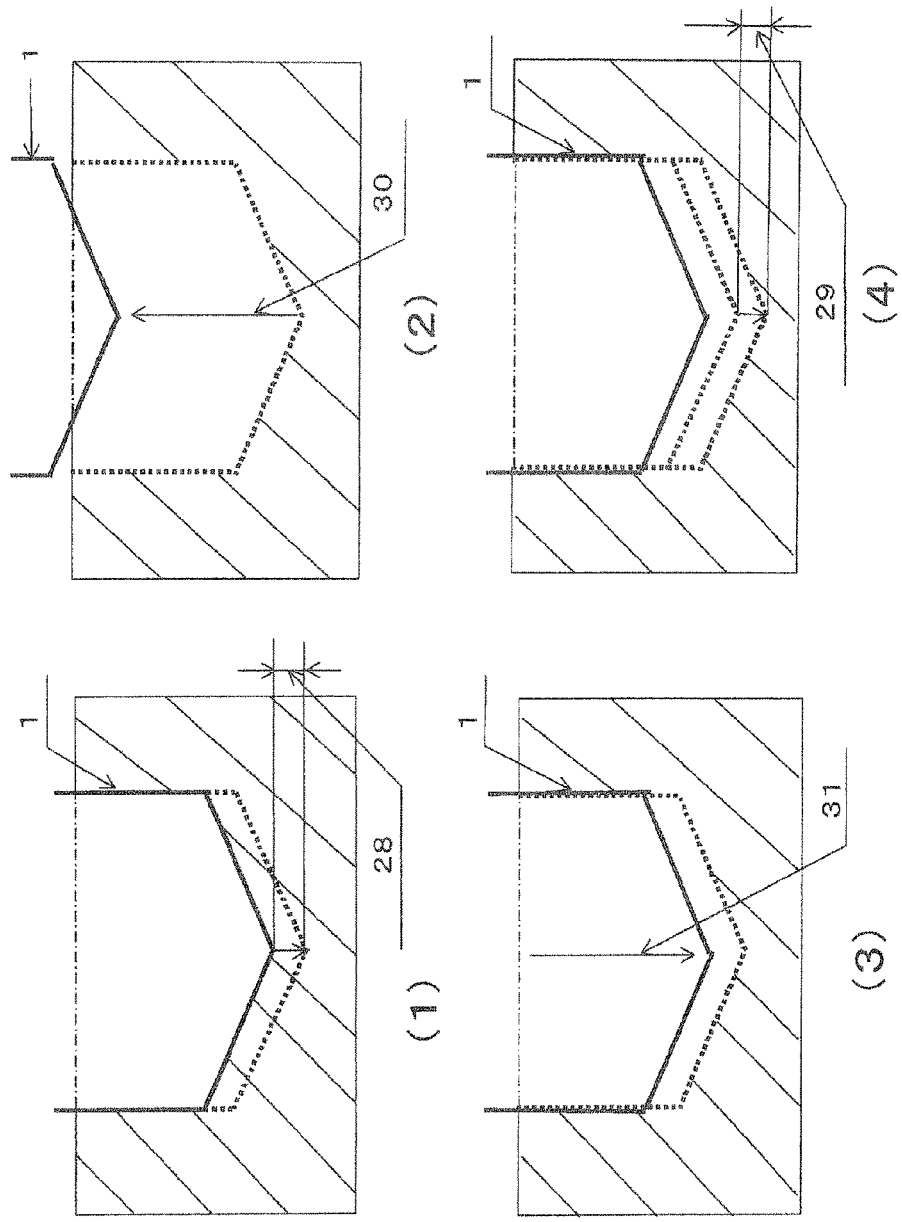
FIG. 12 shows an operating order for a step feed.

On the other hand, FIGS. 12(1)-12(4) show an operating sequence of a step feed using the small-diameter drill 1 of the present invention. As shown, after a cutting 28 shown in FIG. 12(1) has been performed, in other words, after a step depth has been cut, the small-diameter drill 1 is temporarily moved out of the entrance of the drilled hole by a step back 30, as shown in FIG. 12(2). Then, in order to cut a next step depth, the small-diameter drill 1 is returned to a position near the drilling point by a next step forward 31, as shown in FIG. 12(3), thereby continuing a predetermined cutting 29, as shown in FIG. 12(4).

Here, "step feed" means a process of repeatedly performing the steps shown in FIGS. 12(1)-12(4). By performing such a step feed, it is possible to exactly remove the cutting chips accumulated in the flute 4, even when drilling a deep hole. "Step back 30" means a step of temporally moving the small-diameter drill 1 out of the drilled hole after cutting a step amount. "Step forward 31" means a step of returning the small-diameter drill 1 to a position near the drilling point after the step back 30 has been performed.

Figure 13:
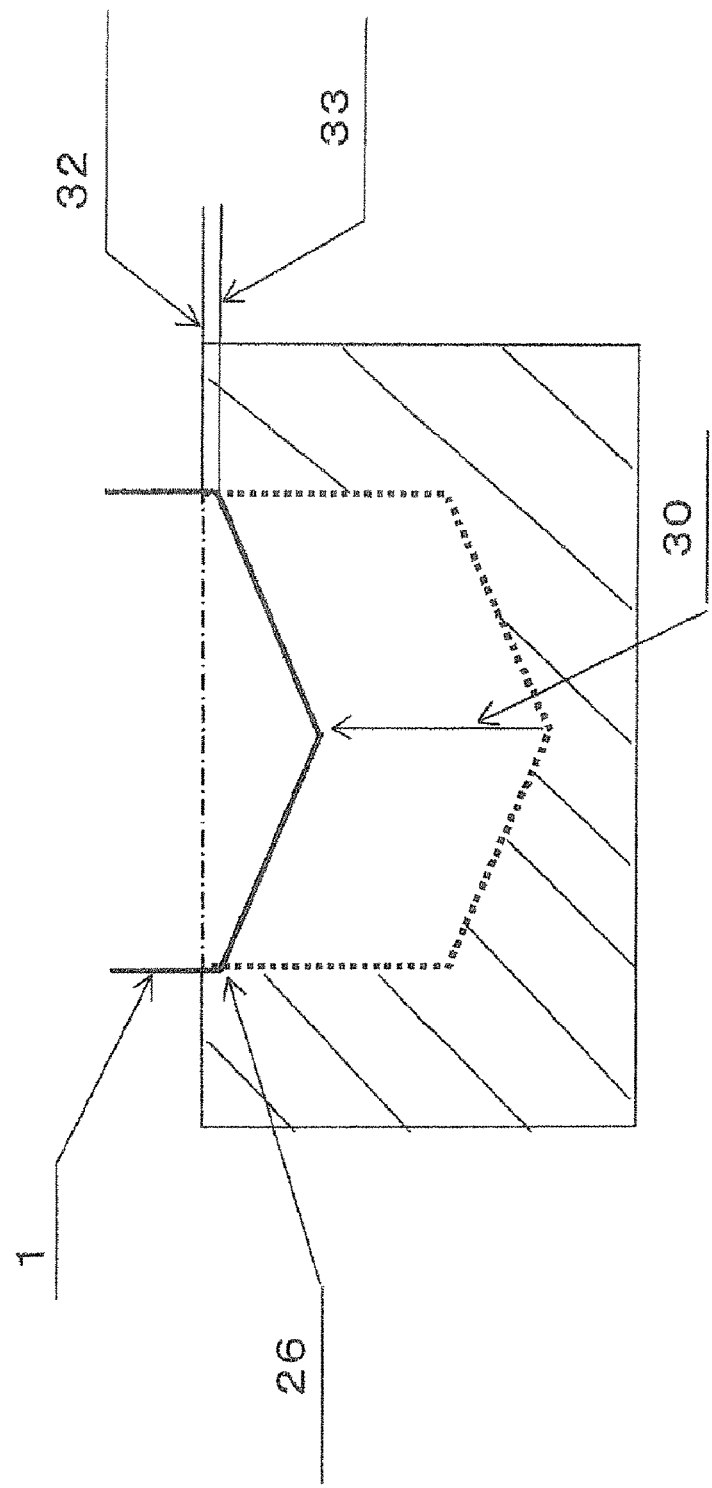
FIG. 13 shows a position of an outer peripheral corner during a step back.

The micro deep hole drilling method of the present invention will be explained by showing an example of drilling a deep hole having a depth which is 50 or more times the diameter of the drilled hole, with reference to FIG. 13. FIG. 13 shows an outer circumferential corner position 33 of the outer circumferential corner 26 of the small-diameter drill 1 of the present invention at a time a step back 30 is being performed. Preferably, as shown in FIG. 13, the outer circumferential corner position 33 of the small-diameter drill 1 during a step back 30 is in the drilling direction of a hole (defined as minus direction) inwardly from the end face 32 of the entrance of the drilled hole, or in other words, the outer circumferential corner position 33 is inside the drilled hole. Namely, the outer circumferential corner position 33 is located within the drilled hole, at a position away from the end face 32 of the entrance of the drilled hole to an extent which is preferably at least 0.03 times and at most 1.0 times the drill diameter 2.

Usually, in a step feed, after forming a predetermined depth of cut 28, the outer circumferential corner position 33 of the small-diameter drill 1 is moved to a position from which it can exactly move away from the end face 32 of the entrance of the drilled hole (defined as positive direction), or in other words, move to the outside of the drilled hole. In this way, the cutting chips can be removed exactly.

However, when drilling an extremely deep hole whose L/D ratio exceeds 50, a small-diameter drill 1 is usually employed in which the length 12 of the neck section 6 is very long. In this way, once the outer circumferential corner 26 of the small-diameter drill 1 is moved back to a position capable of allowing itself to move away from the end face 32 of the entrance of the drilled hole during a step back 30, the small-diameter drill 1 will be shaken from side to side due to the rotation of the tool. As a result, when the small-diameter drill 1 is again returned into the drilled hole, there is a possibility that the drill itself will be deviated from its correct position or broken.

For this reason, it is preferable that the outer circumferential corner 26 of the small-diameter drill 1 during a step back 30 be located in the drilling direction of the hole, inwardly away from the end face 32 of the entrance of the drilled hole, i.e., inside the drilled hole. In this way, it becomes possible to perform a stabilized drilling without causing the small-diameter drill 1 to be shaken from side to side.

Conventionally, if a tool diameter is large or an L/D ratio is not so large, a feeding speed of the tool is usually 10 to 20 m/min. However, when performing a micro deep hole drilling for drilling an extremely deep hole having a diameter of 1 mm or less and a depth greater than 50 times the hole diameter, if a feeding speed for moving the small-diameter drill 1 is too fast during non-drilling time interval, the tool is apt to vibrate because of a long under neck length 17 of the small-diameter drill 1. On the other hand, if the feeding speed for moving the small-diameter drill 1 is too slow, there will be a possibility that the inner peripheral surface of a drilled hole will become deteriorated because of an extended time during which the cutting chips and the inner peripheral surface of the drilled hole are in contact. Besides, such an extended time causes an inefficiency in hole drilling in view of an actual practice. Here, "non-drilling time interval" means a time interval during which, among a series of step feed, the small-diameter drill 1 is temporarily moved back to a position near the end face 32 of the entrance of the drilled hole, and then returned back to a position near the drilling point within a drilled hole.

Therefore, regarding the micro deep hole drilling method of the present invention, it is preferable that the feeding speed of moving the small-diameter drill 1 during non-drilling period in a step feed be at least 1 m/min and at most 4 m/min.

Using the present invention under the conditions described above, it becomes possible to obtain an acceptable and stable positioning precision by virtue of the new method of forming a guide hole. Further, by performing a drilling while repeating the above steps, it becomes possible to realize a hole drilling having a high straightness even when an L/D ratio is 15 or more. Moreover, by forming a guide hole having an acceptable roundness, it is possible to perform a stable drilling without causing a vibration of the small-diameter drill 1 of the present invention, thus making it possible to extend a usable life for the small-diameter drill 1.

A feature of the present invention is to form a guide hole using a ball end mill having outer peripheral cutting edge(s). As a first function of forming a guide hole, it becomes possible to smoothly cut a hole so as to form a smooth inner periphery surface of a guide hole by using a ball end mill having outer peripheral cutting edge(s), thereby improving a guide hole precision and thus ensuring a guide hole with fewer burrs and an acceptable roundness.

There are several types of end mills, such as square end mills and corner radius end mills having outer peripheral cutting edge(s). However, these mills are unstable because they get into contact with hole inner surface from portions near their outer peripheral ends at the time of biting, thus rendering it impossible to ensure an acceptable roundness. In contrast, if a ball end mill is used, since an area near the chisel comes into contact and then the tool diameter increases gradually, it is possible to ensure a stable drilling with biting. Besides, it becomes possible to ensure an extremely good roundness for a guide hole formed by the outer peripheral cutting edge(s).

A ball end mill does not need a chip pocket which is otherwise needed for treating the cutting chips in a normal drill. Besides, since it is possible to perform a drilling in an acceptable rigidity, it is allowed to remarkably improve a guide hole precision. Usually, since a ball end mill utilizes only a ball cutting edge when in using, there is no need to have a long flute length which is otherwise necessary in a normal drill, thereby allowing the outer peripheral cutting edge to be short and the outer peripheral flute to be shallow. Moreover, since the ball cutting edge is ground with a high precision in order to perform a three-dimensional cutting, the ball end mill will not be shaken, thus making it possible to improve the precision of the roundness of a guide hole.

Figure 14:
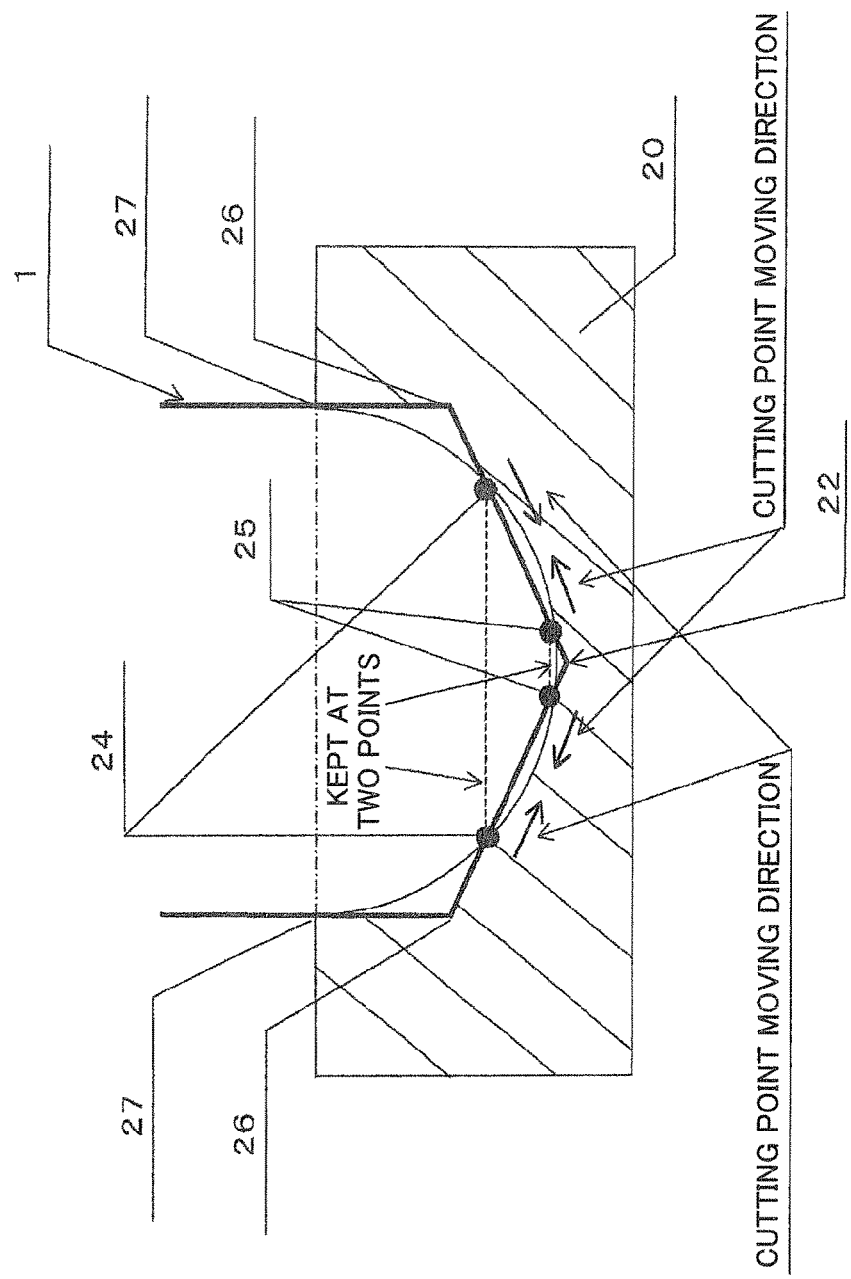
FIG. 14 shows an example of the drilling method of the present invention.
Figure 15:
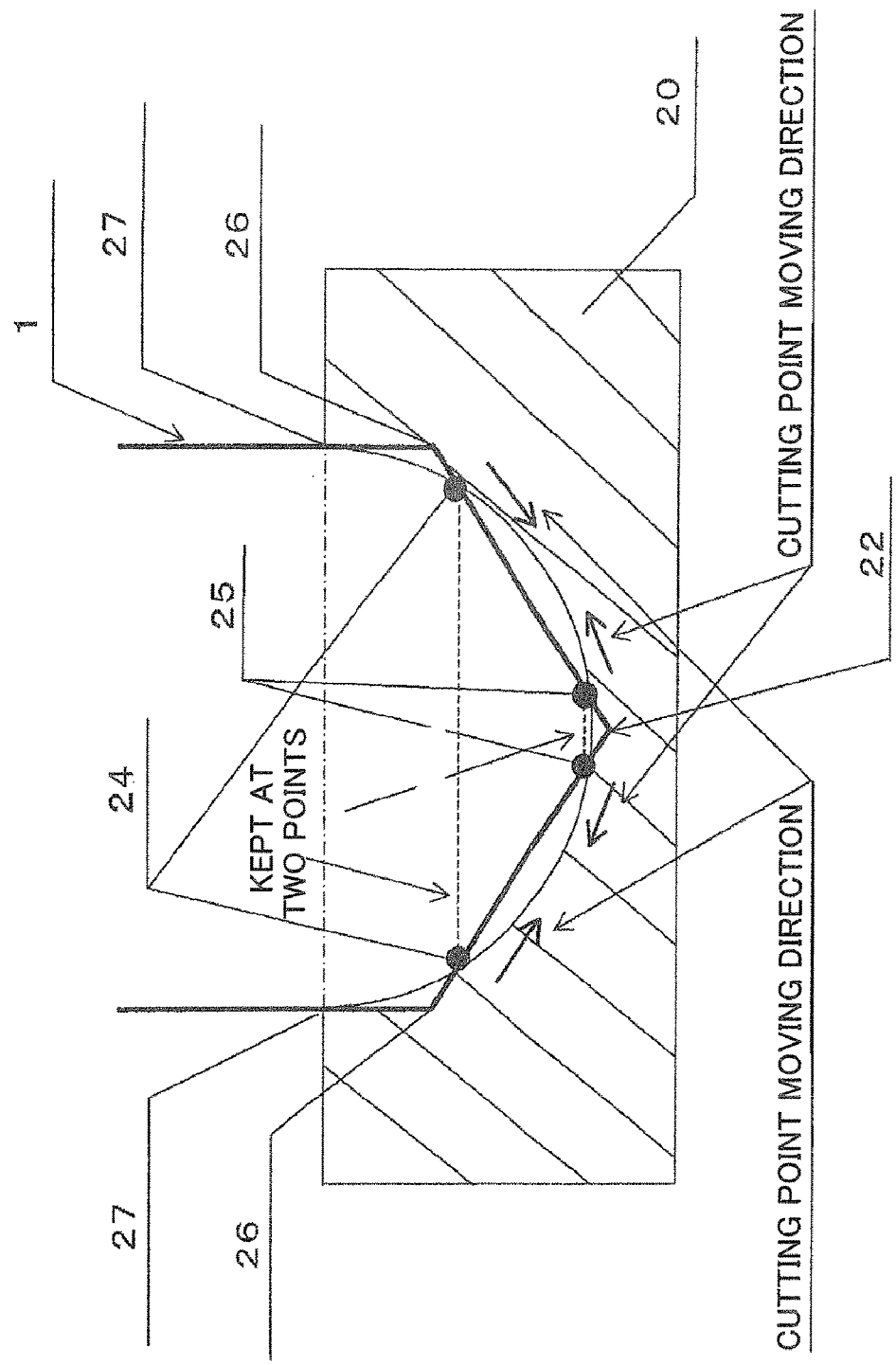
FIG. 15 shows another example of the drilling method of the present invention.

A second function of using a ball end mill in forming a guide hole in the present invention can be explained with reference to FIG. 14 and FIG. 15. FIG. 14 and FIG. 15 are drawings showing a reason as to why it is possible to greatly suppress a vibration that occurs upon a biting action of the small-diameter drill 1 of the present invention in micro deep hole drilling.

As can be seen in the examples of the present invention shown in FIG. 14 and FIG. 15, a ball end mill, which conventionally moves and cuts in a direction perpendicular to the rotation axis of the end mill, is moved only in the direction of the rotation axis of the end mill. Namely, the method of forming a guide hole using the tip of the ball end mill of the present invention can provide a guide hole whose bottom surface is in an approximately hemispherical shape. In a micro deep hole drilling using a small-diameter drill 1, the outer peripheral corner 26 bites into the corner 27 of the guide hole and the cutting point 24 moves in the cutting-point moving direction regardless of the tip angle 16 of the small-diameter drill 1. At the same time, the chisel 22 of the small-diameter drill 1 bites into the work piece 20 and the cutting point 25 moves in the cutting-point moving direction. Namely, the small-diameter drill 1 being used in micro deep hole drilling is held at both cutting points 24 and 25, thereby rendering it possible to ensure a stabilized micro deep hole drilling.

The stability of the small-diameter drill 1 used in micro deep hole drilling varies greatly depending on how a vibration of the tool is suppressed during a time period from the start of biting action of the small-diameter drill 1 until the bottom surface of the guide hole has been completely drilled. The method of forming a guide hole using a ball end mill of the present invention exhibits a remarkable effect at this stage. In contrast, when drilling a guide hole using a conventional drill, once a vibration becomes large in drilling the bottom surface of a guide hole, a final precision will decrease remarkably and the small-diameter drill 1 is apt to receive a damage.

Figure 16:
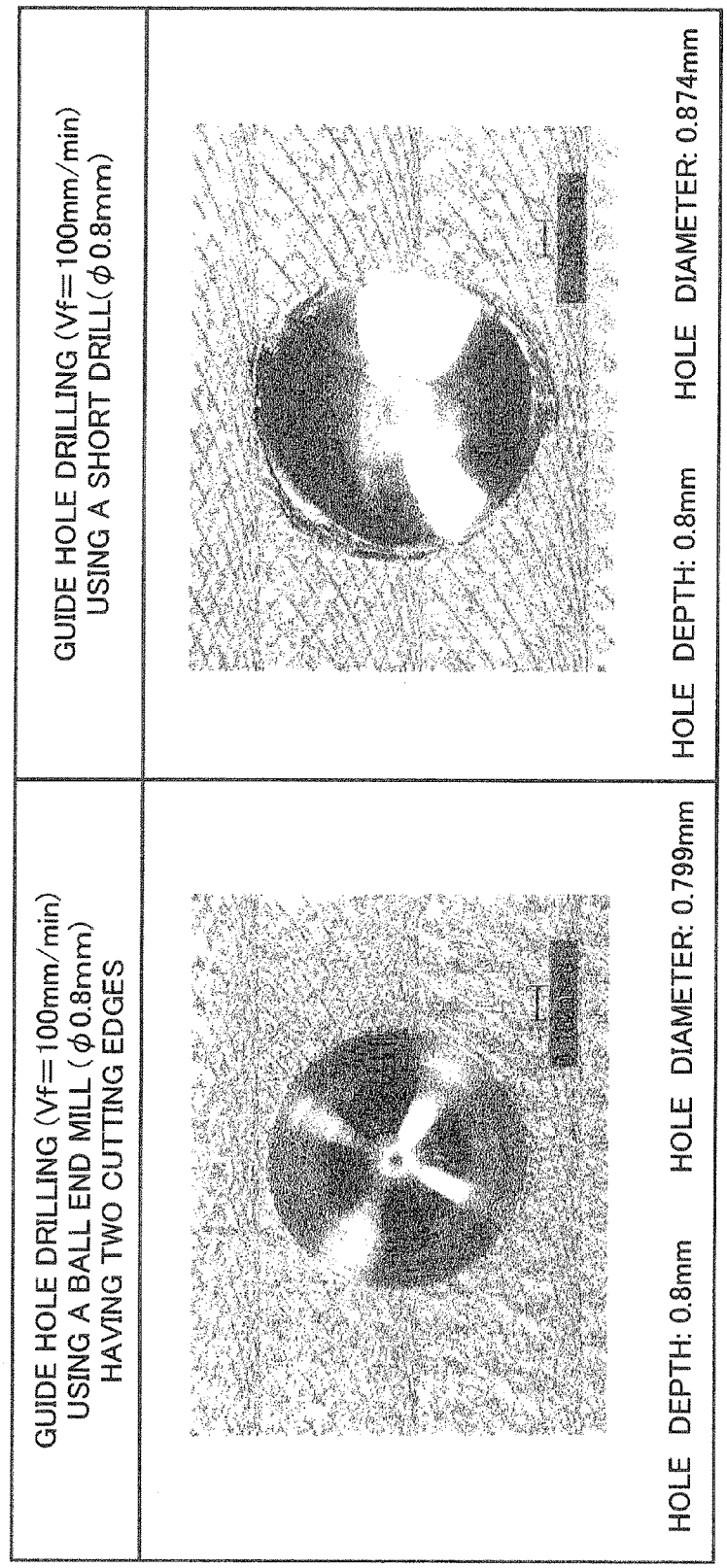
FIG. 16 shows an example of guide hole comparison between an example of the present invention and a conventional example.

FIG. 16 shows the states of actually formed guide holes that were formed by the ball end mill of the present invention and by a conventional drill having a short overall length, respectively. As the testing condition, a wet cutting was performed to form guide holes up to a depth of 0.48 mm on one surface of an SUS304 block which servers as a work piece, under the following conditions. Namely, number of revolution is 20,000 $min^{-1}$, feeding speed is 100 mm/min, and a step amount each time is 0.16 mm.

As shown in FIG. 16, a guide hole formed by using the ball end mill has an extremely high precision, providing an acceptable roundness. In contrast, when drilling a guide hole using only a normal drill, burrs will occur in the guide hole, producing an unacceptable roundness and thus failing to provide a desired precision. Therefore, it is understood that when the small-diameter drill 1 being used in micro deep hole drilling is guided by the inner peripheral surface of the guide hole formed by a conventional drill, a wobbling vibration occurs, inducing an abnormal wear of the small-diameter drill 1, hence resulting in a low straightness for the drilled hole.

Preferably, a ball end mill is provided with not too many cutting edges, so as to ensure an ability of removing cutting chips and thus forming a guide hole with a high precision. For example, only two cutting edges are provided in a ball end mill. Further, it is preferable that a chisel width of a ball end mill be in a range of 0.01 mm or less. This is because such a chisel width makes it possible to decrease a cutting resistance when the chisel bites into the work piece, thereby avoiding a wobbling of the ball end mill and thus ensuring the formation of a guide hole with a high precision.

Here, one of the necessary conditions required by the present invention is that the diameter of a guide hole is set at least 0.90 times and at most 1.05 times the drill diameter 2 of the small-diameter drill 1. In this way, it is possible to suppress a cutting resistance on the small-diameter drill 1 being used in a micro deep hole drilling.

If the diameter of a guide hole is smaller than 0.90 times the drill diameter 2 of the small-diameter drill 1, a cutting resistance on the small-diameter drill 1 being used in a micro deep hole drilling will be too large, causing the small-diameter drill 1 to bend, thus rendering it impossible to drill a micro deep hole with a high straightness. On the other hand, if the diameter of the guide hole is larger than 1.05 times the drill diameter 2 of the small-diameter drill 1, a too large gap will occur between the guide hole inner wall and the small-diameter drill 1 being used in the micro deep hole drilling, rendering the small-diameter drill 1 unstable and thus unfavorably affecting the straightness of a drilled deep hole.

In the present invention, the depth of a guide hole is set at least 0.6 times and at most 2 times the drill diameter 2 of the small-diameter drill 1. In this way, it is possible to provide a guide hole with an inner peripheral surface ensured by a constant hole diameter in the deep hole direction for guiding the outer peripheral surface of the small-diameter drill 1 in the guide hole, thereby rendering it possible to suppress a wobbling of the small-diameter drill 1 being used in a micro deep hole drilling and to perform a micro deep hole drilling with an acceptable straightness. With the depth described above, when forming a guide hole with a ball end mill, cutting chips will not get clogged in the flute of the ball end mill, thereby ensuring an excellent roundness and a precise positioning for a guide hole.

Here, if the depth of a guide hole is less than 0.6 times the drill diameter 2 of the small-diameter drill 1, the depth of the guide hole will be too shallow and is not capable of sufficiently guiding the small-diameter drill 1 being used in micro deep hole drilling, making the drilling unstable and rendering it impossible to ensure a sufficient hole precision. On the other hand, if the depth of a guide hole is greater than 2 times the drill diameter 2 of the small-diameter drill 1, the cutting chips will be clogged in the ball end mill at the time of forming the guide hole, thus causing a vibration and it becomes impossible to form a guide hole with a sufficient precision.

Figure 17:
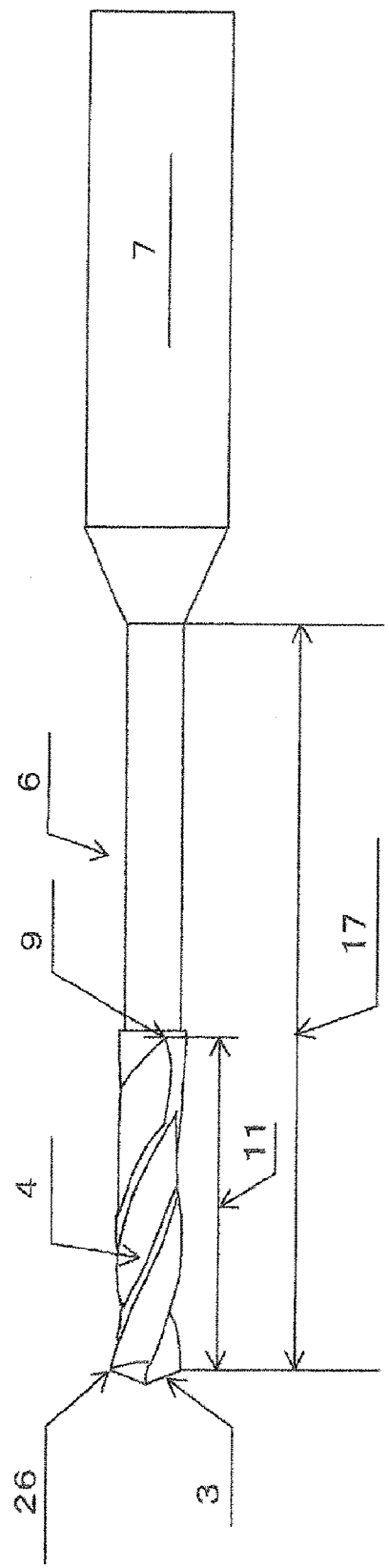
FIG. 17 is a front view showing a small-diameter drill of the present invention.

Next, description will be given to explain some features in the shape of the small-diameter drill 1 that can perform a drilling while repeating the steps prescribed by the present invention. As shown in FIG. 17, in one example of a small-diameter drill 1 used in the micro deep hole drilling method of the present invention, the flute length 11 is at least 5 times and at most 10 times the drill diameter 2 of the small-diameter drill 1, and the length 12 of the neck section 6 is 10 or more times the drill diameter 2 of the small-diameter drill 1.

By drilling a hole while repeating the above steps using the small-diameter drill 1, the cutting chips are allowed to at first stay inside the flute 4 and then move out during a step back 30, thereby inhibiting the chips from getting bitten into the drilled hole, thus ensuring an acceptable straightness for a drilled hole. In fact, this effect can be obtained by combining the above feature with the tool stability based on the new guide hole drilling method, which is a feature of the drilling method of the present invention.

Figure 18:
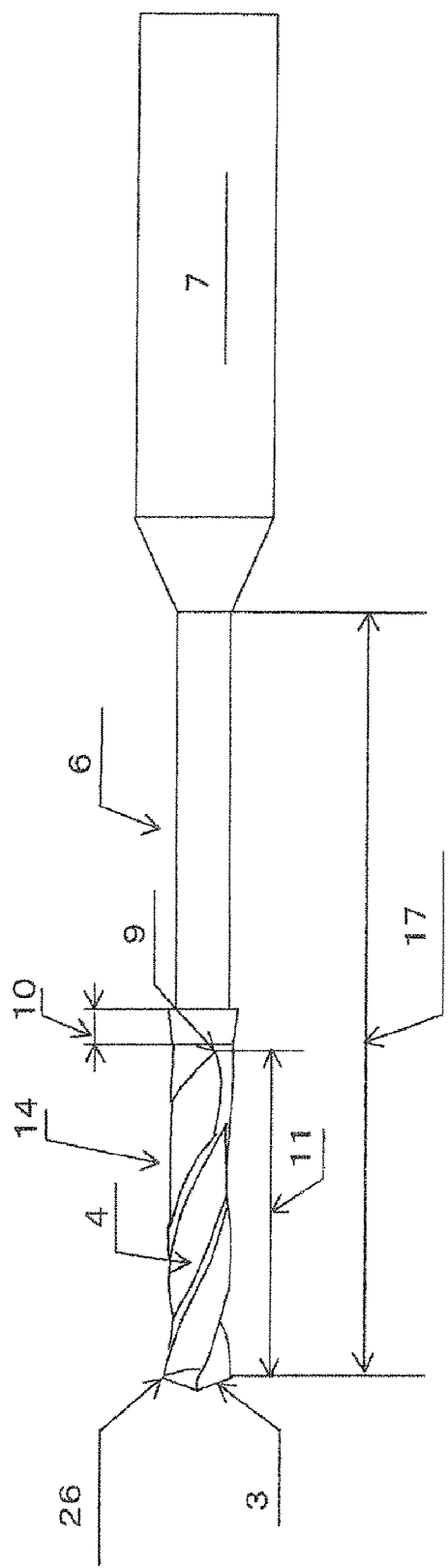
FIG. 18 is a front view showing another embodiment of FIG. 17.

Moreover, as shown in FIG. 18, in another embodiment of the small-diameter drill 1 used in the micro deep hole drilling method of the present invention, a tapered expanded-diameter portion 10 facing the shank section 7 is provided between the flute 4 and the neck section 6, with the flute length 11 being at least 5 times and at most 10 times the drill diameter 2 of the small-diameter drill 1, and the length 12 of the neck section 6 being 10 or more times the drill diameter 2 of the small-diameter drill 1.

Performing a deep hole drilling while repeating the above steps using the small-diameter drill 1 described above can provide the following effects. Namely, since a tapered expanded-diameter portion 10 is provided between the flute length 11 and the neck section 6, the cutting chips flying out from the end 9 of the flute 4 are pushed back into the flute 4, so that those chips can be surely accumulated inside the flute 4. In this way, those cutting chips can be surely removed during a step back 30 without getting bitten into the neck section 6, thereby making it possible to obtain a drilled hole having an acceptable straightness.

In fact, the tapered expanded-diameter portion 10 is not absolutely necessary for the drilling method of the present invention. However, the existence of the tapered expanded-diameter portion 10 has the effect of preventing the cutting chips from getting bitten into the neck section 6, thereby ensuring a further stabilized micro deep hole drilling.

Up till now, a micro deep hole drilling process with a drilling diameter being 1 mm or less and a drilling depth being more than 50 times the drilling diameter had been almost impossible itself, letting alone a drilling precision. This is because when using a small-diameter drill 1 having an extension length 17 (starting from the neck-end) which is 50 or more times the drill diameter 2, a drill rigidity will remarkably decrease, and a drilling stability will greatly depend on the precision of the guide hole. In contrast, the present invention makes it possible to form a guide hole by using a ball end mill having outer peripheral cutting edge(s) and feeding the end mill only in the direction of the rotation axis of the end mill, thereby ensuring an extremely good roundness in a guided area drilled by the outer peripheral cutting edge(s).

In addition, since the present invention makes it possible to shape the bottom surface of a guide hole into an approximately hemispherical configuration, it becomes possible to greatly inhibit the vibration of the small-diameter drill 1, regardless of a tip angle 16 of the small-diameter drill 1 being used in the micro deep hole drilling, thus ensuring a stabilized micro deep hole drilling, as explained in FIG. 14 and FIG. 15. Further, since the present invention, in addition to the effects provided by the aforementioned guide hole, uses a small-diameter drill 1 to repeat the above steps while drilling a hole, it is possible to inhibit the cutting chips from getting bitten inside the hole during a drilling process, thereby further improving a straightness for a drilled hole.

According to the present invention, in order to minimize a side-to-side vibration of the tool, it is preferable that the outer peripheral corner position 33 of the small-diameter drill 1 during a step back 30 be located in the hole drilling direction inwardly beyond the end face 32 of the entrance of the drilled hole. In fact, such a position 33 is apart from the end face 32 of the entrance of the drilled hole to an extent which is at least 0.03 times and at most 1.0 times the drill diameter 2 of the small-diameter drill 1.

When drilling a micro deep hole having an L/D ratio of 50 or more, a small-diameter drill 1 is used which has a neck section 6 having a very long length 12. During a step back 30, once the outer peripheral corner 26 of the small-diameter drill 1 is moved back to a position capable of allowing itself to exactly move away from the end face 32 of the entrance of the drilled hole, the small-diameter drill 1 will vibrate from side to side due to the rotation of the tool. As a result, when the small-diameter drill 1 is returned back into the drilled hole, the drill is likely to have a position deviation.

For this reason, it is preferable that the outer peripheral corner position 33 of the small-diameter drill 1 during a step back 30 be located in the hole drilling direction inwardly beyond the end face 32 of the entrance of the drilled hole. In other words, it is preferable that the outer peripheral corner position 33 be not returned to a position capable of exactly allowing itself to move away from the end face 32 of the entrance of the drilled hole. In this way, it is possible to realize a more stable drilling without the rotating small-diameter drill 1 wobbling from side to side.

Here, if the outer peripheral corner position 33 is located at a distance apart from the end face 32 of the entrance of the drilled hole and such a distance is shorter than 0.03 times the drill diameter 2 of the small-diameter drill 1, it will be impossible to sufficiently inhibit the side-to-side vibration of the drill. On the other hand, if the above distance is larger than 1.0 times the drill diameter 2, there will be another problem that the cutting chips accumulated inside the flute 4 will not be easily removed. For this reason, it is preferable to adopt the above-described range for positioning the outer peripheral corner position 33 of the small-diameter drill 1. By virtue of this, it is possible to stabilize the behavior of the small-diameter drill 1 during a step back 30, avoid a side-to-side vibration and thus improve a straightness.

According to the micro deep hole drilling method of the present invention, it is preferable that the speed of feeding the small-diameter drill 1 during non-drilling be at least 1 m/min and at most 4 m/min. Conventionally, when a tool diameter is large or an I/O ratio is not so large, the speed of feeding the tool is typically 10 m/min to 20 m/min.

However, during a micro deep hole drilling process for drilling an extremely deep hole having a hole diameter of 1 mm or less and a hole depth greater than 50 times the hole diameter, if the speed of feeding the small-diameter drill 1 during a non-drilling is less than 1 m/min, such a speed is too slow so that a time period for the cutting chips to contact the inner peripheral surface of the drilled hole becomes long. As a result, the inner peripheral surface of the drilled hole will become unacceptable and thus a drilling efficiency is low in view of an actual practice.

On the other hand, if the speed of feeding the small-diameter drill 1 during a non-drilling is greater than 20 m/min, such a speed is too fast. As a result, since the length 12 of the neck section 6 of the small-diameter drill 1 is long, the tool is apt to vibrate, thus causing a possibility of damaging the inner peripheral surface of the drilled hole.

Next, with reference to FIG. 25 and FIG. 26, description will be given to a through hole drilling method, which is one of micro deep hole drilling methods of the present invention. Conventionally, when drilling a micro through hole using a drill, it was difficult to maintain a drilling precision. Particularly, where a precision of hole inner surface was required, it was necessary to perform a reaming process after drilling, thus rendering it impossible to ensure a highly efficient drilling. In addition, when a hole to be drilled is a deep hole, it was impossible to drill the hole with a drill.

The inventors of the present invention have also found the following advantages. Namely, as shown in FIG. 1, if the maximum diameter of a tapered expanded-diameter portion 10 is made to be approximately the same as the drill diameter 2, when drilling a through hole, the expanded-diameter portion 10 has not only a guiding effect, but also a reamer effect that improves the precision of a drilled hole.

Figure 20:
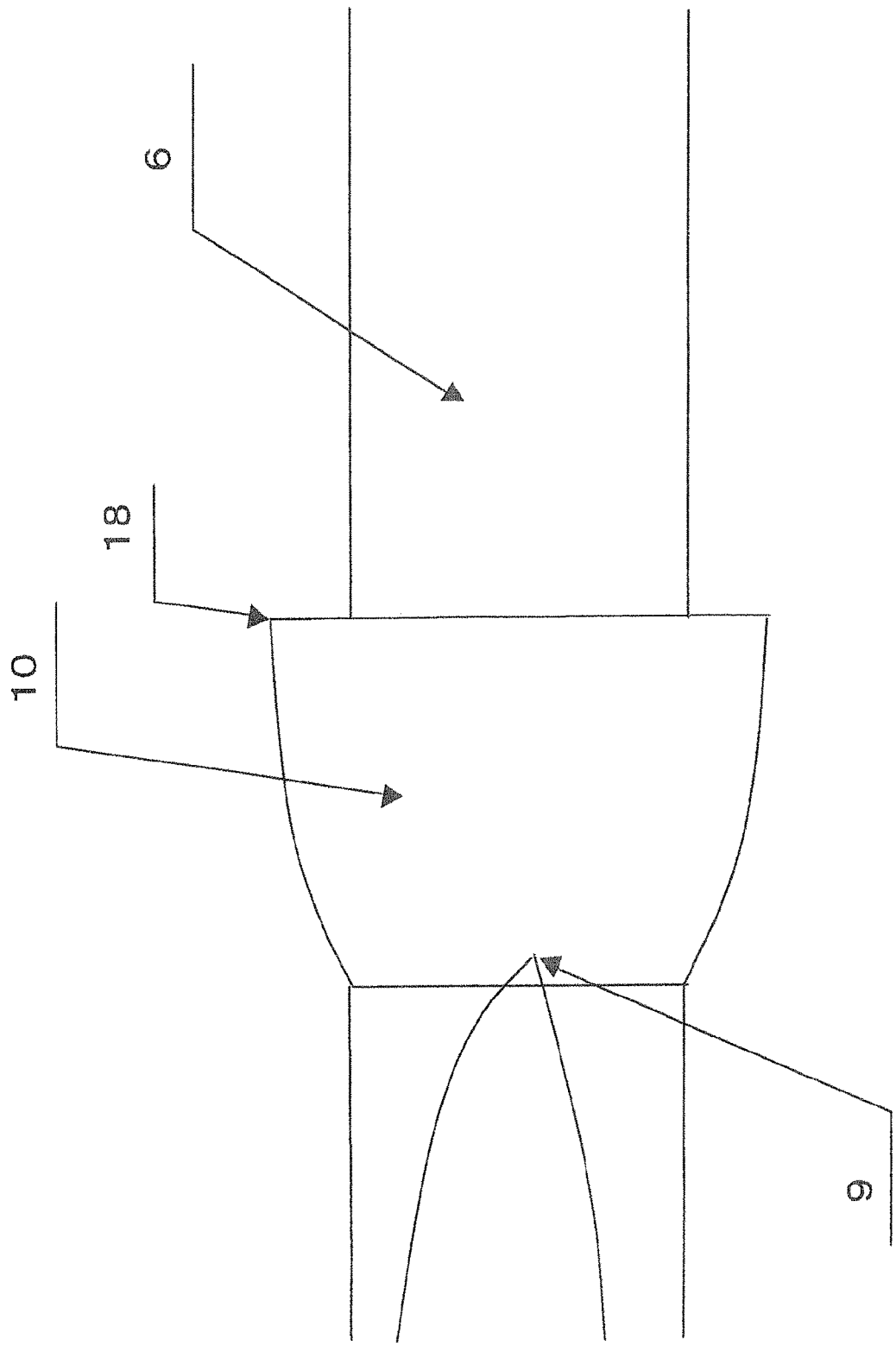
FIG. 20 is a schematic view showing another shape of an expanded-diameter portion shown in FIG. 2.
Figure 21:
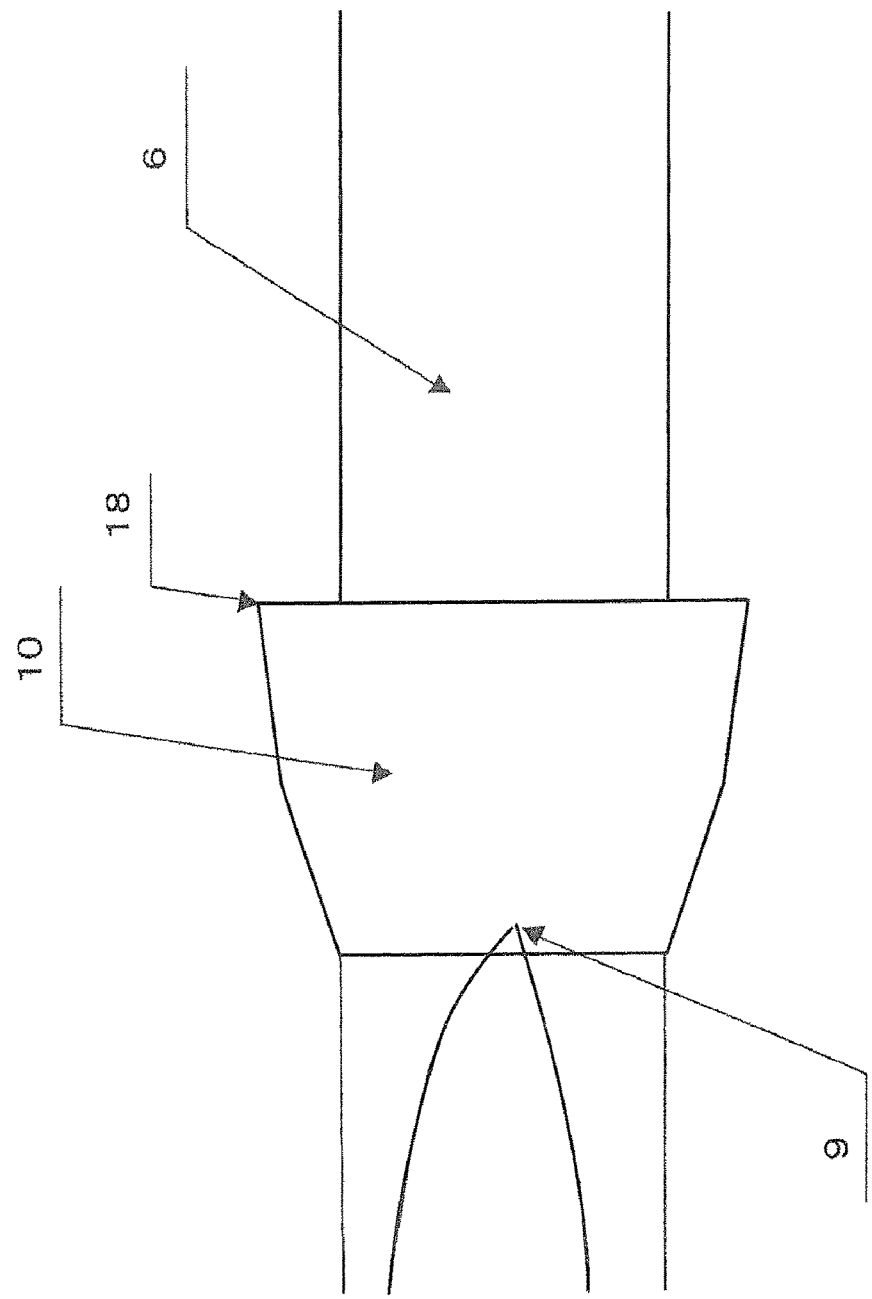
FIG. 21 is a schematic view similar to FIG. 20, showing another shape of the expanded-diameter portion.
Figure 22:
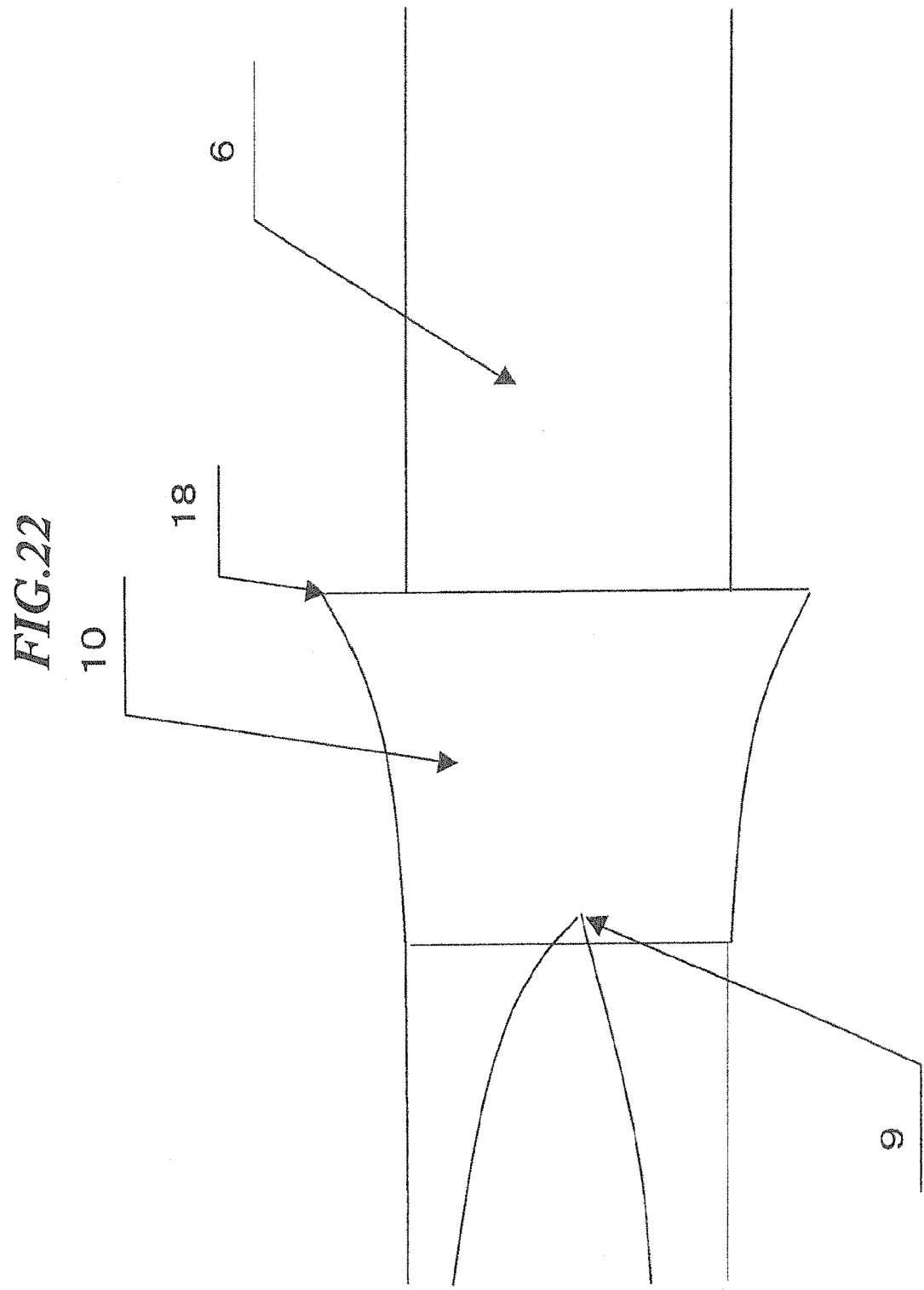
FIG. 22 is a schematic view similar to FIG. 20, showing another shape of the expanded-diameter portion.

In particular, the inventors found that if the maximum-diameter portion 18 of the expanded-diameter portion 10 has a cylindrical shape having an approximately the same diameter as the drill diameter 2 and having a certain length in the length direction of the small-diameter drill 1, it will be possible to further improve a through hole precision and allow the cylindrical maximum-diameter portion to act as an improved guide for the drill section 5 during a drilling process. As to the shape of the expanded-diameter portion 10 extending to the maximum-diameter portion 18, it is allowed to select other types than the linearly tapered configurations, such as those shown in FIGS. 20 to 22.

Figure 23:
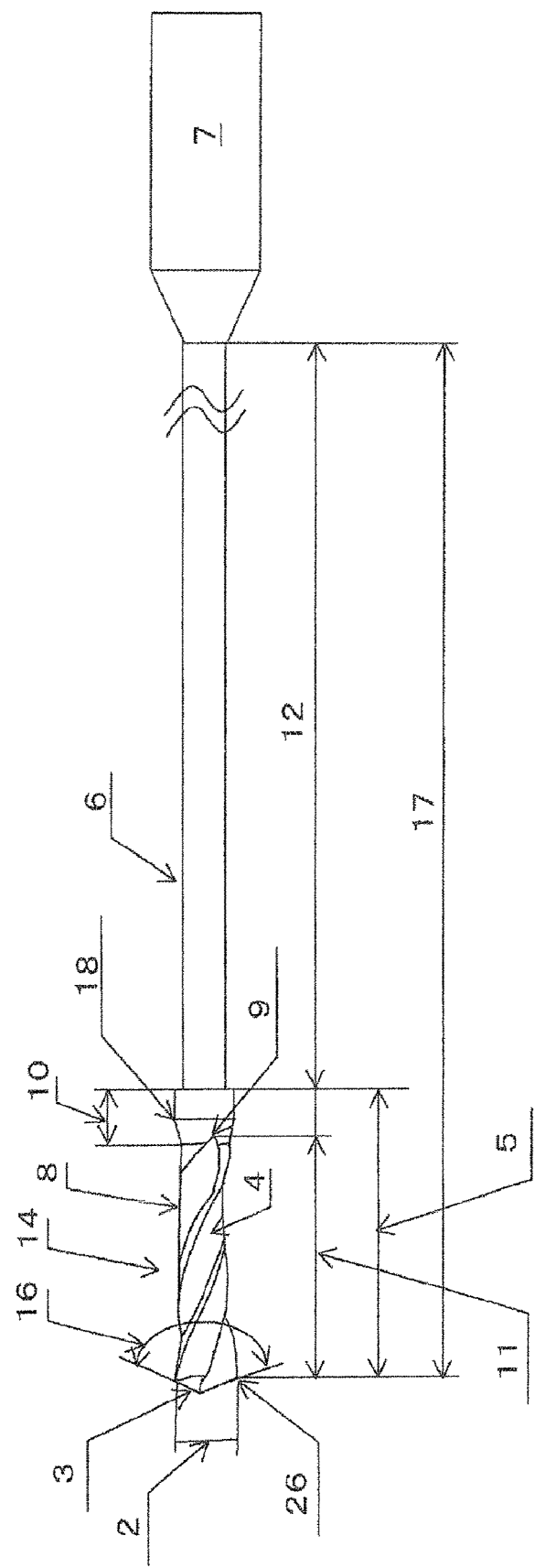
FIG. 23 is a front view showing a small-diameter drill of the present invention.
Figure 24:
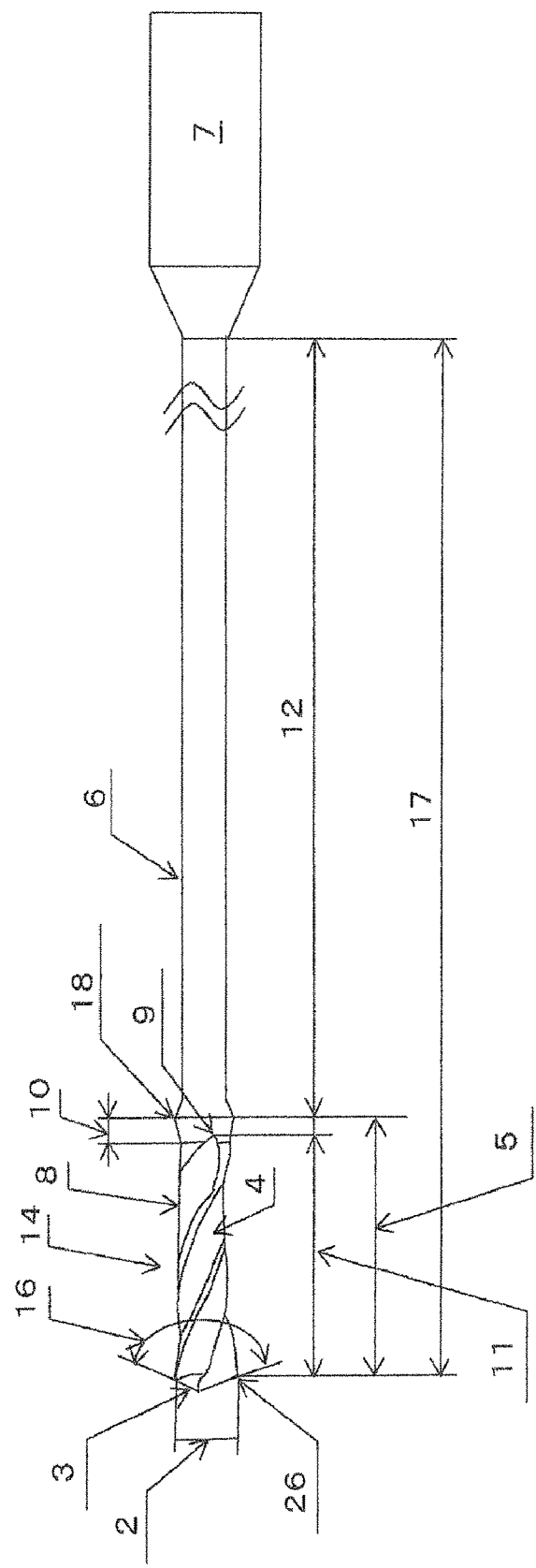
FIG. 24 shows another example of the small-diameter drill of the present invention.

In the present invention, a micro deep hole drilling method for drilling a micro deep through hole with an acceptable precision employs a small-diameter drill 1 having a special shape shown in FIG. 1, FIG. 23 and FIG. 24. Namely, the small-diameter drill 1 has an expanded-diameter portion 10 located between the drill section 5 and the neck section 6, containing a maximum-diameter portion 18 enlarged toward the shank section 7 to a diameter which is at least approximately equal to the drill diameter 2.

The micro deep hole drilling method of the present invention is characterized by the followings. Namely, the method employs a small-diameter drill 1 in which the flute length 11 is at least 5 times and at most 10 times the drill diameter 2, and the length 12 of the neck section 6 is 10 or more times the drill diameter 2. The drilling is performed while repeating the step feed until at least the maximum-diameter portion 18 of the expanded-diameter portion 10 that has approximately the same diameter as the drill diameter 2 of the small-diameter drill 1, or the cylindrical portion that has approximately the same diameter as the drill diameter 2, completely goes through the drilled hole.

A process up to the middle stage of the drilling method of the present invention, as shown in FIG. 25, contains steps (a)→(b)→(c) which are carried out in such an order to cut in a direction indicated by down-facing arrows in the drawing by continuously cutting a predetermined step depth 41. When drilling a hole while repeating the step feed, the maximum-diameter portion 18 of the expanded-diameter portion 10, or the maximum-diameter portion 18 combined with a cylindrical portion having the same diameter as the expanded-diameter portion 10, scrubs the inner surface of a drilled hole, and such a scrubbing effect functions to improve the roughness and precision of the inner surface of the drilled hole. In this way, the roughness of the inner surface does not become poor even though the tool may be worn, and no uneven areas occur which is otherwise caused due to the wear.

Moreover, a precision of a hole inner surface will become extremely good by virtue of the scrubbing effect provided by the maximum-diameter portion 18, thus making it possible to realize a highly efficient finishing process using only the small-diameter drill 1. Furthermore, since the small-diameter drill 1 of the present invention has the maximum-diameter portion 18 having an approximately the same diameter as the drill diameter 2, the maximum-diameter portion 18 also functions as a guide for step feed and thus suppresses a side-to-side vibration of the small-diameter drill 1 in the drilled hole, thereby ensuring an improved straightness for a drilled hole.

In addition, by providing a maximum-diameter portion 18, the cutting chips generated during a drilling are kept from biting into the neck section 6 and the like, thereby making it possible to improve a straightness for a drilled hole.

A state of the final stage in drilling a through hole using the drilling method of the present invention is shown in FIG. 26(*a*), and a prior art showing the final stage in drilling a through hole is shown in FIG. 26(*b*). With a conventional method of drilling a through hole, a penetration length 39 of the small-diameter drill 1 is defined as a length the drill tip protrudes from the work piece, and is sufficient as long as the drill tip extends a little more than the hole depth, as shown in FIG. 26(*b*).

In carrying out the drilling method of the present invention, the small-diameter drill 1 is intentionally caused to penetrate further deeper than the hole depth until the maximum-diameter portion 18 of the expanded-diameter portion 10 provided behind the drill section 5 completely comes out of the exit 38 of the drilled hole. Namely, as shown in FIG. 26(*a*), when using the method of the present invention, a drilling is performed until a maximum-diameter portion 18 of an expanded-diameter portion 10 having a tapered Portion whose diameter has been enlarged toward the shank section 7 to the same diameter as the drill diameter 2, comes out of the drilled hole. Thus, a drilling process according to the present invention means a process lasting up to this stage.

Therefore, as shown in FIG. 26(*a*), the penetration length 39 of the small-diameter drill 1 of the present invention is considerably greater than that in the conventional drilling method. By virtue of a synergetic effect produced by a feature in the shape of the small-diameter drill 1 and a feature in the drilling method of the present invention, the drilling method of the present invention can provide an excellent hole inner surface precision over the entire inner surface from the hole entrance 37 to the hole exit 38 of the through hole, and is capable of ensuring an excellent straightness for the drilled hole, regardless of a through hole under a severe condition where the drilled hole diameter is 1 mm or less and the depth is 10 or more times the drilled hole diameter. Such an effect is shown in FIG. 26(*a*) as an inner surface 43 obtained by virtue of the maximum-diameter portion 18 of the expanded-diameter portion 10.

In the present invention, when drilling is performed by repeating step feed, the maximum-diameter portion 18 of the expanded-diameter portion 10, serving as means for improving the precision of a through hole, scrubs the inner surface of a drilled hole. In fact, such a scrubbing effect improves the roughness and the precision of the inner surface of the drilled hole, thereby rendering it possible to obtain a highly precise inner surface over the entire inner surface of the drilled hole from the entrance to the exit of the drilled hole, like the inner surface 43. In addition, since the maximum-diameter portion 18 of the expanded-diameter portion 10 scrubs the hole inner surface, the roughness of the hole inner surface does not become poor even though the tool may be worn and unevenness does not occur which is otherwise caused due to an influence of the wear.

Moreover, by virtue of a scrubbing effect produced by the maximum-diameter portion 18 of the expanded-diameter portion 10, the precision of the hole inner surface becomes extremely good, rendering it possible to perform a highly efficient finishing process using only the small-diameter drill 1. In other words, there is no need for a reaming process to be performed after the drilling process, which is otherwise needed in a conventional drilling process.

In the present invention, a small-diameter drill 1 used in hole drilling has through hole precision improving means. Such through hole precision improving means can provide a scrubbing effect and also serve as a guider for step feed by virtue of an expanded-diameter portion 10 having approximately the same diameter as the drill diameter 2. In this way, it becomes possible to minimize a side-to-side vibration of the small-diameter drill 1 in a drilled hole, thereby further improving a straightness for a through hole.

On the other hand, as shown in FIG. 26(*b*) if a conventional drilling method employs the small-diameter drill 1 of the present invention, though the first half of a drilling process can obtain an inner surface 43 reflecting an advantage provided by the maximum-diameter portion 18 of the expanded-diameter portion 10, but another inner surface 44 fails to obtain the same advantage provided by the maximum-diameter portion 18 of the expanded-diameter portion 10.

In the present invention, "micro deep hole" means a through hole having a hole diameter of 1 mm or less, and a depth of 10 or more times the hole diameter, especially a depth of 15 or more times the hole diameter. For such kind of micro deep hole, it is particularly important that precision be maintained during drilling, so that it is preferable that drilling be performed by guiding the small-diameter drill 1 using a preformed guide hole. Here, the preformed guide hole functions to control the axial direction of the small-diameter drill 1 so that the position of the center of the drilled hole may not deviate.

Namely, other micro deep hole drilling method of the present invention is a micro deep hole drilling method in which a preformed guide hole guides a small-diameter drill 1 in drilling a through hole having a hole diameter of 1 mm or less, and a depth of 10 or more times the hole diameter. The small-diameter drill 1 used in the method of the present invention has the following features. Namely, the small-diameter drill 1 has an expanded-diameter portion 10 expanding in the direction toward the shank section 7 and located between the rear end of the drill section 5 and the neck section 6, having a maximum diameter which is approximately the same as the drill diameter 2. Further, the small-diameter drill 1 has a flute length 11 of at least 5 times and at most 10 times the drill diameter 2 and the neck section 6 has a length which is at least 10 times the drill diameter 2. Drilling is performed while repeating step feed at least until the maximum-diameter portion 18 of the expanded-diameter portion 10 having approximately the same diameter as the drill diameter 2 completely penetrates through the drilled hole.

Preferably, the maximum-diameter portion 18 of the expanded-diameter portion 10 has a cylindrical shape whose diameter is approximately the same as the maximum diameter of that expanded-diameter portion and has a certain length in the length direction of the small-diameter drill 1. This is because such an arrangement is most suitable for further improving the precision of a through hole and can also serve as an improved guide means during a drilling.

Therefore, another drilling method according to the present invention is a micro deep hole drilling method in which a small-diameter drill 1 is used to drill a through hole having a hole diameter of 1 mm or less and a depth of 10 or more times the hole diameter. The small-diameter drill 1 has, between the drill section 5 and the neck section 6, a tapered portion containing a maximum-diameter portion 18 enlarged toward the shank section 7 up to approximately the same diameter as the drill diameter 2, and an expanded-diameter portion 10 that comprises a cylindrical portion having a diameter that is the same as the maximum diameter. Further, the small-diameter drill 1, having a flute length 11 of at least 5 times and at most 10 times the drill diameter 2 and the neck section 6 having a length 12 which is 10 or more times the drill diameter 2, is used to drill a hole while repeating step feed at least until the maximum-diameter portion 18 of the expanded-diameter portion 10 having a diameter that is approximately the same as the drill diameter 2, or the cylindrical portion having a diameter that is approximately the same as the drill diameter 2, completely comes through the drilled hole.

Even when using the above method, it is preferable that the small-diameter drill 1 be guided by a preformed guide hole. In fact, the method of the present invention is particularly suitable for drilling a deep through hole having an L/D ratio of 30 or more.

Moreover, it is preferable that the length of the cylindrical portion which is connected with the maximum-diameter portion 18 having an approximately the same diameter as the drill diameter 2 and which has the maximum-diameter be 2 or less times the drill diameter 2. If the length is greater than 2 times, a cutting resistance during a cutting process will become large.

Further, when drilling a hole in a high-strength ductile steel such as stainless steel, it is preferable that a helix angle of the flute 4 be between 30 and 40 degrees. When drilling a hole in a low-strength ductile alloy such as aluminum alloy or copper alloy, the helix angle of the flute 4 should be between 40 and 50 degrees. In this way, since it is possible to reduce a cutting torque by virtue of these helix angles, it becomes possible to inhibit a problem that the small-diameter drill 1 bends and the drill section 5 or the neck section 6 gets in contact with the inner peripheral surface of the drilled hole, and thus a fluctuation happens in the cutting torque and a deterioration is caused in the straightness of a drilled hole.

Preferably, the web thickness of the flute 4 is between 40% and 50% of the drill diameter 2 in view of rigidity. Therefore, the small-diameter drill 1 of the present invention can be used without any breakage even when a step feeding amount each time is 15% or greater.

Next, the present invention will be explained in detail based on detailed examples.

Embodiments

Now, description will be given to explain Example 1 which evaluates the straightness as a basic effect of the present invention.

Example 1

As examples of the present invention and comparative examples, each drill is provided with two cutting edges, having a drill diameter of 0.2 mm, a flute helix angle of 30 degrees, a web thickness of 0.07 mm (35% of the drill diameter), a shank diameter of 3 mm, and a drill section length 5 of 1.1 mm. Various parameters are shown in Table 1, including flute length, diameter reduction of outer diameter (back tapering amount), outer diameter at flute end, and maximum diameter of straightly tapered expanded-diameter portions. In Table 1, flute length, outer diameter at flute end, and maximum diameter of straightly tapered expanded-diameter portion are each expressed as a ratio with respect to the drill diameter. A base material for each drill is an ultra-fine-grained cemented carbide in which the average particle size of WC is 0.6 μm or less and Co content is 13 w %, with the drill section and the neck section being covered with an AlCrN coating.

As test condition, SUS304 rectangular block was prepared as work piece, with one of the rectangular surfaces serving as reference surface. An operation of hole drilling was performed in a manner such that the depth direction of a drilled hole is parallel with the reference surface. Then, a vertical-type machining center was used to drill 50 through holes with the cutting conditions being: number of revolutions is 24,000 $min^{-1}$ (cutting speed is approximately 15 m/min), feeding amount per revolution: 0.002 mm/revolution, step amount each time: 0.03 mm (15% of the drill diameter), hole depth: 8 mm (40 times the drill diameter). Water-soluble cutting oil was supplied from outside as a coolant. In addition, at the time of drilling, an approximately hemispherical guide hole having a diameter of 0.2 mm and a depth of 0.2 mm was formed in the work piece beforehand.

As a method for evaluation, a work piece was cut at the position of a drilled hole after drilling, parallel with the reference surface. Subsequently, a distance from the reference surface to the inner peripheral surface of the drilled hole was measured at 5 points in the depth direction of the drilled hole, with a difference between a maximum value and a minimum value of the measured distances taken as a straightness. Then, an average straightness was calculated from the straightness of the 10th hole, 30th hole and 50th hole respectively, with the results shown in Table 1.

TABLE 1

| | Sample number | Flute length (times) | Diameter reduction (back tapering amount) (/100 mm)) | Outer diameter of flute end (times) | Maximum diameter (times) | Average straightness (μm) |
|---|---|---|---|---|---|---|
| Examples of the invention | A1 | 10 | 1.0 | 0.90 | 0.99 | 8.0 |
| | A2 | 10 | 1.0 | 0.95 | 0.99 | 8.0 |
| | A3 | 10 | 1.0 | 0.98 | 0.99 | 10.0 |
| | A4 | 5 | 1.0 | 0.95 | 0.99 | 6.0 |
| | A5 | 7 | 2.0 | 0.95 | 0.99 | 6.0 |
| | A6 | 9 | 2.0 | 0.95 | 0.99 | 8.0 |
| | A7 | 10 | 2.0 | 0.95 | 1.00 | 7.0 |
| | A8 | 10 | 2.0 | 0.98 | 1.00 | 9.0 |
| Comparative examples | A9 | 3 | 2.0 | 0.95 | 0.99 | — |
| | A10 | 10 | 1.0 | 0.87 | 0.99 | 15.0 |
| | A11 | 10 | 1.0 | 0.95 | 0.95 | 17.0 |
| | A12 | 10 | 1.0 | 0.95 | 0.92 | 20.0 |
| | A13 | 10 | 1.0 | 1.00 | 0.99 | 12.0 |
| | A14 | 11 | 1.0 | 0.95 | 0.99 | 16.0 |

As a result, examples A1 to A8 of the present invention were carried out in as many as 50 holes, their straightness were all 10 μm or less and thus acceptable, with fewer cutting chips getting bitten, thereby realizing a stabilized deep hole drilling. Particularly, examples A4 and A5 of the present invention having a flute length of 5 to 7 times the drill diameter, and example A7 of the present invention having a large tapering and maximum diameter were found to be acceptable since they exhibit an acceptable straightness of less than 8 μm. On the other hand, comparative example A9 whose flute length was 3 times the drill diameter, drill was broken just before reaching a depth of 0.1 mm in the first drilled hole. Besides, in comparative examples A10 to A14, 50 holes were drilled, but their straightness all exceeded 10 μm and thus not acceptable.

Examples 2 and 3 show the results of evaluations on the effects of guide portions.

Example 2

As examples of the present invention and comparative examples, each drill was provided with two cutting edges, having a drill diameter of 0.2 mm, a drill section of 1.1 mm, a neck section length of 9, 0 mm, an overall length of 40 mm, a flute helix angle of 30 degrees, a web thickness of 0.07 mm (35% of the drill diameter), a shank diameter of 3 mm, and a guide portion located 2.0 mm from the cutting edge of the neck section. Various samples were prepared having different neck section outer diameters, guide portion outer diameters, guide portion lengths, flute lengths, outer diameter reductions (back tapering amount), flute end outer diameters, and maximum diameters of the straightly tapered expanded-diameter portion, as shown in Table 1. A base material for each drill is an ultra-fine-grained cemented carbide in which the average particle size of WC was 0.6 μm or less and Co content was 13 w %, with the drill section and the neck section being covered with an AlCrN coating.

As test condition, SUS304 rectangular block was prepared as work piece, with one of the rectangular surfaces serving as reference surface. An operation of hole drilling was performed in a manner such that the depth direction of a drilled hole is parallel with the reference surface. Then, a vertical-type machining center was used to drill 30 through holes with the cutting conditions being: number of revolutions was 15,000 $\text{min}^{-1}$ (cutting speed was approximately 9.4 m/min), feeding amount per revolution: 0.002 mm/revolution, step amount each time: 0.02 mm (10% of the drill diameter), hole depth: 8 mm (50 times the drill diameter). Water-soluble cutting oil was supplied from outside as a coolant. In addition, at the time of drilling, an approximately hemispherical guide hole having a diameter of 0.2 mm and a depth of 0.2 mm was formed in the work piece beforehand.

For evaluation, an optical microscope was used to measure a positioning precision and an average hole diameter of a guide hole. Meanwhile, the optical microscope was also used to measure, from the front side and back side, a coordinate distance from the reference surface of a work piece, so as to measure a deviation of the center position of the drilled hole, thereby obtaining a straightness of the drilled hole. The results of the measurement are shown in Table 2.

TABLE 2

| | Sample number | Outer diameter of neck section (mm) | Outer diameter of guide portion (mm) | Length of guide portion (mm) | Flute length (mm) | Back tapering amount (/100 mm) | Outer diameter of flute end (mm) | Maximum diameter (mm) | Average straightness (μm) |
|---|---|---|---|---|---|---|---|---|---|
| Examples of the invention | B1 | 0.170 | 0.198 | 0.30 | 1.9 | 1.1 | 0.190 | 0.199 | 9 |
| | B2 | 0.180 | 0.197 | 0.29 | 2.0 | 1.0 | 0.190 | 0.198 | 8 |
| | B3 | 0.196 | 0.198 | 0.29 | 2.1 | 1.1 | 0.188 | 0.198 | 7 |
| | B4 | 0.190 | 0.196 | 0.30 | 2.0 | 1.0 | 0.190 | 0.198 | 8 |
| | B5 | 0.191 | 0.200 | 0.31 | 2.0 | 1.0 | 0.191 | 0.199 | 6 |
| | B6 | 0.188 | 0.198 | 0.04 | 2.0 | 1.1 | 0.190 | 0.199 | 9 |
| | B7 | 0.190 | 0.196 | 0.10 | 2.1 | 1.0 | 0.190 | 0.198 | 8 |
| | B8 | 0.188 | 0.198 | 0.20 | 2.1 | 1.0 | 0.189 | 0.199 | 7 |
| | B9 | 0.189 | 0.198 | 0.35 | 2.0 | 1.0 | 0.189 | 0.198 | 6 |
| | B10 | 0.191 | 0.198 | 0.40 | 2.0 | 1.2 | 0.190 | 0.198 | 8 |
| | B11 | 0.190 | 0.197 | 0.30 | 1.9 | 1.1 | 0.180 | 0.200 | 8 |
| | B12 | 0.189 | 0.197 | 0.31 | 2.0 | 1.0 | 0.190 | 0.198 | 8 |
| | B13 | 0.191 | 0.198 | 0.30 | 2.0 | 1.0 | 0.196 | 0.199 | 10 |
| | B14 | 0.190 | 0.198 | 0.29 | 1.0 | 1.1 | 0.190 | 0.198 | 6 |
| | B15 | 0.190 | 0.198 | 0.30 | 1.4 | 2.0 | 0.191 | 0.200 | 6 |
| | B16 | 0.191 | 0.199 | 0.30 | 1.8 | 2.0 | 0.188 | 0.198 | 8 |
| | B17 | 0.190 | 0.198 | 0.29 | 2.0 | 2.1 | 0.190 | 0.200 | 7 |
| | B18 | 0.189 | 0.198 | 0.30 | 2.0 | 2.0 | 0.196 | 0.200 | 9 |
| Comparative examples | B19 | 0.165 | 0.197 | 0.30 | 2.0 | 1.0 | 0.188 | 0.198 | 20 |
| | B20 | 0.198 | 0.198 | 0.31 | 1.9 | 1.1 | 0.189 | 0.198 | — |
| | B21 | 0.189 | 0.194 | 0.30 | 2.1 | 1.1 | 0.191 | 0.199 | 18 |
| | B22 | 0.191 | 0.205 | 0.30 | 1.9 | 1.0 | 0.190 | 0.199 | — |
| | B23 | 0.190 | 0.198 | 0.03 | 2.0 | 1.2 | 0.190 | 0.198 | 18 |
| | B24 | 0.189 | 0.199 | 0.45 | 2.0 | 1.0 | 0.190 | 0.198 | 18 |
| | B25 | 0.190 | 0.198 | 0.29 | 0.6 | 2.0 | 0.191 | 0.200 | — |
| | B26 | 0.190 | 0.198 | 0.29 | 2.0 | 1.0 | 0.174 | 0.198 | 15 |
| | B27 | 0.191 | 0.198 | 0.30 | 2.0 | 1.0 | 0.190 | 0.190 | 17 |
| | B28 | 0.188 | 0.197 | 0.30 | 1.9 | 1.0 | 0.190 | 0.184 | 20 |
| | B29 | 0.190 | 0.199 | 0.31 | 2.0 | 1.1 | 0.189 | 0.198 | 16 |

Consequently, examples B1 to B18 of the present invention were carried out in as many as 30 holes. By virtue of the drill shapes formed according to the present invention, the invention was able to make the cutting chips to stay within the flute so as to prevent the chips from getting bitten into the neck section. Particularly, as to a straightness, the invention was able to perform a hole drilling with an acceptable straightness of 10 μm or less. Moreover, example B3 of the present invention having a neck outer diameter of 0.196 mm had a high rigidity and thus an acceptable straightness of 7 μm. Example B5 of the present invention having a guide portion outer diameter of 0.2 mm provides a high guide effect and thus an acceptable straightness of 6 μm. Moreover, example B9 of the present invention having a guide portion length of 0.35 mm, provided a high guide effect and thus an acceptable straightness of 6 μm.

On the other hand, in comparative example B19 the drill had a poor rigidity due to a small neck outer diameter and thus an unacceptable straightness of 20 μm. In comparative example B20, the drill was broken near a drilled hole depth of 2.0 mm in the first hole. It can be considered that a drill broke due to a large neck outer diameter which caused the neck section to bumper against a drilled hole and there was an increased cutting resistance. In comparative example B21, since a guide portion outer diameter was small and thus a guide effect was not sufficient, resulting a straightness which was as large as 18 μm. In comparative example B22, the drill broke at a drilled hole depth of 1.1 mm, i.e., a position where the guide portion was about to enter the drilled hole. This was probably due to a large guide portion outer diameter which causes a large cutting resistance in the guide portion.

In comparative example B23, since the guide portion was short, the guide effect was not sufficient and thus the straightness is undesirably as large as 18 μm. Upon observing the drill which had been used, it was found that chipping was occurring in the guide portion. On the other hand, in comparative example B24, the guide portion was too long, the straightness was still undesirably as large as 18 μm. This is perhaps because a vibration had occurred due to an increased cutting resistance in the guide portion. In comparative example B25, since the flute length was as short as 0.6 mm, the cutting chips generated in only one step was clogged in the flute and the drill itself was broken at a position near a drilled hole depth of 0.22 mm. In comparative examples B26 to B29, it was found that the cutting chips failed to stay within the flute and the straightness exceeded 10 μm and thus unacceptable.

Example 3

Next, using the same specifications as in example 35 of the present invention, several samples were made with a neck portion length being 15 mm, an overall length 50 mm, and different guide portion intervals. As test conditions, through holes having a drilled hole depth of 10 mm (80 times the drill diameter) were drilled, with other conditions being the same as in example 2. Evaluation items are the same as in example 2. The results are shown in Table 3.

As a result, in examples B30 to B32 of the present invention having guide portion intervals of between 1.0 mm and 2.0 mm, an operation of hole drilling having an acceptable straightness of 10 μm or less was successful based on an effect of the guide portions provided in the neck section.

On the other hand, comparative examples B33 and B34 failed to produce an adequate straightness. This is perhaps because a small guide portion interval partially causes an increase in the cutting resistance, thus causing a vibration and rendering it impossible to obtain a desired straightness. In comparative examples B35 and B36, since the guide portion intervals were too large, straightness was harmed before the next guide portion enters a drilled hole, hence making it impossible to obtain an acceptable straightness.

Other examples of the micro deep hole drilling method for determining an optimum guide hole are explained in examples 4, 5, 6 and 7.

Example 4

As example C1 of the present invention and conventional examples C2 to C4, a ball end mill for drilling a guide hole in example C1 of the present invention was prepared, which includes two cutting edges, having a cutting edge diameter of 0.2 mm, a ball cutting edge, and an outer peripheral cutting edge. In detail, the cutting edge length of the outer peripheral cutting edge was 0.4 mm, a relief angle of the outer peripheral cutting edge was 15 degrees, and the outer diameter of the shank was 4 mm. Then, three kinds of drills for drilling the guide holes in conventional examples C2 to C4 were prepared which include two cutting edges, having a cutting edge diameter of 0.2 mm, a flute length of 0.4 mm, and a shank outer diameter of 4 mm, with tip angles 16 being 130°, 140° and 150°.

A base material for a ball end mill and a drill for drilling a guide hole contained 8 wt % of Co, with WC average particle size being 0.4 to 0.6 μm, and the cutting edge portion or the flute portion coated with TiAlN film having a thickness of 2 μm. In addition, a small-diameter drill for micro deep hole drilling had two cutting edges, a drill diameter of 0.2 mm, a flute helix angle of 30 degrees, a web thickness of 0.07 mm (35% of the drill diameter), and a shank outer diameter of 3 mm. Here, a flute length 16 was 1.0 mm, a back tapering amount was 0.5/100 mm, a neck diameter was 0.185 mm, an extension length 17 starting from the neck-end was 4.3 mm, and a tip point angle 16 was 140°.

In example C1 of the present invention, the ball end mill described above was used to form a guide hole having a hole diameter of 0.2 mm, a hole depth of 0.2 mm and a bottom surface having an approximately hemispherical shape. Then, the small-diameter drill shown in FIG. 17 was used to drill a

TABLE 3

| Sample number | | Outer diameter of neck section (mm) | Outer diameter of guide portion (mm) | Length of guide portion (mm) | Guide portion interval (mm) | Flute length (mm) | Back tapering amount (/100 mm) | Outer diameter of flute end (mm) | Maximum diameter (mm) | Average straightness (μm) |
|---|---|---|---|---|---|---|---|---|---|---|
| Examples of the invention | B30 | 0.191 | 0.199 | 0.29 | 1.0 | 2.1 | 1.0 | 0.190 | 0.198 | 8 |
| | B31 | 0.191 | 0.198 | 0.30 | 1.6 | 2.1 | 1.1 | 0.190 | 0.198 | 7 |
| | B32 | 0.190 | 0.198 | 0.31 | 2.0 | 2.0 | 1.0 | 0.188 | 0.200 | 8 |
| Comparative examples | B33 | 0.189 | 0.198 | 0.29 | 0.60 | 2.1 | 1.0 | 0.191 | 0.198 | 15 |
| | B34 | 0.191 | 0.198 | 0.29 | 0.80 | 2.0 | 1.0 | 0.190 | 0.200 | 13 |
| | B35 | 0.190 | 0.197 | 0.30 | 2.20 | 2.0 | 1.2 | 0.191 | 0.199 | 14 |
| | B36 | 0.189 | 0.199 | 0.30 | 2.50 | 2.1 | 1.1 | 0.191 | 0.198 | 18 | hole by repeating step feed. In conventional examples C2 to C4, various drills for drilling guide holes and having tip angles of 130° to 150° were used to drill the same guide holes as in example C1 of the present invention, thereby effecting the same drilling process.

As test conditions, guide holes were drilled in succession with a pitch of 0.25 mm between hole positions on one surface of an SUS316 block serving as a work piece. Then, a small-diameter micro deep hole drill was used to drill through holes having a hole diameter of 0.2 mm and a hole depth of 4 mm, i.e., with the hole depth being 20 times the drill diameter of the small-diameter drill. Here, the ball end mill, the drill and the small-diameter drill were all used to perform a wet cutting, with number of revolutions being 25,000 $min^{-1}$, feeding speed 50 mm/min, and step amount per step 0.02 mm/step.

Besides, a feeding speed of a small-diameter drill during non-drilling was set at 15 m/min for all samples. In this test, both the example of the present invention and the conventional examples were conducted to repeat a step feed in a position where the outer peripheral corner position 33 of the small-diameter drill during a step back 30 was located 0.1 mm from the end face 32 of the entrance of the drilled hole in the positive direction so that the corner position 33 could surely move away.

For evaluation, an optical microscope was used to measure an average interval between hole positions and an average hole diameter. Further, straightness was measured by using an optical microscope to measure, from the front side and back side, coordinate distances from a reference surface of a work piece, followed by detecting a deviation of the center position of the drilled hole. Moreover, the number of drilled holes was recorded at the time when chipping or breakage occurred on the small-diameter drill guided by the guide hole. Then, drilling was put to an end when up to 200 holes were drilled stably. The results are shown in Table 4.

drilled holes, i.e., an average hole diameter was 0.220 mm, an average interval between hole positions was 0.280 mm, an straightness was 0.020 mm. This is perhaps because the positioning precision and the hole precision of the guide holes are poor when the guide holes are formed. Further, it can be considered that since an opening angle formed as a guide hole is 130° and a tip angle of the small-diameter drill is 140°, the tip portion of the drill fails to get into contact with a hole bottom, and this causes the drill to vibrate from side to side and thus produces an unacceptable hole diameter precision, hence bringing about a possibility of breaking the small-diameter drill.

Regarding the guide holes formed in conventional example C3 by using a guide hole drill, the small-diameter drill broke at the 62th hole, causing a greatly deviated precision in the drilled holes, i.e., an average hole diameter was 0.218 mm, an average interval between hole positions was 0.275 mm, a straightness was 0.018 mm. The reason for this can be considered as follows. Namely, since an opening angle formed as a guide hole is 140° and a tip angle of the small-diameter drill is also 140°, and since the size of the tool is minute, a cutting resistance increases too much during a biting action of the drill, causing an easy vibration in drill and thus an unacceptable precision, finally bringing about a possibility of damaging the small-diameter drill.

Regarding the guide holes formed in conventional example C4 by using a guide hole drill, the small-diameter drill broke at the 30th hole, causing a greatly deviated precision in the drilled holes, i.e., an average hole diameter was 0.230 mm, an average interval between hole positions was 0.300 mm, a straightness was 0.023 mm.

This is perhaps because the positioning precision and the hole precision of the guide holes are poor when the guide

TABLE 4

| Sample number | | Tip angle of guide-hole drill (°) | Average hole diameter (mm) | Average interval between hole positions (mm) | Straightness (mm) | Number of drilled holes (holes) | Remarks |
| --- | --- | --- | --- | --- | --- | --- | --- |
| Examples of the invention | C1 | — | 0.203 | 0.254 | 0.005 | 200 | 200 holes with no breakage |
| Comparative examples | C2 | 130 | 0.220 | 0.280 | 0.020 | 49 | Breakage occurred at the 50th hole |
| | C3 | 140 | 0.218 | 0.275 | 0.018 | 61 | Breakage occurred at the 62nd hole |
| | C4 | 150 | 0.230 | 0.300 | 0.023 | 29 | Breakage occurred at the 30th hole |

As a result, when the guide holes were formed using the ball end mill of example C1 of the present invention, the small-diameter drill was able to stably drill up to 200 holes, obtaining acceptable precisions for the drilled micro deep holes, i.e., an average hole diameter was 0.203 mm, an average interval between hole positions was 0.254 mm, and a straightness was 0.005 mm. The reason for this can be considered as follows. Namely, since the positioning precision and the hole precision at the time of forming the guide holes are extremely good, and since the bottom surface of the guide hole is formed into an approximately hemispherical shape, drilling is performed gradually from the entrance of the guide hole toward the center thereof without depending upon an opening angle of the small-diameter, and then the tip portion of the drill get into contact with and fixes at the center, thereby ensuring a stabilized drilling.

Regarding the guide holes formed in conventional example C2 by using a guide hole drill, the small-diameter drill broke at the 50th hole, causing a greatly deviated precision in the holes are formed. Further, since an opening angle formed as a guide hole is 150° and a tip angle of the small-diameter drill is 140°, the tip portion of the drill passed through the guide hole and got into contact with a hole bottom. Intrinsically, it is assumed that a drill having a large drill diameter is stable during a drill process. However, since a drill rigidity is not sufficient when a drill being used was a micro deep hole drill, the drill vibrated heavily and this could lead to a breakage on the way when the drill diameter became large.

Example 5

Next, as examples C5 to C8 of the present invention and comparative examples C9 and C10, a test was conducted for optimizing the hole diameters of guide holes with respect to drill diameter. As test method, the same specifications as example C1 of the present invention were used to make six different samples such that the cutting edge diameters of ball end mills for forming guide holes were 0.17 mm-0.22 mm, i.e., the hole diameters of the guide holes were 0.85-1.1 times the drill diameter. Then, drilling and evaluation were performed in the same way as in example 4. The results are shown in Table 5.

In examples C11 to C13 of the present invention, it was possible to stably drill up to 200 holes, with the hole precisions turning out to be acceptable results, i.e., an average hole

TABLE 5

| Sample number | | Cutting edge diameter of ball end mill (mm) | Guide hole diameter (mm) | Guide hole diameter/small-diameter drill diameter (ratio) | Average hole diameter (mm) | Average interval between hole positions (mm) | Straightness (mm) | Number of drillend holes (holes) | Remarks |
|---|---|---|---|---|---|---|---|---|---|
| Examples of the invention | C5 | 0.18 | 0.18 | 0.90 | 0.205 | 0.254 | 0.005 | 200 | 200 holes with no breakage |
| | C6 | 0.19 | 0.19 | 0.95 | 0.203 | 0.255 | 0.005 | 200 | |
| | C7 | 0.20 | 0.20 | 1.00 | 0.203 | 0.254 | 0.005 | 200 | |
| | C8 | 0.21 | 0.21 | 1.05 | 0.204 | 0.255 | 0.006 | 200 | |
| Comparative examples | C9 | 0.17 | 0.17 | 0.85 | 0.212 | 0.269 | 0.013 | 79 | Breakage occurred at the 80th hole |
| | C10 | 0.22 | 0.22 | 1.10 | 0.214 | 0.268 | 0.014 | 94 | Breakage occurred at the 95th hole |

Table 5 shows that examples C5 to C8 of the present invention were able to drill up to 200 holes stably, with hole precision being acceptable, i.e., an average hole diameter was 0.210 mm or less, and an average interval between hole positions was 0.260 mm or less.

In comparative example C9, since the guide hole diameter was small, the load on the drill became too large, causing the drill to bend. As a result, holes failed to be drilled stably and the small-diameter drill broke when drilling the 80th hole. On the other hand, comparative example C10 can be considered as follows. Namely, since the guide hole diameter is large, too large a space occurs between the guide hole inner wall and the drill to be used in a next step, making the drill to be in an unstable condition, causing the cutting chips to be bitten into the neck section and the drill to break in 95 holes.

Example 6

Next, as examples C11 to C13 of the present invention and comparative examples C14 and C15, a test was conducted for optimizing the depth of the guide hole. As test method, a ball end mill for forming guide holes having the same specifications as example C1 of the present invention was used to form guide holes having a guide hole depth ranged at least 0.1 mm and at most 0.42 mm, i.e., a guide hole depth was at least 0.5 times and at most 2.1 times the drill diameter of the small-diameter drill. Then, the same drilling and the same evaluation as example 4 were carried out. The results are shown in Table 6.

diameter was 0.210 mm or less and an average interval between hole positions was 0.260 mm or less.

In comparative example C14, the guide hole depth was shallow and the small-diameter drill broke when drilling the 106th hole, with the precisions of the drilled holes turning out to be: an average hole diameter was 0.210 mm or less and an average interval between hole positions was 0.269 mm or less. This can be considered as follows. Namely, in drilling process, since it is impossible to sufficiently guide the small-diameter drill, the drilling is conducted in an unstable condition, hence breaking the small-diameter drill.

In comparative example C15, the guide hole depth was deep and when using the ball end mill to form guide holes, the cutting chips become clogged, rendering it impossible to form guide holes having an adequate precision. Consequently, the small-diameter drill broke when drilling the 103rd hole, with the precision of the drilled holes turning out to be: an average hole diameter was 0.220 mm and an average interval between hole positions was 0.265 mm. As a result, it was impossible to drill a hole having an acceptable precision, resulting in the breakage of the small-diameter drill.

Example 7

Next, in relation to examples C16 to C18 of the present invention, evaluation was performed on the effect of the tapered expanded-diameter portion 10 of the small-diameter drill.

TABLE 6

| Sample number | | Guide hole depth (mm) | Guide hole depth/small-diameter drill diameter (ratio) | Average hole diameter (mm) | Average interval between hole positions (mm) | Straightness (mm) | Number of drillend holes (holes) | Remarks |
|---|---|---|---|---|---|---|---|---|
| Examples of the invention | C11 | 0.12 | 0.6 | 0.205 | 0.257 | 0.007 | 200 | 200 holes with no breakage |
| | C12 | 0.30 | 1.5 | 0.202 | 0.254 | 0.004 | 200 | |
| | C13 | 0.40 | 2.0 | 0.204 | 0.257 | 0.009 | 200 | |
| Comparative examples | C14 | 0.10 | 0.5 | 0.212 | 0.269 | 0.017 | 105 | Breakage occurred at the 106th hole |
| | C15 | 0.42 | 2.1 | 0.220 | 0.265 | 0.025 | 102 | Breakage occurred at the 103th hole |

Example C16 of the present invention did not involve a tapered expanded-diameter portion 10. Example C17 of the present invention involved a tapered expanded-diameter portion 10 in which the outer diameter at the end of the flute length was 0.19 mm, and the maximum diameter of the linearly tapered expanded-diameter portion 10 was 0.194 mm. Example C18 of the present invention involved a tapered expanded-diameter portion 10 in which the outer diameter at the end of the flute length was 0.19 mm, and the maximum diameter of the linearly tapered expanded-diameter portion 10 was 0.198 mm. In each of these examples, a back tapering amount was 1.0/100 mm with the other specifications being the same as example 4.

Further, as guide hole forming, a ball endmill for forming a guide hole having the same specifications as example C1 of the present invention was used to form guide holes having a depth of 0.2 mm, thus effecting the same drilling and evaluation as example 4. The results are shown in Table 7.

TABLE 7

| Sample number | | Outer diameter of flute end (mm) | Maximum diameter of tapered large diameter portion (mm) | Average hole diameter (mm) | Average interval between hole positions (mm) | Straightness (mm) | Number of drillend holes (holes) |
|---|---|---|---|---|---|---|---|
| Examples of the invention | C16 | 0.19 | 0.190 | 0.203 | 0.254 | 0.005 | 200 |
| | C17 | 0.19 | 0.194 | 0.201 | 0.252 | 0.002 | 200 |
| | C18 | 0.19 | 0.198 | 0.201 | 0.252 | 0.001 | 200 |

Consequently, it turned out that examples C16 to C18 of the present invention were able to stably drill 200 holes, exhibiting an extremely good hole precision. Further, regarding a drill having a tapered expanded-diameter portion, cutting chips were surely pushed back into the flute, thereby preventing the chips from getting bitten into the neck section. In particular, example C18 of the present invention showed an acceptable stabilized micro hole precision, i.e., an average hole diameter was 0.201 mm, an average interval between hole positions was 0.252 mm, with a straightness being 0.001 mm, an extremely good value.

Next, examples 8 and 9 are used to explain a method for performing a step feed for performing a drilling which is 50 or more times the diameter of a hole.

Example 8

Next, as examples C19 to C24 of the present invention, a small-diameter drill was used in which a back tapering amount is 1.0/100 mm, an outer diameter of at the end of the flute length is 0.19 mm, a maximum diameter of a linearly tapered expanded-diameter portion 10 is 0.198 mm, and an under neck length 17 is 10.3 mm. Other specifications were the same as example 4.

In example C19 of the present invention, the outer peripheral corner position 33 of the small-diameter drill during a step back 30 was located at +0.1 mm in the positive direction from the end face 32 of the entrance of the drilled hole, so that step feed was repeatedly performed at a position capable of allowing the drill to exactly move away. In examples C20 to C24 of the present invention, the outer peripheral corner position 33 of the small-diameter drill during a step back 30 was located in the hole drilling direction from the end face 32 of the entrance of the drilled hole, so that step feed was repeatedly performed at positions which are −0.04 mm to −0.22 mm in the minus direction from the end face 32 of the entrance of the drilled hole.

As test conditions, guide holes were drilled in succession at a pitch of 0.25 mm between hole positions on one surface of an SUS316 material serving as a work piece. Then, a small-diameter drill was used to drill 50 through holes having a hole diameter of 0.2 mm and a hole depth of 10 mm, i.e., the hole depth was 50 times the drilled hole diameter. Besides, a feeding speed of the small-diameter drill during non-drilling was set at 3 m/min. A ball end mill for drilling guide holes and having the same specifications as example C1 of the present invention was used to drill guide holes having a depth of 0.2 mm, thereby performing the same drilling and evaluation as example 4. The results are shown in Table 8.

TABLE 8

| Sample number | | Outer peripheral corner position of small-diameter drill from the end face of a work piece (mm) | Outer peripheral corner position of small-diameter drill/diameter of small-diameter drill (ratio) | Average hole diameter (mm) | Average interval between hole positions (mm) | Straightness (mm) | Number of drillend holes (holes) |
|---|---|---|---|---|---|---|---|
| Examples of the invention | C19 | 0.10 | −0.5 | 0.208 | 0.260 | 0.011 | 50 |
| | C20 | −0.04 | 0.2 | 0.208 | 0.258 | 0.009 | 50 |
| | C21 | −0.06 | 0.3 | 0.205 | 0.255 | 0.005 | 50 |
| | C22 | −0.10 | 0.5 | 0.204 | 0.253 | 0.003 | 50 |
| | C23 | −0.20 | 1.0 | 0.205 | 0.256 | 0.005 | 50 |
| | C24 | −0.22 | 1.1 | 0.208 | 0.258 | 0.010 | 50 |

The results of examples C19 to C24 of the present invention can be concluded as follows. Namely, even if 50 holes were drilled, the drilling process turned out to be stable, with an hole precision being acceptable. Namely, an average hole diameter was 0.210 mm or less, an average interval between hole positions was 0260 mm or less. Particularly, examples C21 to C23 of the present invention have shown extremely good results: an average hole diameter of all drilled holes was 0.205 mm or less, an average interval between hole positions was 0.256 mm or less, and an straightness was 0.005 mm or less.

Example 9

Next, in examples C25 to C29 of the present invention, 50 through holes were drilled with the drilled hole depth being 50 times the hole diameter. Using the same specifications as example 5, the outer peripheral corner position 33 of a small-diameter drill during a step back 30 was located in the drilled hole direction from the end face 32 of the entrance of a drilled hole at a position of −0.1 mm, thereby repeatedly performing the step feed. Meanwhile, a feeding speed of a small-diameter drill during non-drilling was changed, a ball end mill for forming guide holes and a small-diameter drill as used in example 8 were employed, thereby completing the predetermined test and evaluation. The results are shown in Table 9.

TABLE 9

| Sample number | | Speed of feeding small-diameter drill during non-drilling (m/min) | Average hole diameter (mm) | Average interval between hole positions (mm) | Straightness (mm) | Number of drillend holes (holes) |
|---|---|---|---|---|---|---|
| Examples of the invention | C25 | 0.8 | 0.208 | 0.260 | 0.011 | 50 |
| | C26 | 1.0 | 0.205 | 0.255 | 0.005 | 50 |
| | C27 | 2.0 | 0.204 | 0.254 | 0.004 | 50 |
| | C28 | 4.0 | 0.205 | 0.255 | 0.005 | 50 |
| | C29 | 5.0 | 0.208 | 0.259 | 0.010 | 50 |

The results of examples C25 to C29 of the present invention can be concluded as follows. Namely, even if 50 holes were drilled, the drilling process turned out to be stable, with an hole precision being acceptable. Namely, an average hole diameter were 0.210 mm or less, an average interval between hole positions were 0.260 mm or less. Particularly, examples C26 to C28 of the present invention have shown extremely good results: an average hole diameter of all drilled holes was 0.205 mm or less, an average interval between hole positions was 0.256 mm or less, and an straightness was 0.005 mm or less.

Figure 19:
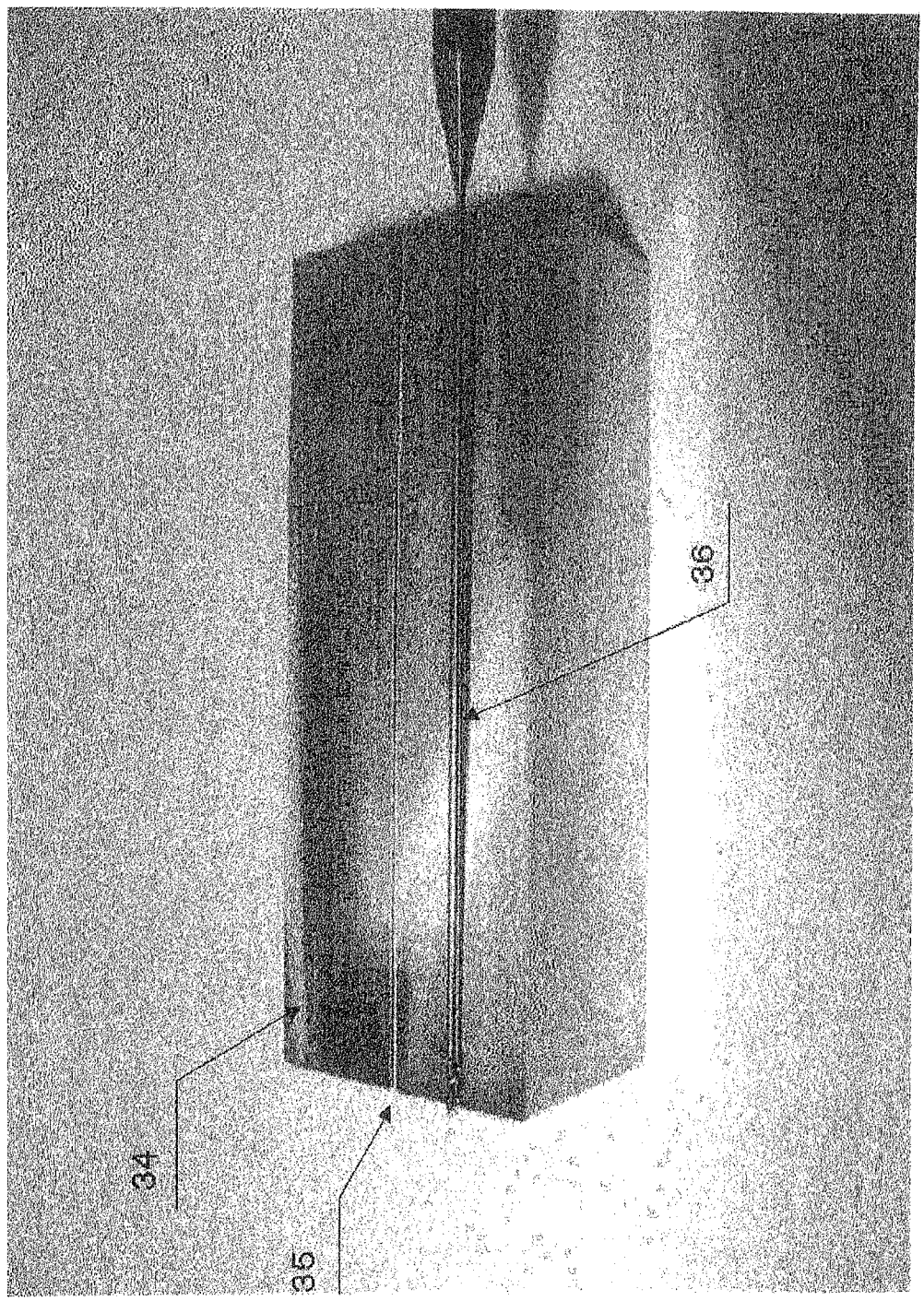
FIG. 19 shows a cross section of a work piece drilled using the method of the present invention, and an actually used tool.

FIG. 19 shows a cross section of a work piece that was drilled using a drilling method of the present invention and an actual tool used in the hole drilling process. In the test, a ball end mill for forming a guide hole includes two cutting edges having a cutting edge diameter of 0.5 mm, a ball cutting edge, and an outer peripheral cutting edge, with a length of the outer peripheral cutting edge being 1 mm, a relief angle of the outer peripheral cutting edge being 15 degrees, and an outer diameter of the shank being 4 mm.

A small-diameter drill 36 for use in a micro deep hole drilling was prepared which includes two cutting edges, having a diameter of 0.5 mm, a flute twist angle of 30 degrees, a web thickness of 0.175 mm (35% of the drill diameter), a shank outer diameter of 3 mm. In detail, a flute length was 2.5 mm, a back tapering amount was 1.0/100 mm, an outer diameter at the end of the flute length was 0.475 mm, a maximum diameter of a linearly tapered expanded-diameter was 0.495 mm, a neck diameter was 0.475 mm, an under neck length is 40.5 mm, and a tip angle was 140°.

As test method, the ball end mill described above was used to drill a guide hole on one surface of a work piece 34 made of SUS304 material, with the formed guide hole having a hole diameter of 0.5 mm, a hole depth of 0.5 mm and an approximately hemispherical bottom surface. Then, the small-diameter drill 36 for drilling a micro deep hole was used to drill a through hole 35 having a hole diameter of 0.5 mm and a hole depth of 40 mm, i.e., with a hole depth being 80 times the hole diameter. Further, the outer peripheral corner position 33 of the small-diameter drill during a step back 30 was located in the drilled hole direction from the end face 32 of the entrance of the drilled hole at a position of −0.1 mm, thereby performing a hole drilling by repeating a step feed.

As test conditions, both a ball end mill for forming a guide hole and a small-diameter drill were used to perform a wet cutting, with number of revolutions being 9,550 min$^{-1}$, a feeding speed being 28 mm/min, a stepping amount per step being 0.025 mm/step, and a feeding speed of the small-diameter drill 36 during non-drilling being 2 m/min. Afterwards, the drilled work piece 34 was cut so as to observe a cross section of a drilled hole.

As can be seen from FIG. 19, the present invention made a hole drilling possible which was otherwise not possible in a prior art even when using a cutting process. The above test proves that the present invention can even drill a through hole having a depth which is 80 times the hole diameter by optimizing the conditions of performing a step feed. Thus, using the method of the present invention, it becomes possible to drill a hole even if a drill has a diameter of 1 mm or less and a hole has an L/D ratio of 120-130.

Next, description will be given to explain an example of drilling a through hole, with reference to examples 10 and 11 of the present invention.

Example 10

FIG. 1 shows an exterior view of a small-diameter drill 1 used in micro deep hole drilling in an example of the present invention as well as in a comparative example.

In an example of the present invention and a comparative example, a small-diameter drill 1 was used to drill micro deep holes. Such a small-diameter drill 1 has two cutting edges, a drill diameter of 0.3 mm, a flute twist of 30 degrees, a web thickness of 0.105 mm (35% of the drill diameter), a shank diameter of 3 mm, a drill section length of 1.48 mm. In detail, a flute length was 1.5 mm, a length of an expanded-diameter portion was 0.05 mm, a maximum diameter of an expanded-diameter portion was 0.298 mm, a back tapering amount was 0.5/100 mm, a neck section diameter was 0.28 mm, an under neck length was 9.1 mm, and a tip angle was 140°.

As test conditions, guide holes were drilled in succession on one surface of SUS304 block material serving as a work piece, in a manner such that the drilled guide holes each had a depth of 0.2 mm and were separated from one another at a pitch of 0.2 mm, using a ball end mill for drilling guide holes, having two cutting edges, a cutting edge diameter of 0.295 mm, a ball cutting edge radius R of 0.15 mm, a ball cutting edge, an outer peripheral cutting edge, an outer peripheral cutting edge length of 0.3 mm, an outer peripheral cutting edge relief angle of 15 degrees, and a shank section outer diameter of 4 mm. Afterwards, a small-diameter drill for micro deep hole drilling was used to drill through holes each having a hole diameter of 0.3 mm and a hole depth of 7.5 mm, i.e., a drilled hole depth is 25 times the cutting edge diameter.

Then, both the ball endmill and the small-diameter drill were used to perform a wet cutting with number of revolutions being 25,000 min$^{-1}$, a feeding speed being 50 mm/min, and a step feeding amount per step being 0.03 mm/step.

Figure 27:
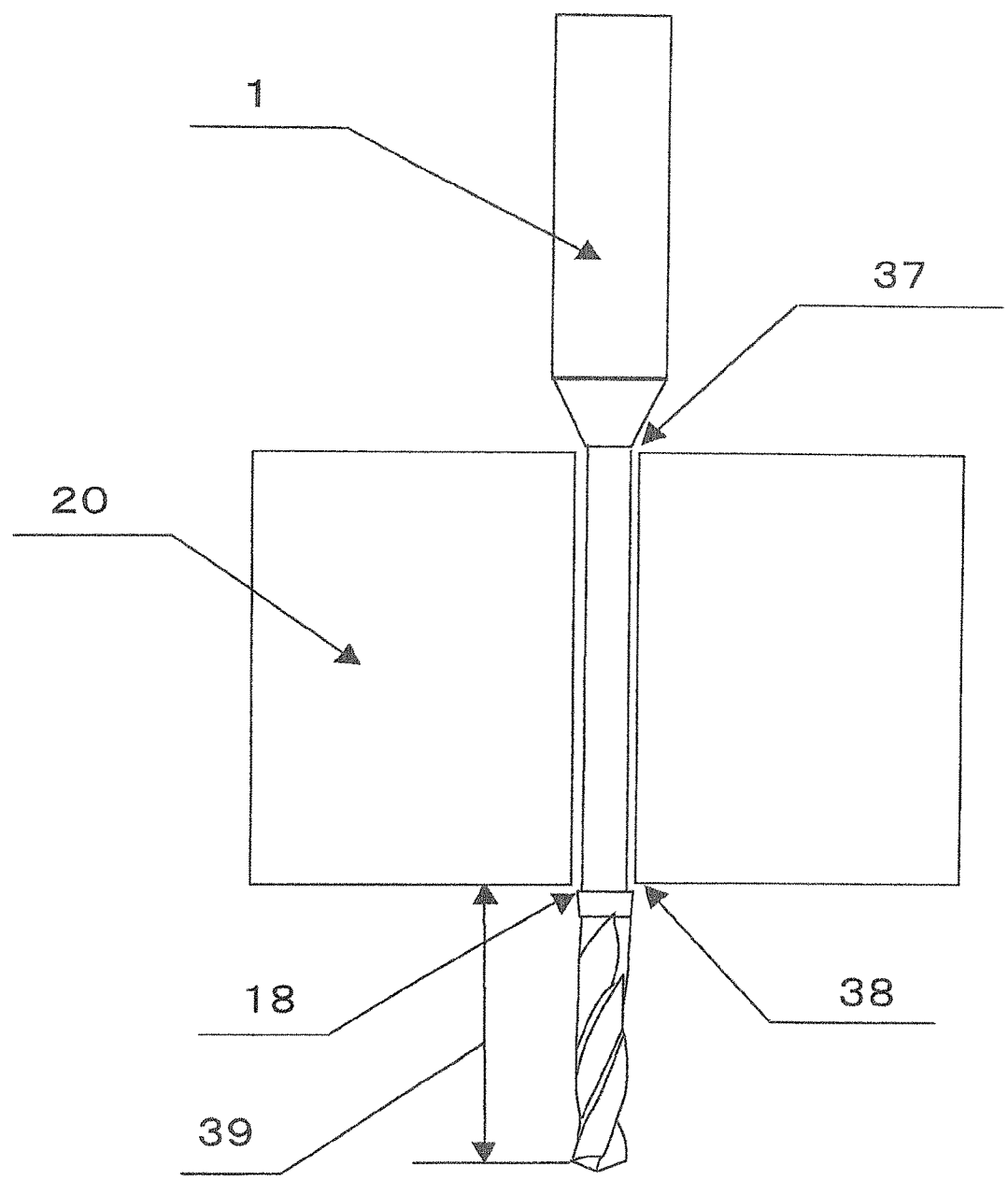
FIG. 27 shows a drilling state at the final stage for drilling a through hole, according to the present invention.
Figure 28:
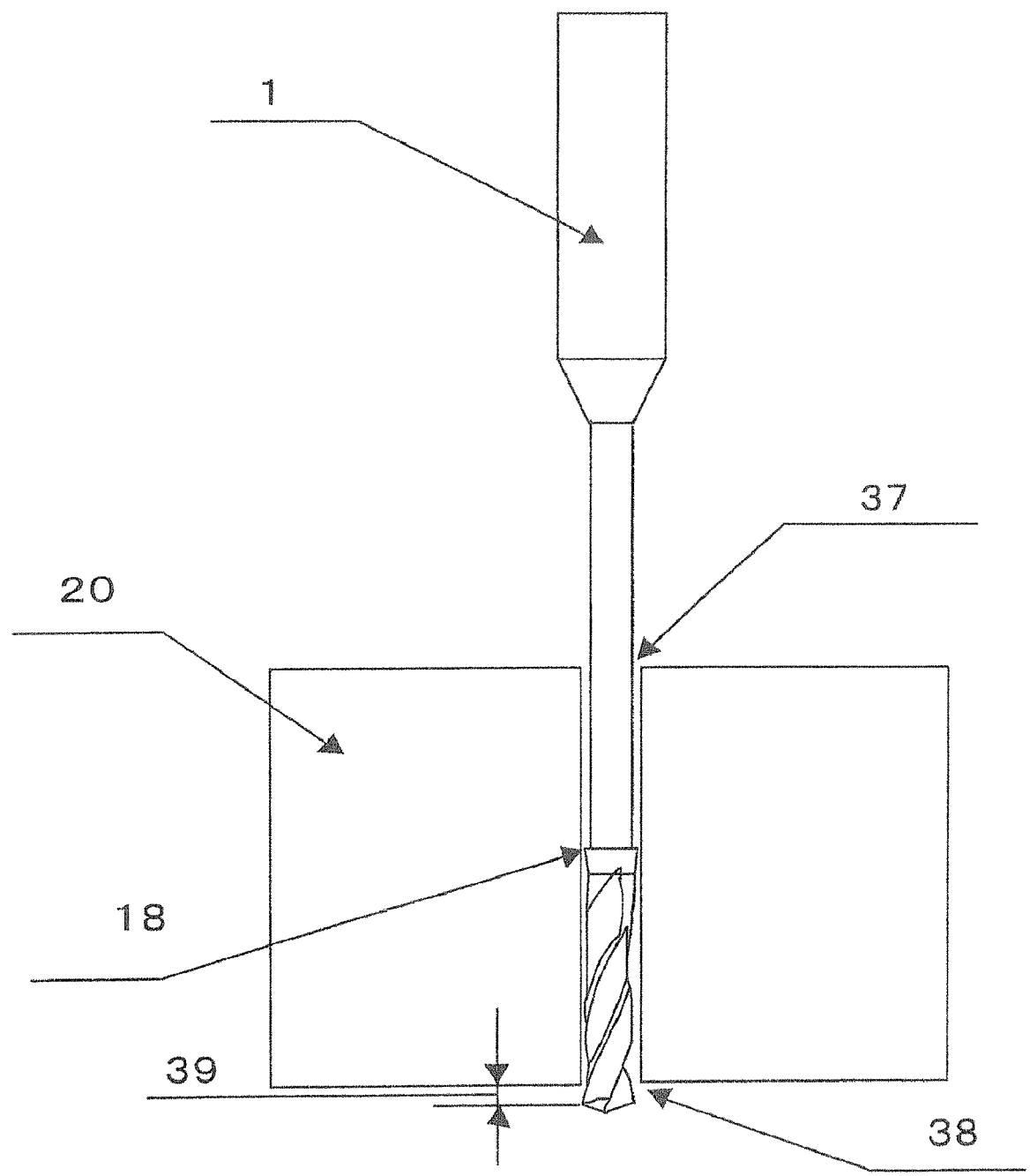
FIG. 28 shows a drilling state at the final stage for drilling a through hole, according to a comparative example.

In example 1 of the present invention, a small-diameter drill was guided by a preformed guide hole, and by repeating a step feed shown in FIG. 27, drilling was performed so that the penetration length 39 of the small-diameter drill was 1.53 mm, i.e., drilling was performed until the small-diameter drill protrudes 1.53 mm from the hole. In comparative example D2 shown in FIG. 28, drilling was performed so that the penetration length 39 of the small-diameter drill was 0.1 mm, i.e., drilling was performed until the small-diameter drill protruded 0.1 mm from the hole.

For evaluation, as many as 100 holes were drilled. Then, a reference pin was inserted into each of 1-99 holes to check whether the reference pin could smoothly penetrate these holes. Subsequently, the 100th hole was cut apart and a finished surface roughness of the inner surface of the hole was measured and the inner surface of the hole was observed using a scanning type electron microscope. The results are shown in Table 10.

On the other hand, in the drilling method used in the comparative example D2, a reference pin was smoothly inserted into 10 holes, but the pin failed to insert into the drilled holes from the 11th hole onward because it got stuck in the middle of these holes. Moreover, the roughness of the inner surface of the 100th drilled hole was as poor as 2.48 μm, and even unevenness was confirmed near the exit of the drilled hole.

FIG. 30 shows inner surface areas of a drilled hole near the middle and the exit of the hole. In the drilling method used in the comparative example D2, drilling was performed until a small-diameter drill protrudes only 0.1 mm from the exit of the hole. As a result, an expanded-diameter portion having almost the same diameter as the drill diameter were able to scrub the inner surface of the drilled hole, thereby improving the inner surface. On the other hand, at an area near the exit not having such a scrubbing effect, the tool wore away so that the inner surface became rough, as described by "unevenness" in the photo, hence resulting in a large surface roughness.

Next, description will be given to explain an example, as example 11, for optimizing the shape of a tool for drilling a through hole.

TABLE 10

| | Small- | | | | | Test results of micro deep hole driling | | |
|---|---|---|---|---|---|---|---|---|
| Sample number | Under neck length (mm) | diameter drill penetration amount (mm) | Involve a large-diameter portion? (Yes/No) | Cylindrical portion length (mm) | Maximum diameter of large diameter portion (mm) | Number of holes through which the reference pin could pass (holes) | State of the inner surface of the 100th hole — | Roughness of the inner surface of the 100th hole (μm) |
| Examples of the invention D1 | 9.1 | 1.53 | Yes | 0 | 0.298 | 96 | No unevenness | 0.9 |
| Comparative examples D2 | 9.1 | 0.10 | Yes | 0 | 0.298 | 10 | unevenness | 2.48 |

As a result, in the drilling method used in example D1 of the present invention, a reference pin was smoothly inserted into each of 96 holes. The roughness of the inner surface of the 100th hole was 0.9 μm, which is an extremely good value. Even when looking at the inner surface of a hole from the entrance 37 of hole to the exit 38 of hole, there was no unevenness and thus exhibiting an extremely good hole precision.

Figure 29:
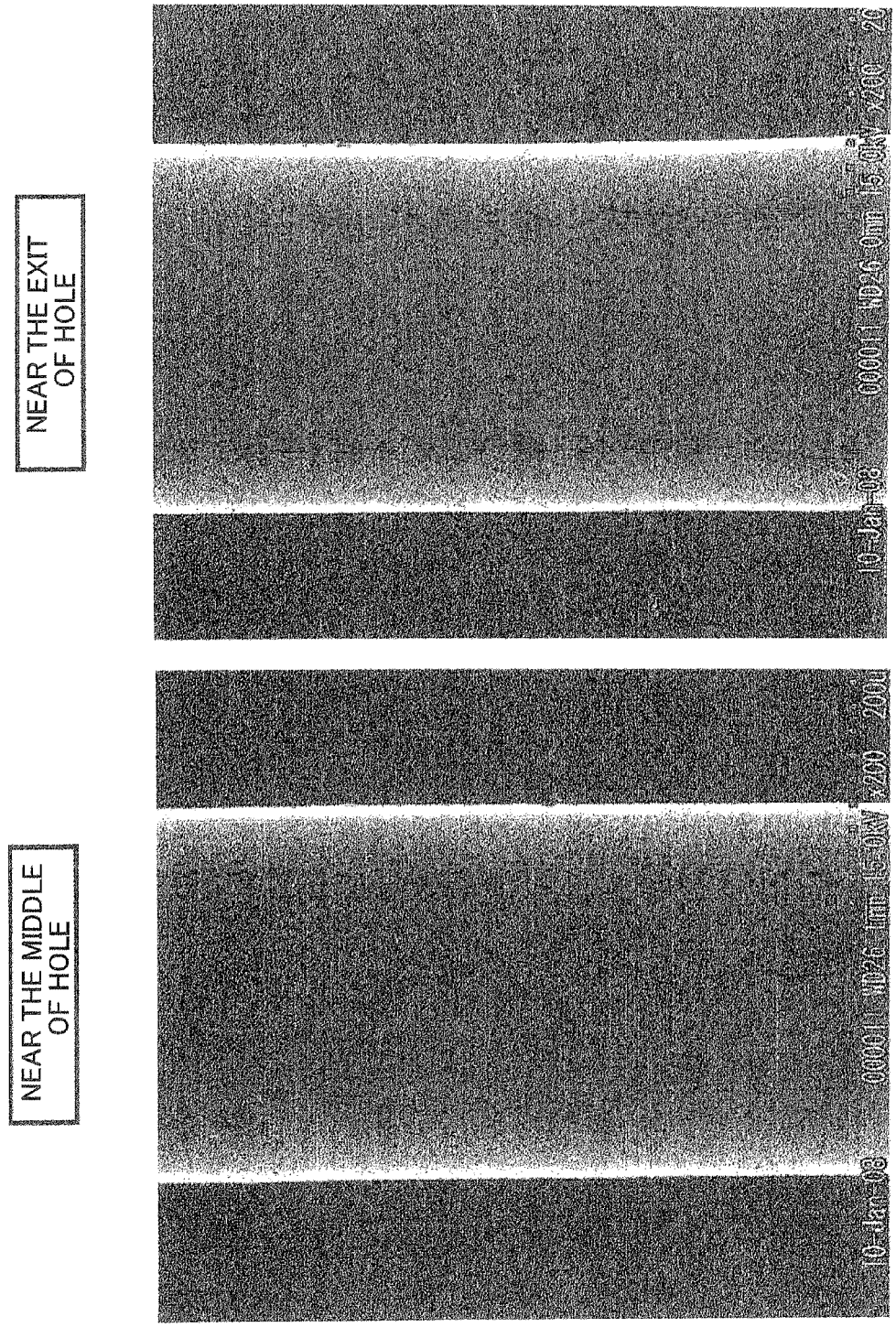
FIG. 29 shows a hole inner surface obtained according to the present invention.

FIG. 29 shows inner surface areas of a drilled hole near the middle and the exit of the hole in example D1 of the present invention. As can be seen from the photos of FIG. 29, a drilled hole in example D1 of the present invention produced a smooth inner surface near the exit and the middle of the hole. The reason for this can be considered as follows. Namely, an expanded-diameter portion having substantially the same diameter as the drill diameter was able to scrub the inner surface of a drilled hole and such a scrubbing effect could improve an inner surface roughness and an inner surface precision. Further, it can be considered that drilling a hole until the small-diameter drill protrudes 1.53 mm from the exit of the hole, it is possible to obtain a desired scrubbing effect over an entire inner surface of a through hole from the hole entrance to the hole exit.

Example 11

Next, as examples D3 to 39 of the present invention and a comparative example D10, test was performed to optimize the shape of a small-diameter drill 1.

As test method, this example employed the same specifications as example D1 of the present invention, using a comparative example D10 not involving an expanded-diameter portion, an example D8 of the present invention involving an expanded-diameter portion with a maximum diameter of 0.288 mm and a length of 0.15 mm, an example D9 of the present invention having an expanded-diameter portion with a maximum diameter of 0.285 mm and a length of 0.15 mm, and examples D3 to D7 of the present invention in which an expanded-diameter portion length including a cylindrical portion is 0.15 mm to 0.85 mm, i.e., a cylindrical portion length is 0.1 mm to 0.8 mm, and an under neck length is 9.2 mm to 9.9 mm, thereby performing the same drilling and evaluation as example 10. The results are shown in Table 11.

TABLE 11

| | | Small-diameter drill penetration amount (mm) | Involve a large-diameter portion? (Yes/No) | Length of cylindrical portion (mm) | Maximum diameter of large-diameter portion (mm) | Test results of micro deep hole drilling | | |
|---|---|---|---|---|---|---|---|---|
| Sample number | Under neck length (mm) | | | | | Number of holes through which the reference pin could pass (holes) | State of the inner surface of the 100th hole — | Roughness of the inner surface of the 100th hole (μm) |
| Examples of the invention D3 | 9.2 | 1.63 | Yes | 0.1 | 0.298 | 99 | Smooth | 0.7 |
| D4 | 9.4 | 1.83 | Yes | 0.3 | 0.298 | 99 | Smooth | 0.6 |
| D5 | 9.5 | 1.93 | Yes | 0.4 | 0.298 | 97 | No unevenness | 0.8 |
| D6 | 9.7 | 2.13 | Yes | 0.6 | 0.298 | 97 | No unevenness | 0.8 |
| D7 | 9.9 | 2.33 | Yes | 0.8 | 0.298 | 90 | No unevenness | 1.2 |
| D8 | 9.2 | 1.63 | Yes | 0.1 | 0.288 | 93 | No unevenness | 1.0 |
| D9 | 9.2 | 1.63 | Yes | 0.1 | 0.285 | 88 | a little unevenness | 1.4 |
| Comparative examples D10 | 9.1 | 1.53 | No | — | — | 0 | A lot of unevenness | 5.5 |

As can be seen from Table 11, in the drilling method using the examples D3 to D9 of the present invention, it was possible to insert a reference pin smoothly into 88 holes. Particularly, in examples D3 and D4 of the present invention, it was possible to insert the reference pin smoothly into all of 99 holes. Further, with the example D4 of the present invention, the roughness of the inner surface of the 100th hole exhibits an extremely good result of 0.6 μm. This is perhaps because the cylindrical portion produced a remarkable scrubbing effect during a drilling process.

Further, in example D7 of the present invention, since a cylindrical portion was relatively long, a scrubbed surface area became large, so that the roughness of the inner surface of the 100th drilled hole also became large. On the other hand, in example D9 of the present invention, the number of holes through which a reference pin could insert is fewer than other examples of the invention. The reason for this can be considered as follows. Namely, since the maximum diameter of the expanded-diameter portion is 0.95 times the drill diameter, the clearance of the maximum diameter of the expanded-diameter portion with respect to the drill diameter is slightly larger than other examples of the invention, hence resulting in a slightly weak scrubbing effect.

On the other hand, it was not possible to insert a reference pin into any of the drilled holes in comparative example D10. As a result, a lot of unevenness occurred over the inner surface of the 100th drilled hole, and surface roughness became as poor as 5.5 μm. The reason for this can be considered as follows. Namely, since there was no expanded-diameter portion involved in comparative example D10, the small-diameter drill was unstable during a drilling process, and the cutting chips got bitten in the hole, hence resulting in a worse straightness.

Next, example 12 will be used to explain an example of evaluating a reaming effect in a case where an expanded-diameter portion at the read end of the drill section has a cylindrical portion whose diameter is approximately the same as the drill diameter.

Example 12

Figure 31:
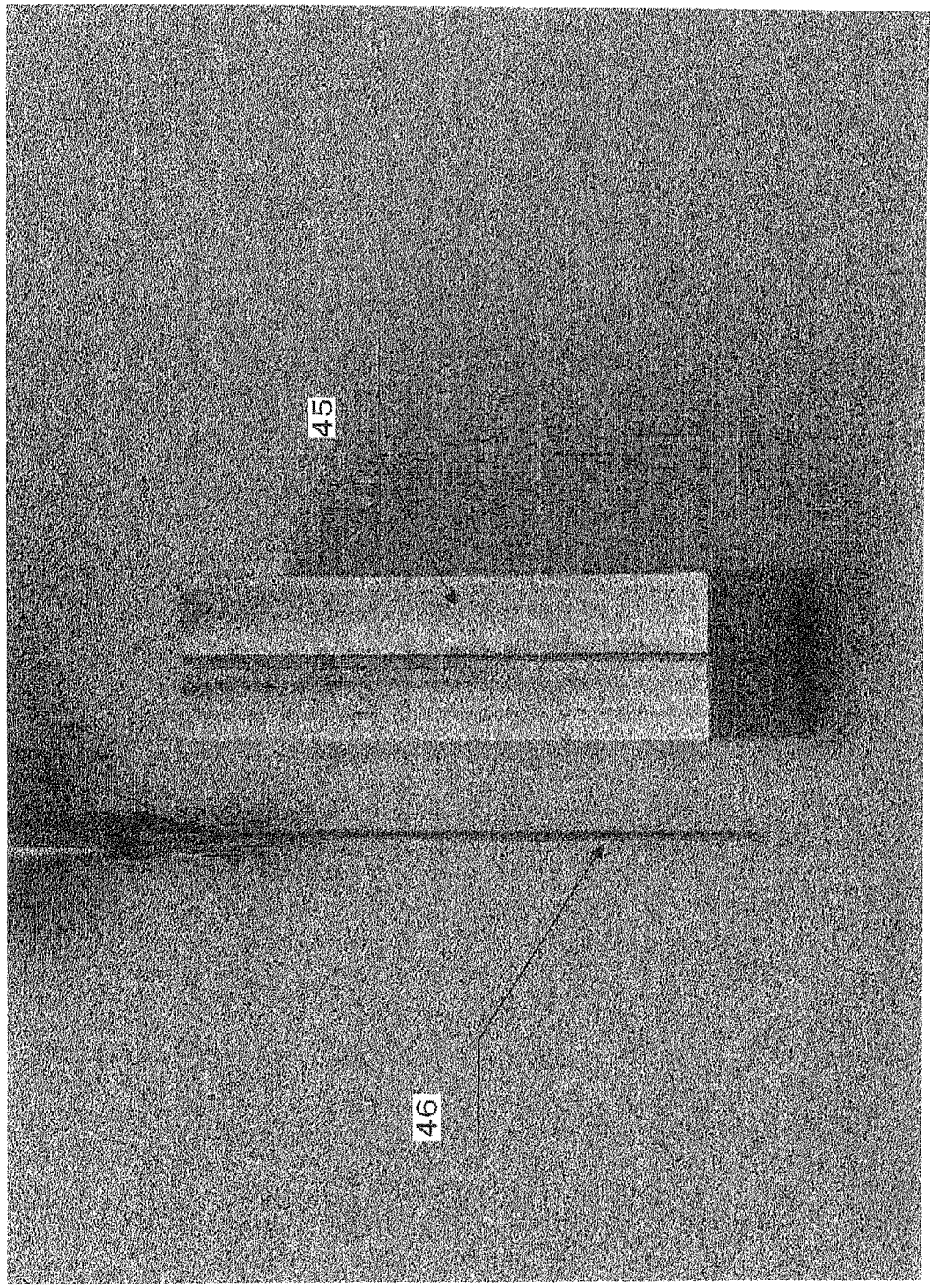
FIG. 31 shows a cross section of a work piece drilled using the method of the present invention, and an actually used tool.

A test was carried out to drill an ultra deep hole having an L/D ratio of 80 which was not possible in prior art. FIG. 31 shows a small-diameter drill 46 after being used in the test and a work piece 45 after being cut open.

As example D11 of the present invention, a small-diameter drill 46 for use in micro deep hole drilling comprised two cutting edges, wherein a drill diameter was 0.5 mm, a flute twist angle was 30 degrees, a web thickness was 0.175 mm (35% of drill diameter), a shank diameter was 3 mm, a drill section length was 2.48 mm, a flute length was 2.5 mm, an expanded-diameter portion length including a cylindrical portion is 0.15 mm, i.e., a cylindrical portion length was 0.1 mm, a maximum diameter of the expanded-diameter portion was 0.498 mm, the guide portion was located at 4.0 mm and 8.0 mm from the cutting edge of the neck section, a back tapering amount was 0.5/100 mm, a neck diameter was 0.48 mm, an under neck length was 43 mm, and a tip angle was 140°.

As test conditions, a ball end mill for forming a guide hole was used to continuously drill guide holes at a pitch of 0.2 mm on one surface of a work piece 45 of SUS304 material. The ball end mill was provided with two cutting edges, having an edge diameter of 0.495 mm, a ball cutting edge radius R of 0.25 mm, a ball cutting edge, an outer peripheral cutting edge, wherein an outer peripheral cutting edge length is 0.5 mm, an outer peripheral cutting edge relief angle was 15 degrees and a shank section outer diameter was 4 mm. The guide holes were thus continuously formed until each has a hole depth of 0.3 mm. Afterwards, a small-diameter drill 46 for use in micro deep hole drilling was used to drill through holes each having a hole diameter of 0.5 mm and a hole depth of 40 mm, i.e., a drilled depth was 80 times the cutting edge diameter.

Both the ball end mill and the small-diameter drill 46 were used to perform a wet cutting, with number of revolutions at 7,000 min$^{-1}$, a feeding speed at 30 mm/min, and a step feeding amount per step at 0.05 mm/step.

As a drilling method, each preformed guide hole guided the small-diameter drill 46. As shown in FIG. 27, by repeating a step feed, drilling was performed so that a penetration length 39 of the small-diameter drill 46 was 2.63 mm, i.e., drilling was performed until the small-diameter drill 46 protrudes 2.63 mm from the exit of a drilled hole.

For evaluation, 30 holes were drilled and a reference pin was inserted through each of the 1st to 29th holes to check whether the pin could pass through the holes smoothly. The 30th drilled hole was cut open and the finished surface roughness of the inner surface of the hole was measured and the inner surface of the hole was observed using a scanning electron microscope. The results are shown in Table 12.

TABLE 12

| | Small- | | | | | Test results of micro deep hole drilling | | |
|---|---|---|---|---|---|---|---|---|
| Sample number | Under neck length (mm) | diameter drill penetration amount (mm) | Involve a large-diameter portion? (Yes/No) | Length of cylindrical portion (mm) | Maximum diameter of large-diameter portion (mm) | Number of holes through which the reference pin could pass (holes) | State of the inner surface of the 30th hole — | Roughness of the inner surface of the 30th hole (μm) |
| Examples of the invention D11 | 43 | 2.63 | Yes | 0.1 | 0.498 | 29 | smooth | 0.9 |

Figure 32B:
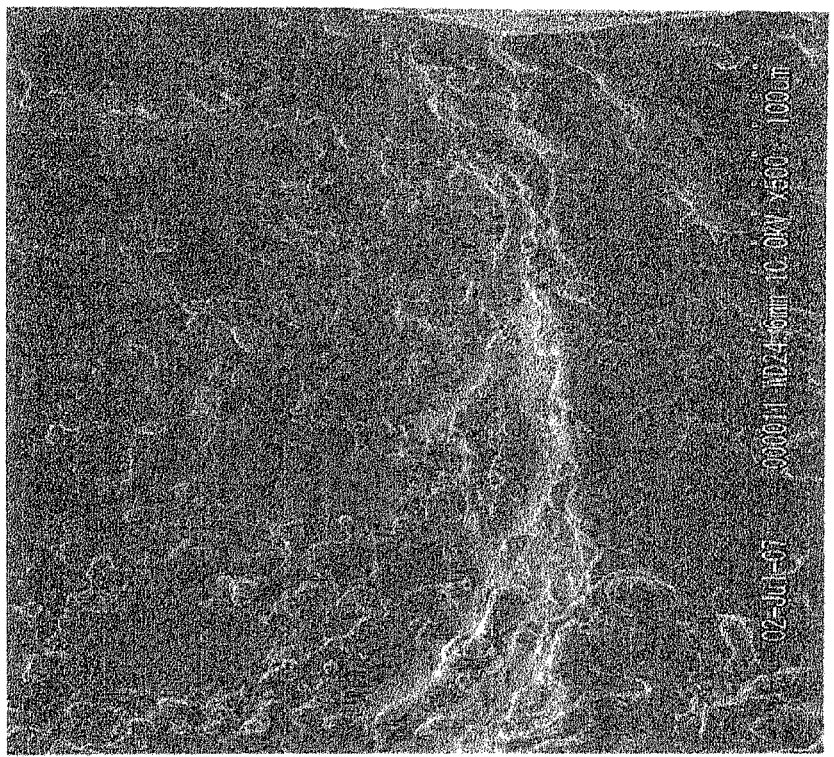
FIGS. 32a and 32b show a comparison of hole inner surface, between the present invention and a prior art which is based on an electric discharge processing.
Figure 32A:
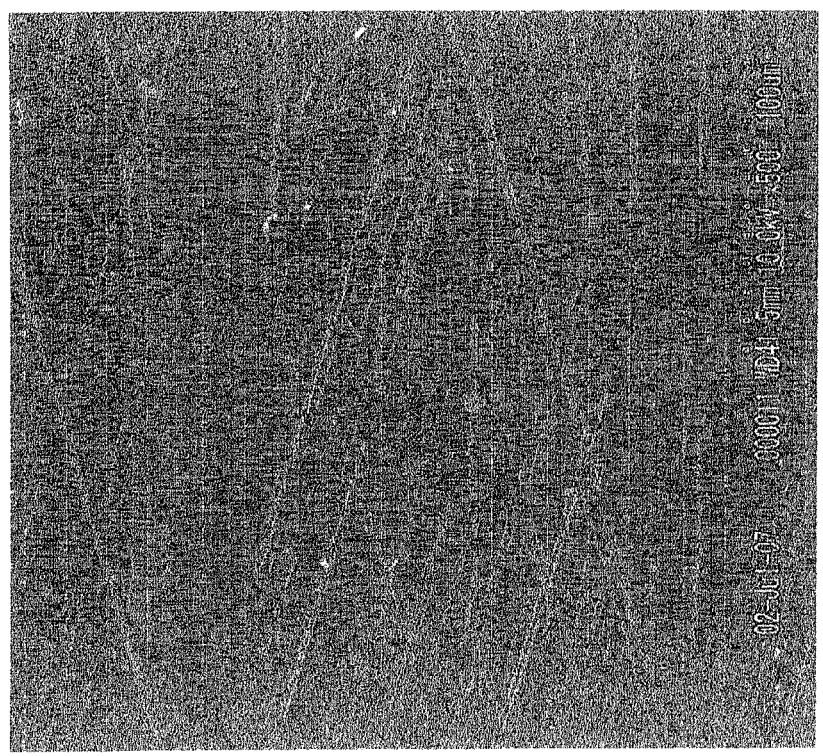

As can be seen from Table 12, in the drilling method using example D11 of the present invention, a reference pin could smoothly insert into all of 29 holes. FIG. 32(a) shows a state of the inner surface of a drilled hole near its exit in example D11 of the present invention.

As can be seen from the photo of FIG. 32(a), in example D11 of the present invention, the inner surface of the drilled hole near its exit shows a smooth surface. On the other hand, as a comparison shown in the photo of FIG. 32(b), so-called "dragonfly machining" was conducted by electric discharge machining that means hole making was performed from both sides of a work piece and each holes were then connected so as to form a through hole by the machining, and was followed by wire electric discharge machining in the through hole to obtain a finished hole. An inner surface of a drilled hole is shown in FIG. 32(b). As can also be confirmed from the photo of FIG. 32(b) an abnormal layer of an electric charge processing occurred on the inner surface of the drilled hole, thus resulting in further large unevenness.

Namely, the present invention makes it possible to achieve a micro ultra deep hole drilling with an L/D ratio of 80 or more, which was otherwise impossible to achieve in prior art, thereby rendering it possible to perform a hole drilling while ensuring an inner surface precision of a drilled hole within an excellent range.

INDUSTRIAL APPLICABILITY

Examples of industrial fields in which the small-diameter deep hole drill of the present invention can be applied include the processing of metal moulds or parts, particularly the process of drilling extremely thin holes having a hole diameter of 1 mm or less. Namely, the small-diameter deep hole drill of the present invention can be used to drill not only a hole whose length is 15 or more times the hole diameter, but also a blind hole or through hole whose length is 50 or more times the hole diameter. In particular, the small-diameter drill of the present invention can drill a micro deep hole having an L/D ratio of 50 or more which was otherwise impossible to drill in prior art. In more detail, the small-diameter drill of the present invention can drill water cooling holes in mold and protrusion pin holes in molds, as well as special nozzles or the like in automotive manufacturing field and in textile industry where there is a necessity of drilling thinner and deeper holes in order to achieve greatly improved functions.

EXPLANATION OF REFERENCE NUMERALS 1 small-diameter drill
2 drill diameter
3 cutting edge
4 flute
5 drill section
6 neck section
7 shank section
8 smallest-diameter portion of small-diameter portion
9 end of the flute
10 expanded-diameter portion
11 flute length
12 neck section length
13 guide portion
14 small-diameter portion
16 tip angle
17 under neck length
18 maximum-diameter portion of expanded-diameter portion
19 opening angle
20 work piece
21 guide portion
22 chisel
23 cutting point in a conventional drilling method
24 cutting point in a method of the present invention
25 cutting point in a method of the present invention
26 outer peripheral corner
27 guide hole corner
28 predetermined cut
29 next predetermined cut
30 step back
31 step forward
32 end face of the entrance of a drilled hole
33 outer peripheral corner position
34 work piece
35 through hole
36 small-diameter drill used in a hole drilling process
37 entrance of hole
38 exit of hole
39 penetration length of a small-diameter drill
40 scrubbed portion of hole inner surface
41 step amount
43 inner surface
44 inner surface
45 work piece drilled and cut open
46 small-diameter drill after being used in drilling 30 holes
47 length of guide portion

The invention claimed is:
1. A small-diameter deep hole drill having a drill diameter of 1 mm or less, including a drill section having cutting edge(s) and flute(s), wherein
said flute has a length which is at least 5 times and at most 10 times the drill diameter;
said drill section at first shrinks and then expands in diameter, changing said drill diameter from a drill cutting edge toward a rear end of the drill section,
an outer diameter of the drill section at the end of said flute is at least 0.9 times and at most 0.98 times the drill diameter;
an expanded-diameter portion is provided between said drill section and a neck section, having a diameter which expands from the outer diameter of the end of the flute up to 1 or less times the drill diameter;

said neck section is connected with a shank section and has a diameter smaller than the drill diameter and a length which is 10 or more times the drill diameter.

2. A small-diameter deep hole drill having a drill diameter of 1 mm or less, including a drill section having cutting edge(s) and flute(s), wherein said flute has a length which is at least 5 times and at most 10 times the drill diameter;

said drill section has a smallest-diameter portion in the middle of drill section longitudinal direction;

an outer diameter of the drill section at the end of said flute is at least 0.9 times and at most 0.98 times the drill diameter;

an expanded-diameter portion is provided at the rear end of the drill section, having a diameter which expands from the outer diameter of the end of the flute up to 1 or less times the drill diameter;

said neck section is connected with a shank section and has a diameter smaller than the drill diameter and a length which is 10 or more times the drill diameter.

3. The small-diameter deep hole drill according to claim 1 or 2, wherein the expanded-diameter portion at the rear end of the drill section expands in a tapered form from the outer diameter of the end of the flute up to a diameter which is approximately the same as the drill diameter, alternatively, a maximum diameter of the expanded-diameter portion is made substantially equal to the drill diameter by combining a tapered portion with a cylindrical portion having a diameter which is approximately the same as the drill diameter.

4. The small-diameter deep hole drill according to claim 1 or 2, wherein the flute has a length which is at least 5 times and at most 7 times the drill diameter.

5. The small-diameter deep hole drill according to claim 1 or 2, wherein the outer diameter of the neck section is at least 0.85 times to less than 0.98 times the drill diameter; and guide portion(s) each having an outer diameter which is at least 0.98 and at most 1.0 times the drill diameter are provided at one or more locations of the neck section.

6. The small-diameter deep hole drill according to claim 1 or 2, wherein the outer diameter of the neck section is at least 0.85 times to less than 0.98 times the drill diameter; and guide portion(s) each having an outer diameter which is at least 0.98 and at most 1.0 times the drill diameter are provided at one or more locations of the neck section, and the length of individual guide portion(s) is at least 0.2 times and at most 2 times the drill diameter.

7. A micro deep hole drilling method for drilling a hole having a diameter of 1 mm or less and a depth of 15 or more times a drilled hole diameter, wherein a small-diameter deep hole drill is guided by a preformed guide hole, said guide hole is formed using a ball end mill which is fed in the direction of rotation axis of the ball end mill, so that the diameter of said guide hole is at least 0.90 times and at most 1.05 times the diameter of the small-diameter deep hole drill, and the depth of said guide hole is at least 0.6 times and at most 2.0 times the diameter of the small-diameter deep hole drill;

said guide hole is formed to have a bottom surface in a substantially hemispherical shape;

said guide hole is formed to have a botton surface in a substantially hemispherical shape;

said drilling is performed by repeating a step feed by using the small-diameter deep hole drill according to claim 1 or claim 2.

8. The small-diameter deep hole drill according to claim 3, wherein the outer diameter of the neck section is at least 0.85 times to less than 0.98 times the drill diameter; and guide portion(s) each having an outer diameter which is at least 0.98 and at most 1.0 times the drill diameter are provided at one or more locations of the neck section, and the length of individual guide portion(s) is at least 0.2 times and at most 2 times the drill diameter.

9. The micro deep hole drilling method according to claim 7, wherein during a drilling process involving a drilling depth which is 50 or more times the diameter of a drilled hole, a position of an outer peripheral corner of the small-diameter deep hole drill during a step back is located inside the drilled hole, said position of the outer peripheral corner is located at least 0.03 times and at most 1.0 times the diameter of the small-diameter deep hole drill from the end face of the entrance of the drilled hole.

10. The micro deep hole drilling method according to claim 9, wherein a feeding speed of the small-diameter deep hole drill during non-drilling period is at least 1 m/min and at most 4 m/min.

11. A micro deep hole drilling method for drilling a through hole having a diameter of 1 mm or less and a depth of 10 or more times the diameter of a drilled hole, wherein a small-diameter deep hole drill according to claim 1 or 2 is used to perform a drilling by repeating a step feed until at least the maximum-diameter portion or the cylindrical portion penetrates through the drilled hole.

12. A micro deep hole drilling method for drilling a through hole having a diameter of 1 mm or less and a depth of 10 or more times the diameter of the through hole, wherein a preformed guide hole is formed having a diameter which is at least 0.90 times and at most 1.05 times the diameter of said small-diameter deep hole drill and a depth which is at least 0.6 times and at most 2.0 times the diameter of the small-diameter deep hole drill;

said guide hole is formed to have a bottom surface which is in an approximately hemispherical shape;

said guide hole guides the small-diameter deep hole drill according to claim 1 or 2, and the drilling is performed by repeating a step feed until at least the maximum-diameter portion or the cylindrical portion penetrates through the drilled hole.

13. The small-diameter deep hole drill according to claim 3, wherein the flute has a length which is at least 5 times and at most 7 times the drill diameter.

14. The small-diameter deep hole drill according to claim 3, wherein the outer diameter of the neck section is at least 0.85 times to less than 0.98 times the drill diameter; and guide portion(s) each having an outer diameter which is at least 0.98 and at most 1.0 times the drill diameter are provided at one or more locations of the neck section.

* * * * *